(12) United States Patent
Hatano et al.

(10) Patent No.: US 12,543,820 B2
(45) Date of Patent: *Feb. 10, 2026

(54) SHOCK ABSORBER, SHOCK ABSORBING STRUCTURE, SHOE SOLE, AND SHOE

(71) Applicant: ASICS CORPORATION, Kobe (JP)

(72) Inventors: Genki Hatano, Kobe (JP); Norihiko Taniguchi, Kobe (JP); Ayu Bessho, Kobe (JP); Jun Takei, Kobe (JP); Kenta Nakaya, Kobe (JP)

(73) Assignee: ASICS CORPORATION, Hyogo (JP)

( * ) Notice: Subject to any disclaimer, the term of this patent is extended or adjusted under 35 U.S.C. 154(b) by 796 days.

This patent is subject to a terminal disclaimer.

(21) Appl. No.: 17/780,474

(22) PCT Filed: Jun. 24, 2020

(86) PCT No.: PCT/JP2020/024721
§ 371 (c)(1),
(2) Date: May 26, 2022

(87) PCT Pub. No.: WO2021/111667
PCT Pub. Date: Jun. 10, 2021

(65) Prior Publication Data
US 2023/0000206 A1    Jan. 5, 2023

(30) Foreign Application Priority Data
Dec. 4, 2019   (JP) ................. 2019-219796

(51) Int. Cl.
*A43B 13/18*  (2006.01)
*F16F 1/36*   (2006.01)
(Continued)

(52) U.S. Cl.
CPC .......... *A43B 13/181* (2013.01); *F16F 1/3605* (2013.01); *F16F 1/373* (2013.01);
(Continued)

(58) Field of Classification Search
None
See application file for complete search history.

(56) References Cited

U.S. PATENT DOCUMENTS 4,535,553 A * 8/1985 Derderian ............ A43B 13/181
36/28
4,930,232 A   6/1990 Engle
(Continued)

FOREIGN PATENT DOCUMENTS

CN   201860897 U   6/2011
CN   108685261 A   10/2018
(Continued)

OTHER PUBLICATIONS

International Search Report issued in corresponding International Application No. PCT/JP2020/024721 on Sep. 1, 2020.
(Continued)

*Primary Examiner* — Melanie Torres Williams
(74) *Attorney, Agent, or Firm* — Spencer Fane, LLP

(57) ABSTRACT

A shock absorber has a first and second end surfaces opposite to each other in an axial direction, and a plurality of connection surfaces. The first end surface is an N-sided polygon (N is an integer of 3 or more), and the second end surface is an M-sided polygon (M is an integer of 4 or more and more than N). (M−N) vertices are provided at intermediate positions in the axial direction on a circumferential surface defined by the plurality of connection surfaces. From the vertices, one first ridgeline reaches one vertex of the first end surface and two second ridgelines reach a corresponding one of two vertices of the second end surface. The remaining vertices are connected to each other by (2×N−M) third ridgelines. The first ridgeline, the second ridgelines, and the third ridgelines define the plurality of connection surfaces.

20 Claims, 38 Drawing Sheets

(51) Int. Cl.
*F16F 1/373* (2006.01)
*F16F 3/087* (2006.01)
*F16F 7/12* (2006.01)

(52) U.S. Cl.
CPC .......... *F16F 3/0873* (2013.01); *F16F 3/0876* (2013.01); *F16F 7/121* (2013.01); *F16F 2224/025* (2013.01)

(56) References Cited

U.S. PATENT DOCUMENTS

| | | | |
|---|---|---|---|
| 4,956,927 | A | 9/1990 | Misevich et al. |
| 5,092,060 | A | 3/1992 | Frachey et al. |
| 5,233,767 | A | 8/1993 | Kramer |
| 5,517,770 | A | 5/1996 | Martin et al. |
| 5,689,902 | A | 11/1997 | Juang |
| 5,782,014 | A | 7/1998 | Peterson |
| 5,853,844 | A | 12/1998 | Wen |
| 5,918,383 | A | 7/1999 | Chee |
| 6,178,662 | B1 | 1/2001 | Legatzke |
| 6,598,321 | B2 | 7/2003 | Crane et al. |
| 7,134,223 | B2 | 11/2006 | Ganon |
| 8,296,969 | B2 | 10/2012 | Granger et al. |
| 2003/0061733 | A1 | 4/2003 | Karsten |
| 2003/0200678 | A1 | 10/2003 | Nishiwaki et al. |
| 2004/0128860 | A1 | 7/2004 | Smaldone et al. |
| 2010/0281712 | A1 | 11/2010 | Campbell et al. |
| 2010/0319826 | A1 | 12/2010 | Idei |
| 2011/0214310 | A1 | 9/2011 | Rosenbaum |
| 2014/0068965 | A1 | 3/2014 | Vattes et al. |
| 2015/0128452 | A1* | 5/2015 | Hull ................. A43B 13/141 36/103 |
| 2015/0223560 | A1 | 8/2015 | Wawrousek et al. |
| 2016/0007681 | A1 | 1/2016 | Langvin |
| 2017/0079373 | A1 | 3/2017 | Huard et al. |
| 2018/0049514 | A1 | 2/2018 | Guyan et al. |
| 2018/0055144 | A1 | 3/2018 | Bischoff |
| 2018/0255870 | A1 | 9/2018 | Oda et al. |
| 2019/0075884 | A1 | 3/2019 | Pearce et al. |
| 2019/0090583 | A1 | 3/2019 | Sato et al. |
| 2021/0015208 | A1 | 1/2021 | Yahata et al. |
| 2023/0108812 | A1* | 4/2023 | Ozawa ................. A43B 7/1425 36/28 |
| 2023/0123675 | A1 | 4/2023 | Ozawa et al. |

FOREIGN PATENT DOCUMENTS

| | | | |
|---|---|---|---|
| EP | 0354718 | A2 * | 2/1990 |
| JP | H02-271804 | A | 11/1990 |
| JP | 57106 | U | 2/1993 |
| JP | 3049755 | U | 6/1998 |
| JP | 2003079402 | A | 3/2003 |
| JP | 2011000934 | A | 1/2011 |
| JP | 2019-063491 | A | 4/2019 |
| JP | 2019-165937 | A | 10/2019 |

OTHER PUBLICATIONS

Japanese Office Action issued in corresponding Japanese Application No. 2021-562450 on Jun. 20, 2023.
Supplementary European Search Report issued in corresponding European Application No. EP 20896738 on Oct. 25, 2022.
An Office Action; mailed by the China National Intellectual Property Administration of the People's Republic of China on Feb. 28, 2025, which corresponds to Chinese Patent Application No. 202080099660.3 and is related to U.S. Appl. No. 17/907,134.
International Search Report issued in PCT/JP2020/016304; mailed Jul. 14, 2020.
The extended European search report issued by the European Patent Office on Apr. 14, 2023, which corresponds to European Patent Application No. 20931350.1-1015 and is related to U.S. Appl. No. 17/907,134.

* cited by examiner

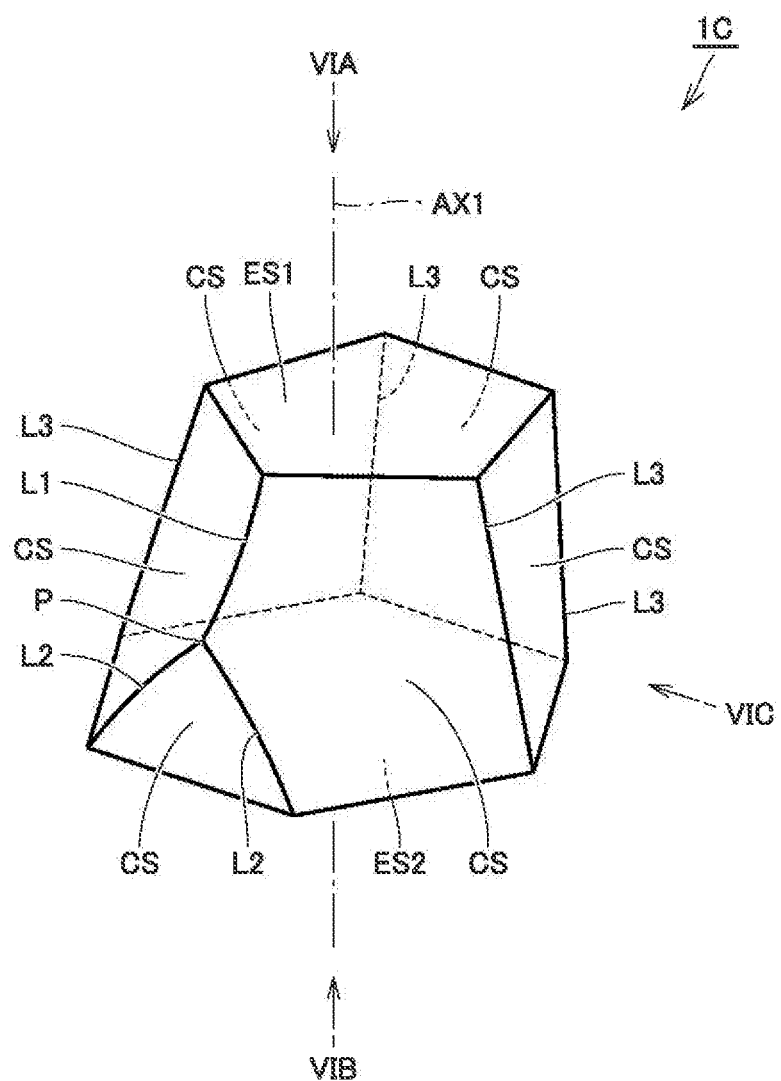

SHOCK ABSORBER, SHOCK ABSORBING STRUCTURE, SHOE SOLE, AND SHOE

CROSS-REFERENCE TO RELATED APPLICATION

This application is a U.S. National Stage application of International Application No. PCT/JP2020/024721, filed Jun. 24, 2020, which claims priority to Japanese Patent Application No. 2019-219796, filed Dec. 4, 2019, the contents of each of which are hereby incorporated by reference.

FIELD OF THE INVENTION

The present disclosure relates to a shock absorber for absorbing shock, a shock absorbing structure including a plurality of the shock absorbers, a shoe sole including the shock absorbers or the shock absorbing structure, and a shoe including the shoe sole.

BACKGROUND INFORMATION

Conventionally, various types of shock absorbers for absorbing shock have been known and have been applied depending on intended uses. For example, shoes each can have a shoe sole including a shock absorber in order to absorb shock caused upon landing. The shock absorber provided in the shoe sole is typically made using resin or rubber.

In recent years, there have also been developed shoes each having a shoe sole including a part having a lattice structure, a web structure or the like, thereby enhancing a shock absorbing function in terms of not only material but also structure. Shoes each including a shoe sole including a part having a lattice structure are disclosed, for example, in U.S. Patent Publication No. 2018/0049514.

SUMMARY

An object of the present disclosure is to describe a novel shock absorber structurally enhanced in shock absorbing function, and a shock absorbing structure including a plurality of the shock absorbers, each of the shock absorbers and the shock absorbing structure being able to be used in various applications, and also to provide a shoe sole including the novel shock absorbers or the shock absorbing structure, and a shoe including the shoe sole.

A shock absorber according to the present disclosure has a columnar outer shape and includes, as outer surfaces: a first end surface and a second end surface that are located opposite to each other in an axial direction in which an axial line extends; and a plurality of connection surfaces connecting a peripheral edge of the first end surface and a peripheral edge of the second end surface. The first end surface has an outer shape of an N-sided polygon (N is an integer of 3 or more) when viewed in the axial direction. The second end surface has an outer shape of an M-sided polygon (M is an integer of 4 or more and more than N) when viewed in the axial direction. (M−N) vertices are provided at intermediate positions in the axial direction on a circumferential surface defined by the connection surfaces. In the shock absorber according to the present invention, one first ridgeline is provided to extend from the (M−N) vertices provided on the circumferential surface to reach a corresponding one vertex among N vertices provided on the first end surface. Two second ridgelines each are provided to extend from the (M−N) vertices provided on the circumferential surface to reach a corresponding one of two vertices among M vertices provided on the second end surface, the two vertices being adjacent to each other in a circumferential direction. (2×N−M) third ridgelines each are provided to extend from a corresponding one of remaining vertices among the N vertices provided on the first end surface to reach a corresponding one of remaining vertices among the M vertices provided on the second end surface. Ridgelines included in the first ridgeline, the second ridgelines, and the third ridgelines do not intersect with each other. Thereby, in the shock absorber according to the present invention, ridgelines included in the first ridgeline, the second ridgelines, and the third ridgelines define the connection surfaces.

The shock absorbing structure according to the first aspect of the present disclosure includes a plurality of the shock absorbers according to the present invention described above.

A shock absorbing structure according to the second aspect of the present disclosure includes a shock absorbing unit unitized by combining a plurality of shock absorbers. Each of the shock absorbers is formed of the shock absorber according to the present invention described above. The shock absorbers each have the plurality of connection surfaces, and the shock absorbers are disposed adjacent to each other such that, among the connection surfaces, connection surfaces each defined by the first ridgeline and the second ridgelines face each other with a gap interposed therebetween. In the shock absorbing structure according to the second aspect of the present disclosure, the gap disposed between the shock absorbers is substantially identical in size.

A shock absorbing structure according to the third aspect of the present disclosure includes a plurality of the shock absorbing units included in the shock absorbing structure according to the second aspect of the present disclosure described above.

A shock absorbing structure according to the fourth aspect of the present disclosure includes a shock absorbing unit unitized by combining a plurality of shock absorbers. Each of the shock absorbers is formed of the shock absorber according to the present invention described above. The shock absorbers each have the plurality of connection surfaces, and the shock absorbers are disposed adjacent to each other such that, among the connection surfaces, connection surfaces each defined only by the third ridgelines face each other with a gap interposed therebetween. In the shock absorbing structure according to the fourth aspect of the present disclosure, the gap disposed between the shock absorbers is substantially identical in size.

The shock absorbing structure according to the fifth aspect of the present disclosure includes a plurality of the shock absorbing units included in the shock absorbing structure according to the fourth aspect of the present disclosure described above.

A shoe sole according to the first aspect of the present disclosure includes the shock absorber according to the present disclosure described above.

A shoe sole according to the second aspect of the present disclosure includes the shock absorbing structure according to any one of the first to fifth aspects of the present disclosure described above.

A shoe according to the present disclosure includes: the shoe sole according to any one of the first and second aspects of the present invention described above; and an upper provided above the shoe sole.

According to the shock absorber based on the present disclosure described above, some or all of the portions where the first end surface, the second end surface, and the plurality of connection surfaces are connected to each other (i.e., some or all of the one first ridgeline, the two second ridgelines, the (2×N−M) third ridgelines, and the plurality of vertices) each do not need to have a strictly acute, obtuse or right-angled corner portion. Instead, some or all of the above-mentioned portions can be connected through a flat surface or a curved surface sufficiently smaller than the first end surface, the second end surface, and the plurality of connection surfaces of each portion adjacent thereto. In other words, some or all of the above-mentioned portions can be chamfered or can be rounded, for example. Further, some or all of the first end surface, the second end surface, and the plurality of connection surfaces can be a flat surface or a curved surface. Further, some or all of the first end surface, the second end surface, and the plurality of connection surfaces can include recesses or protrusions.

The present disclosure can provide a novel shock absorber structurally enhanced in shock absorbing function, and a shock absorbing structure including a plurality of the shock absorbers, each of the shock absorbers and the shock absorbing structure being able to be used in various applications; and also can provide a shoe sole including the novel shock absorbers or the shock absorbing structure, and a shoe including the shoe sole.

BRIEF DESCRIPTION OF DRAWINGS

The invention will be explained in more detail hereinafter with reference to the drawings.

FIG. 5 is a perspective view of a shock absorber according to a second modification.

DETAILED DESCRIPTION

Figure 1:
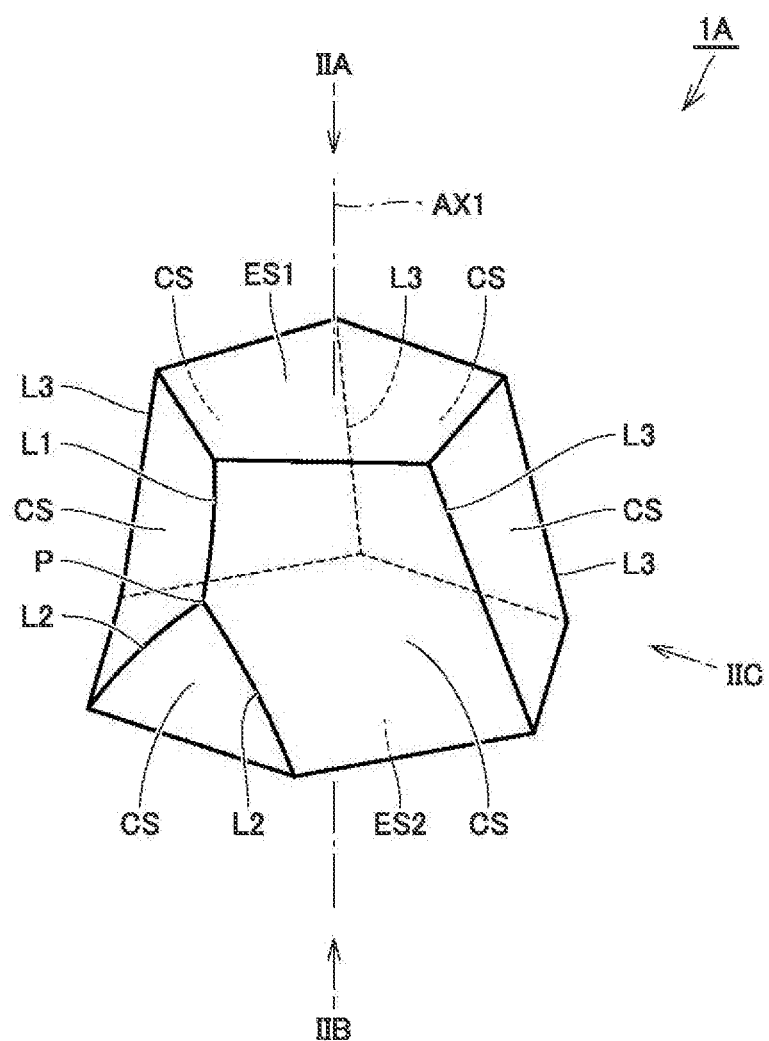
FIG. 1 is a perspective view of a shock absorber according to a first embodiment.

The following describes embodiments of the present invention in detail with reference to the accompanying drawings. In the embodiments described below, the same or common portions are denoted by the same reference characters, and the description thereof will not be repeated.

First Embodiment

Figure 2A:
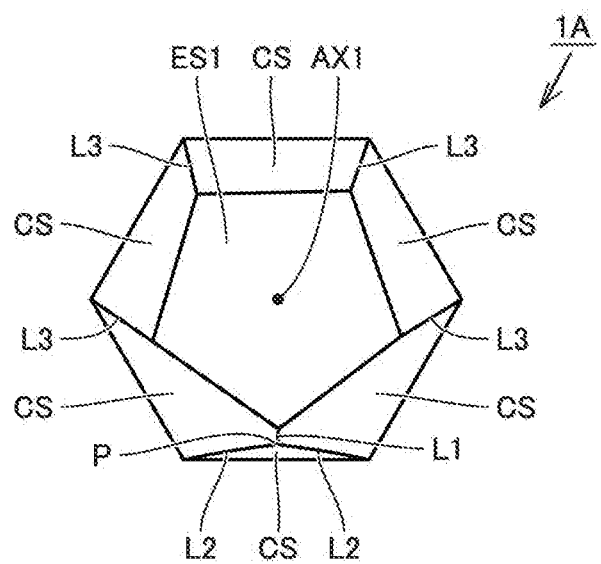
FIGS. 2A-2C illustrate a plan view, a bottom view, and a side view of the shock absorber shown in FIG. 1.
Figure 2B:
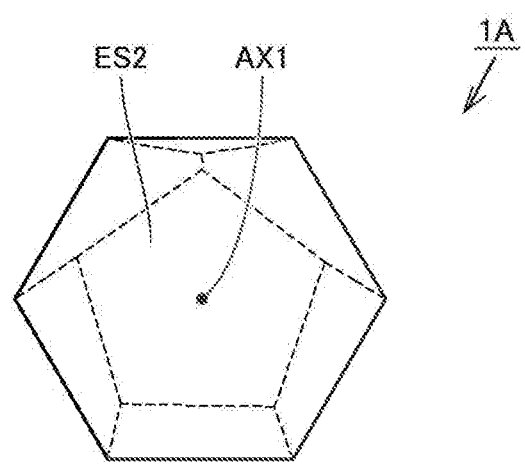
Figure 2C:
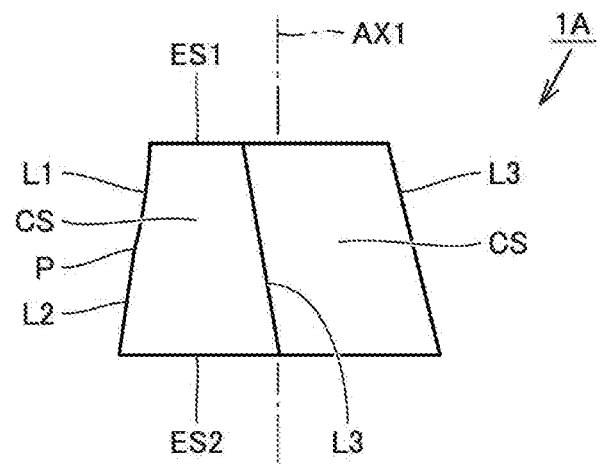

FIG. 1 is a perspective view of a shock absorber according to the first embodiment. FIG. 2A is a plan view of the shock absorber viewed in the direction indicated by an arrow IIA shown in FIG. 1. FIG. 2B is a bottom view of the shock absorber viewed in the direction indicated by an arrow IIB shown in FIG. 1. FIG. 2C is a side view of the shock absorber viewed in the direction indicated by an arrow IIC shown in FIG. 1. The following describes a shock absorber 1A according to the present embodiment with reference to FIG. 1 and FIGS. 2A to 2C.

As shown in FIG. 1 and FIGS. 2A to 2C, the shock absorber 1A is formed of a column-shaped member having an outer surface defined by a first end surface ES1, a second end surface ES2, and a plurality of connection surfaces CS. The first end surface ES1 and the second end surface ES2 are located opposite to each other in an axial direction in which an axial line AX1 of the shock absorber 1A extends. The plurality of connection surfaces CS connect a peripheral edge of the first end surface ES1 and a peripheral edge of the second end surface ES2 to thereby define a circumferential surface around the axial line AX1 of the shock absorber 1A.

The first end surface ES1 is a flat surface having a pentagonal outer shape when viewed in the axial direction. The second end surface ES2 is a flat surface having a hexagonal outer shape when viewed in the axial direction. In other words, N represents 5 and M represents 6 in the present embodiment.

The plurality of connection surfaces CS include six curved surfaces in total including: one curved surface having a substantially triangular outer shape; three curved surfaces each having a substantially quadrangular outer shape; and two curved surfaces each having a substantially pentagonal outer shape.

In the circumferential surface defined by the plurality of connection surfaces CS, one vertex P is disposed at an intermediate position of the circumferential surface in the axial direction. From the vertex P, one first ridgeline L1 extends so as to reach one vertex among five vertices provided in the first end surface ES1. Also, from the vertex P, two second ridgelines L2 extend so as to reach two vertices, which are adjacent to each other in the circumferential direction, among six vertices provided in the second end surface ES2.

From the remaining four vertices excluding one vertex connected to the above-mentioned first ridgeline L1 among the five vertices disposed in the first end surface, four third ridgelines L3 extend so as to reach the remaining four vertices excluding two vertices connected to the above-mentioned second ridgelines L2 among the six vertices provided in the second end surface. The one first ridgeline L1, the two second ridgelines L2, and the four third ridgelines L3 extend without intersecting with each other.

Thus, the one first ridgeline L1, the two second ridgelines L2, and the four third ridgelines L3 define the plurality of connection surfaces CS described above. More specifically, the connection surface CS surrounded by the two second ridgelines L2 and one side of the second end surface ES2 corresponds to one curved surface having a substantially triangular outer shape described above. The connection surface CS surrounded by the two third ridgelines L3 adjacent to each other, one side of the first end surface ES1, and one side of the second end surface ES2 corresponds to each of three curved surfaces each having a substantially quadrangular outer shape described above. Further, the connection surface CS surrounded by the one first ridgeline L1, one of the two second ridgelines L2, the one third ridgeline L3 adjacent thereto, one side of the first end surface ES1, and one side of the second end surface ES2 corresponds to each of two curved surfaces each having a substantially pentagonal outer shape described above.

It is assumed that a shock absorber has such a three-dimensional structure that, when viewed in the axial direction, a pair of end surfaces are formed to have polygonal outer shapes having a different number of vertices, vertices are provided at intermediate positions between the pair of end surfaces, and the vertices included in the pair of end surfaces and the vertices provided at the intermediate positions are connected by a minimum number of ridgelines so as not to intersect with each other. In such a case, the pair of end surfaces each may not be configured as a flat surface as described above but can be configured as a curved surface. Also, the plurality of connection surfaces each may not be configured as a curved surface as described above but can be configured as a flat surface.

The shock absorber 1A according to the above-described present embodiment exhibits a high shock absorbing function in the axial direction in which the axial line AX1 extends. This results from the structural characteristics (shape-related characteristics) of the shock absorber 1A.

In other words, application of external force in the direction in which the shock absorber 1A is compressed in the above-mentioned axial direction causes: not only a stress field by which compressive deformation in the axial direction occurs in the shock absorber 1A; but also a stress field by which shear deformation occurs in the shock absorber 1A. This is because the plurality of connection surfaces CS each extend in the direction intersecting with the axial direction, and thereby, such an outer shape causes complicated stress fields. In other words, since the main axis of deformation of the shock absorber 1A is different from the direction of load (i.e., the axial direction of the shock absorber 1A), the shear deformation is significantly more likely to occur than the prism-shaped or cylindrical column-shaped shock absorber in which this main axis of deformation extends along the direction of load.

Therefore, as shear deformation is more likely to occur, the amount of deformation per volume is increased correspondingly, so that high deformability is achieved accordingly. Thus, the shock absorber 1A according to the present embodiment can implement a lightweight shock absorber exhibiting a high shock absorbing function.

While shock absorber 1A can basically be made of any material having high elastic force, it is preferably made of resin or rubber. More specifically, examples of materials of the shock absorber 1A made of resin can be a thermoplastic resin such as ethylene-vinyl acetate copolymer (EVA), thermoplastic polyurethane (TPU), or thermoplastic polyamide elastomer (TPAE). Examples of materials of the shock absorber 1A made of rubber can be butadiene rubber.

In this case, the shock absorber 1A can be formed of a foam material of various materials described above or can be formed of a non-form material. In particular, when the shock absorber 1A is formed of a foam material made of resin or rubber, the resultant shock absorber is lightweight and capable of readily exhibiting a high shock absorbing function.

The shock absorber 1A can be formed of a foam material or a non-foam material having a polymer composition. In that case, examples of a polymer to be contained in the polymer composition include olefin-based polymers such as olefin-based elastomers and olefin-based resins. Examples of the olefin-based polymers include polyolefins such as polyethylene (e.g., linear low density polyethylene (LL-DPE), high density polyethylene (HDPE), and the like), polypropylene, ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, 1-butene-1-hexene copolymer, 1-butene-4-methyl-pentene, ethylene-methacrylic acid copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylic acid copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer (EVA), propylene-vinyl acetate copolymer, and the like.

The polymer can be an amide-based polymer such as an amide-based elastomer and an amide-based resin. Examples of the amide-based polymer include polyamide 6, polyamide 11, polyamide 12, polyamide 66, and polyamide 610.

The polymer can be an ester-based polymer such as an ester-based elastomer and an ester-based resin. Examples of the ester-based polymer include polyethylene terephthalate and polybutylene terephthalate.

The polymer can be a urethane-based polymer such as a urethane-based elastomer and a urethane-based resin. Examples of the urethane-based polymer include polyester-based polyurethane and polyether-based polyurethane.

The polymer can be a styrene-based polymer such as a styrene-based elastomer and a styrene-based resin. Examples of the styrene-based elastomer include styrene-ethylene-butylene copolymer (SEB), styrene-butadiene-styrene copolymer (SBS), a hydrogenated product of SBS (styrene-ethylene-butylene-styrene copolymer (SEBS)), styrene-isoprene-styrene copolymer (SIS), a hydrogenated product of SIS (styrene-ethylene-propylene-styrene copolymer (SEPS)), styrene-isobutylene-styrene copolymer (SIBS), styrene-butadiene-styrene-butadiene (SBSB), styrene-butadiene-styrene-butadiene-styrene (SBSBS), and the like. Examples of the styrene-based resin include polystyrene, acrylonitrile styrene resin (AS), and acrylonitrile butadiene styrene resin (ABS).

Examples of the polymer include acrylic polymers such as polymethylmethacrylate, polyvinyl chloride-based resins, silicone-based elastomers, butadiene rubber (BR), isoprene rubber (IR), chloroprene rubber (CR), natural rubber (NR), styrene-butadiene rubber (SBR), acrylonitrile-butadiene rubber (NBR), butyl rubber (IIR), and the like.

In this case, the shock absorber 1A can be solid or hollow. The shock absorber 1A formed to be solid is lower in deformability but excellent in mechanical strength and superior in durability than the shock absorber 1A formed to be hollow. The shock absorber 1A formed to be hollow is inferior in mechanical strength and lower in durability but higher in shock absorbing function than the shock absorber 1A formed to be solid.

Further, in the above description of the present embodiment, by way of example, the shock absorber 1A has the first end surface ES1 having a pentagonal shape and the second end surface ES2 having a hexagonal shape (i.e., N is 5 and M is 6). However, when the first end surface ES1 has an N-sided polygon (N is an integer of 3 or more) and the second end surface ES2 has an M-sided polygon (M is an integer of 4 or more and greater than N), a lightweight shock absorber exhibiting a high shock absorbing function as described above can be achieved.

Note that the M is preferably 10 or less, and, in this case, the N is 9 or less. This is because, when each of the first end surface ES1 and the second end surface ES2 has an excessively large number of vertices, the outer shape of the shock absorber is substantially approximated to a cylindrical column shape, with the result that occurrence of the shear field described above is suppressed.

The method of manufacturing the shock absorber 1A described above is not particularly limited, but the shock absorber 1A can be manufactured by injection molding using a mold, additive manufacturing using a three-dimensional additive manufacturing apparatus, thermoforming (press forming) using a mold, additive manufacturing by cutting, and the like.

In this case, in specifically designing a shock absorber, the shock absorbing performance to be exhibited is changed by variously changing: the number, the positions and the like of the vertices of the first end surface ES1; the number, the positions, and the like of the vertices of the second end surface ES2; the number, the positions, and the like of the vertices P provided between the first end surface ES1 and the second end surface ES2; the positions, and the inclinations, the curvatures, and the like of the first to third ridgelines L1 to L3 connecting these vertices. Thus, by optimizing the conditions mentioned above, the shock absorber exhibiting a desired shock absorbing function can be achieved.

First to Third Modifications

The following describes structural characteristics as particularly effective factors for enhancing the shock absorbing performance in specifically designing the shock absorber described above. The shock absorbers 1B to 1D according to the first to third modifications described below are based on the above-described shock absorber 1A according to the present embodiment to which various structural (shape-related) modifications are made.

Figure 3:
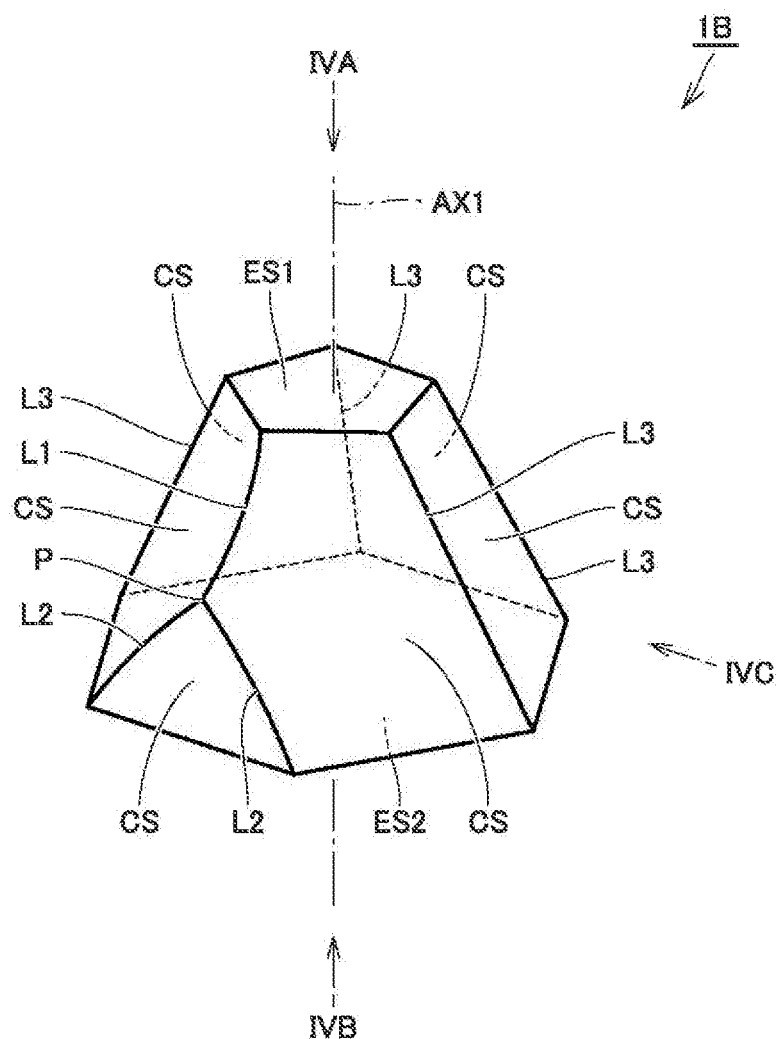
FIG. 3 is a perspective view of a shock absorber according to a first modification.
Figure 4A:
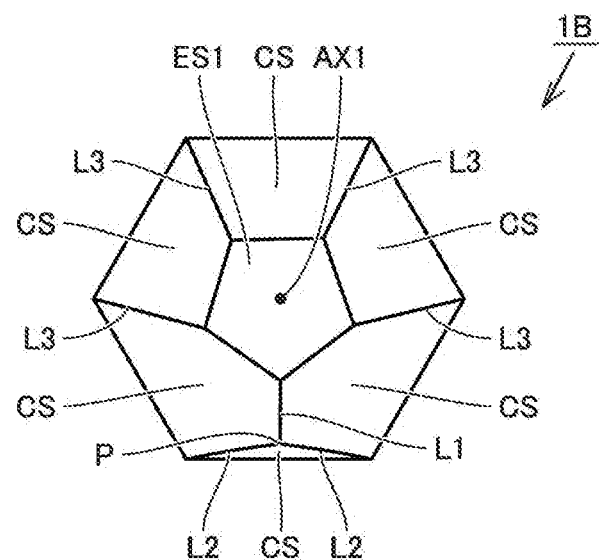
FIGS. 4A-4C illustrate a plan view, a bottom view, and a side view of the shock absorber shown in FIG. 3.
Figure 4B:
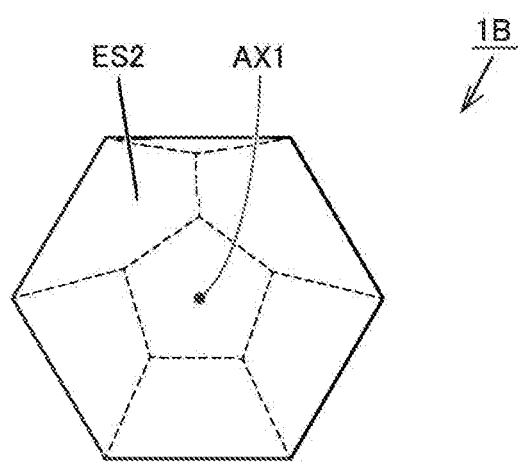
Figure 4C:
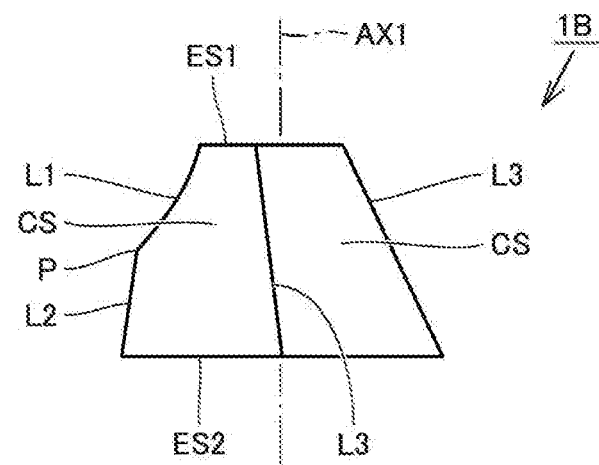

FIG. 3 is a perspective view of a shock absorber according to the first modification. FIG. 4A is a plan view of the shock absorber viewed in the direction indicated by an arrow IVA shown in FIG. 3. FIG. 4B is a bottom view of the shock absorber viewed in the direction indicated by an arrow IVB shown in FIG. 3. FIG. 4C is a side view of the shock absorber viewed in the direction indicated by an arrow IVC shown in FIG. 3.

As shown in FIGS. 3 and FIGS. 4A to 4C, in the shock absorber 1B according to the first modification, the area of the first end surface ES1 is reduced without changing the position of the vertex P as compared with the shock absorber 1A described above. In this case, the first ridgeline L1 and the third ridgelines L3 are inclined more than those of the shock absorber 1A described above, so that the shock absorber 1B has a tapered shape whose cross-sectional area decreases toward the first end surface ES1.

In the case of the shock absorber 1B described above, as the first ridgeline L1 and the third ridgelines L3 are inclined more than those of the shock absorber 1A, shear deformation is more likely to occur upon receipt of a load in the axial direction. Thus, as shear deformation is more likely to occur, the amount of deformation per volume is increased correspondingly, so that high deformability is achieved accordingly. Therefore, the shock absorber 1B according to the present modification can provide a lightweight shock absorber exhibiting a higher shock absorbing function than that of the shock absorber 1A. In other words, the shock absorbing function can be enhanced by increasing the area difference between the first end surface ES1 and the second end surface ES2.

Figure 6A:
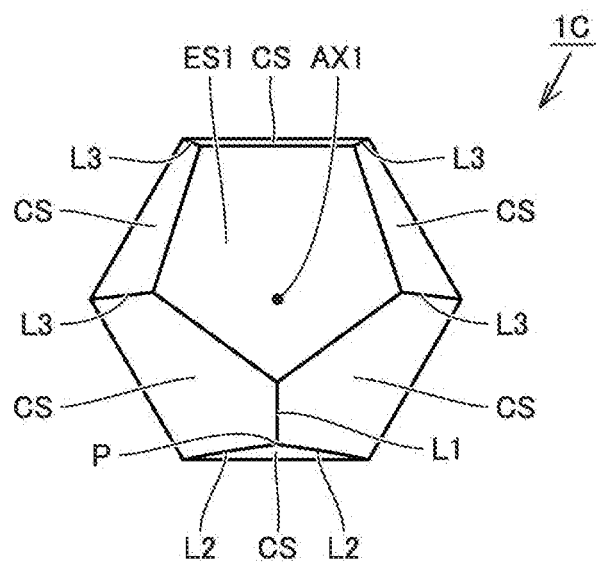
FIGS. 6A-6C illustrate a plan view, a bottom view, and a side view of the shock absorber shown in FIG. 5.
Figure 6B:
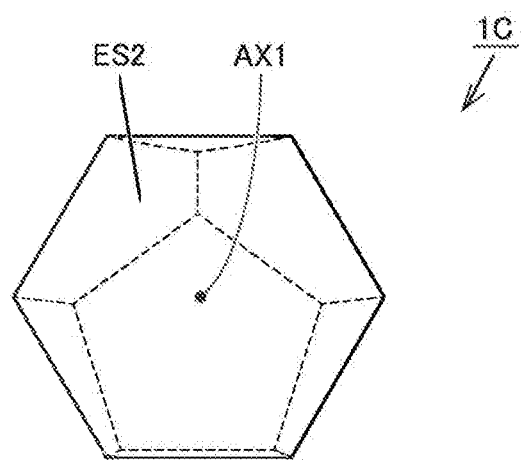
Figure 6C:
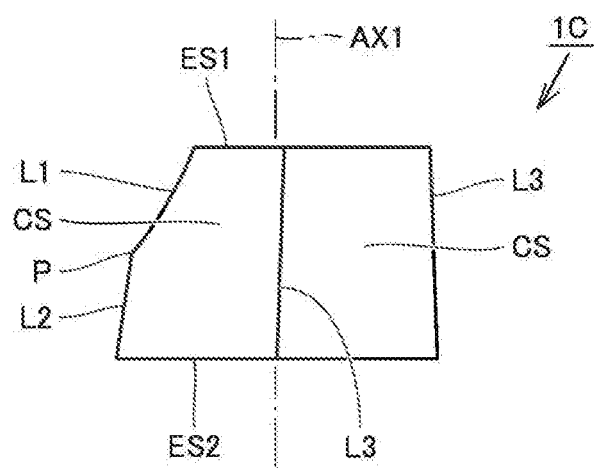

FIG. 5 is a perspective view of a shock absorber according to the second modification. FIG. 6A is a plan view of the shock absorber viewed in the direction indicated by an arrow VIA shown in FIG. 5. FIG. 6B is a bottom view of the shock absorber viewed in the direction indicated by an arrow VIB shown in FIG. 5. FIG. 6C is a side view of the shock absorber viewed in the direction indicated by an arrow VIC shown in FIG. 5.

As shown in FIG. 5 and FIGS. 6A to 6C, in a shock absorber 1C according to the second modification, the position of the vertex P is not changed but the position of the first end surface ES1 is moved in the direction away from the vertex P as compared with the shock absorber 1A described above. In this case, the first ridgeline L1 is inclined more than that of the shock absorber 1A, so that the shock absorber 1C has a shape entirely inclined in one direction.

In the case of the shock absorber 1C described above, as the first ridgeline L1 is inclined more than that of the shock absorber 1A described above, shear deformation is more likely to occur upon receipt of a load in the axial direction. Thus, as shear deformation is more likely to occur, the amount of deformation per volume is increased correspondingly, so that high deformability is achieved accordingly. Therefore, the shock absorber 1C according to the present modification can provide a lightweight shock absorber exhibiting a higher shock absorbing function than that of the shock absorber 1A. In other words, the shock absorbing function can be enhanced by unevenly positioning the first end surface ES1 and the second end surface ES2 in the direction intersecting with the axial direction.

Figure 7:
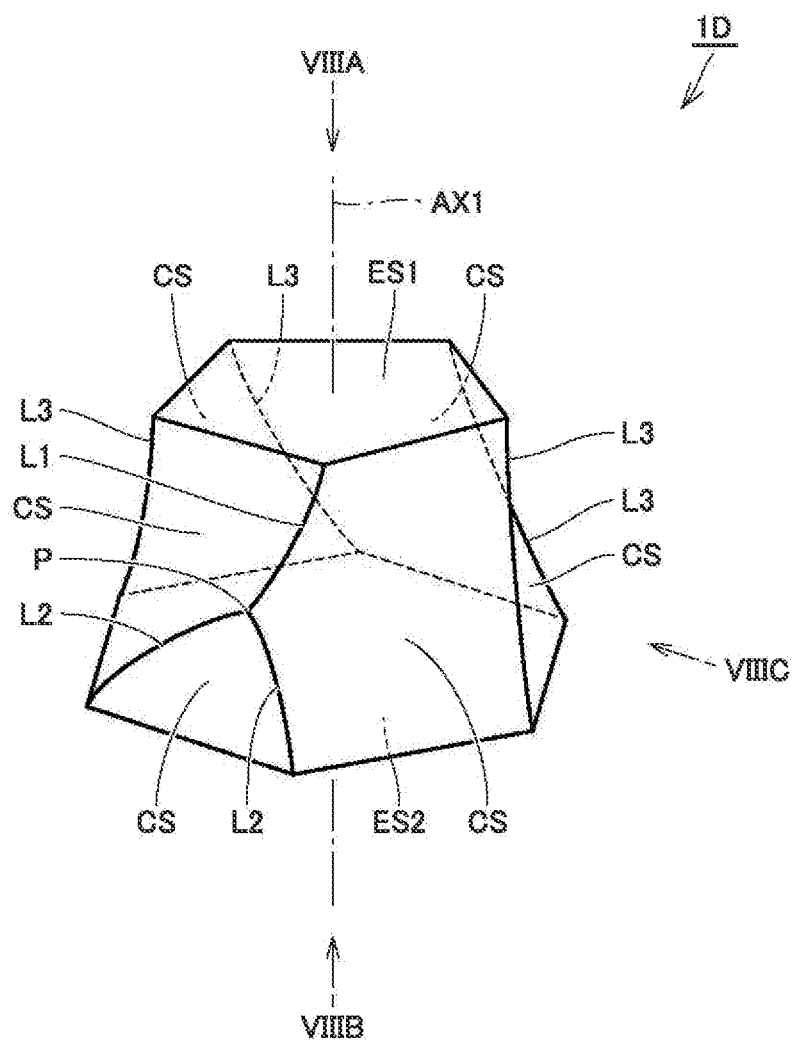
FIG. 7 is a perspective view of a shock absorber according to a third modification.
Figure 8A:
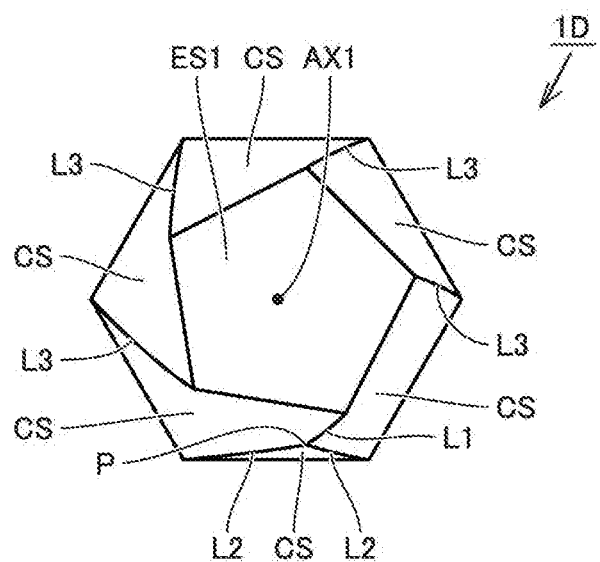
FIGS. 8A-8C illustrate is a plan view, a bottom view, and a side view of the shock absorber shown in FIG. 7.
Figure 8B:
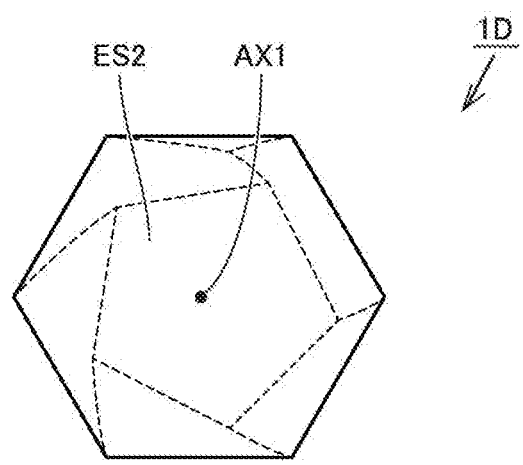
Figure 8C:
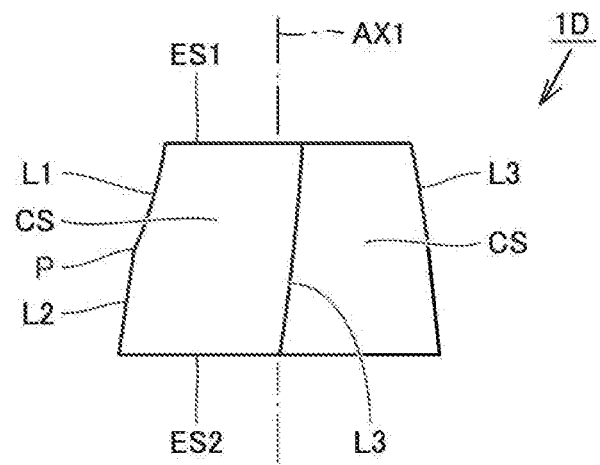

FIG. 7 is a perspective view of a shock absorber according to the third modification. FIG. 8A is a plan view of the shock absorber viewed in the direction indicated by an arrow VIIIA shown in FIG. 7. FIG. 8B is a bottom view of the shock absorber viewed in the direction indicated by an arrow VIIIB shown in FIG. 7. FIG. 8C is a side view of the shock absorber viewed in the direction indicated by an arrow VIIIC shown in FIG. 7.

As shown in FIG. 7 and FIGS. 8A to 8C, in the shock absorber 1D according to the third modification, the first ridgeline L1 and the third ridgelines L3 are inclined in the same direction around the axial line AX1 as compared with the shock absorber 1A described above. In this case, the first ridgeline L1 and the third ridgelines L3 are inclined more than those of the shock absorber 1A, so that the shock absorber 1D has an entirely twisted shape.

In the case of the shock absorber 1D described above, as the first ridgeline L1 and the third ridgelines L3 are inclined more than those of the shock absorber 1A described above, shear deformation is more likely to occur upon receipt of a load in the axial direction. Thus, as shear deformation is more likely to occur, the amount of deformation per volume is increased correspondingly, so that high deformability is achieved accordingly. Therefore, the shock absorber 1D according to the present modification can provide a lightweight shock absorber exhibiting a higher shock absorbing function than that of the shock absorber 1A. In other words, the shock absorbing function can be enhanced by twisting of the shock absorber 1D.

In the above description of the present embodiment, by way of example, all of the first ridgeline L1 and the third ridgelines L3 are inclined in the same direction around the axial line AX1, but not all of the first ridgeline L1 and the third ridgelines L3 have to be inclined. Even when only some of the first ridgeline L1 and the third ridgelines L3 are inclined, a considerable effect can still be achieved.

In addition, the shock absorbing function can be enhanced by increasing the external dimension of the shock absorber in the axial direction. As an aspect ratio in this case, LV/LH is preferably 0.2 or more and 2.0 or less assuming that the maximum external dimension of the shock absorber in the axial direction is defined as LV and the maximum external dimension of the shock absorber in the direction orthogonal to the axial direction is defined as LH. In this case, the rigidity of the shock absorber is proportional to its cross-sectional area in the direction orthogonal to the axial direction and inversely proportional to the external dimension in the axial direction. Thus, in particular, when LV/LH is set to be greater than 1.0 and 2.0 or less, the shock absorber entirely has a longitudinally elongated shape, so that the shock absorbing function can be enhanced while ensuring the stability.

Further, the first ridgeline provided in the shock absorber is formed in a curved shape recessed toward the central portion of the shock absorber, or the second ridgeline provided in the shock absorber is formed in a curved shape protruding outward of the shock absorber, and thereby, the shock absorbing function can also be enhanced.

Second Embodiment

Figure 9:
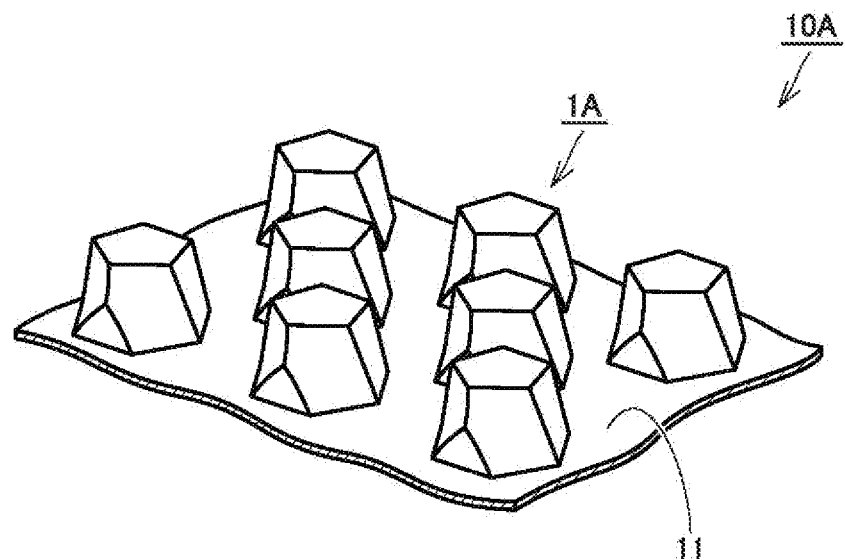
FIG. 9 is a partially cutaway perspective view of a shock absorbing structure according to a second embodiment.

FIG. 9 is a partially cutaway perspective view of a shock absorbing structure according to the second embodiment. The following describes a shock absorbing structure 10A according to the present embodiment with reference to FIG. 9.

As shown in FIG. 9, the shock absorbing structure 10A includes a plurality of shock absorbers 1A according to the first embodiment described above. More specifically, the shock absorbing structure 10A includes a support member 11 having a thin plate shape and a plurality of shock absorbers 1A disposed on the support member 11.

The support member 11 supports the plurality of shock absorbers 1A such that the plurality of shock absorbers 1A are integrated together. The plurality of shock absorbers 1A are bonded to the support member 11, for example, by adhesion or welding. The plurality of shock absorbers 1A are arranged on the support member 11 in a regular manner (in a staggered manner in the illustrated example), for example, according to a prescribed rule.

In this case, the support member 11 can be made of the same material as that of the shock absorber 1A or can be made of a material different from that of the shock absorber 1A. The support member 11 can be flexible or cannot be easily deformed.

The shock absorbing structure 10A as described above can exhibit a high shock absorbing function over a wider range. Further, by integrating the plurality of shock absorbers 1A together by the support member 11, not only the handling thereof can be facilitated, but also the positional displacement of the shock absorbers 1A can be prevented. This can result in a shock absorbing structure that can be readily installed and can reliably achieve the desired shock absorbing performance.

In the above description of the present embodiment, by way of example, a plurality of shock absorbers are disposed on a single support member, but a plurality of shock absorbers can be sandwiched between a pair of support members.

Further, an opening can be provided as required in a region of the support member where no shock absorber is disposed.

Further, instead of integrating the plurality of shock absorbers together by a support member formed of a member different from that of the plurality of shock absorbers, a coupling portion can be provided integrally with the plurality of shock absorbers such that the end portions of the plurality of shock absorbers in the axial direction are coupled to each other by the coupling portion. Such a configuration can be implemented, for example, by injection molding using a mold, additive manufacturing using a three-dimensional additive manufacturing apparatus, thermoforming (press forming) using a mold, additive manufacturing by cutting, and the like.

Third Embodiment

Figure 10:
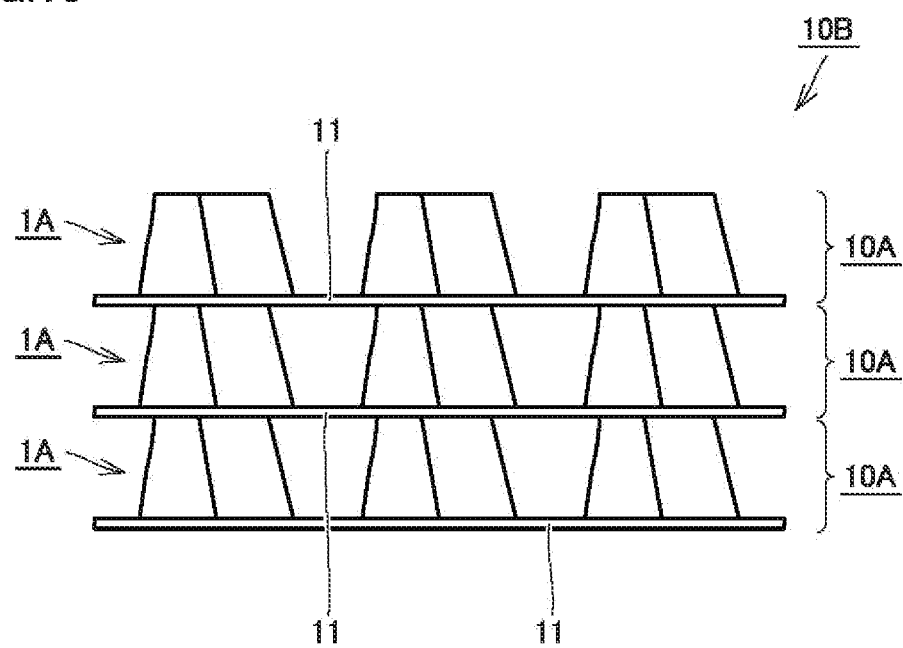
FIG. 10 is a partially cutaway side view of a shock absorbing structure according to a third embodiment.

FIG. 10 is a partially cutaway side view of a shock absorbing structure according to the third embodiment. The following describes a shock absorbing structure 10B according to the present embodiment with reference to FIG. 10.

As shown in FIG. 10, the shock absorbing structure 10B includes a plurality of shock absorbing structures 10A according to the second embodiment described above. More specifically, the shock absorbing structure 10B is formed by stacking, in multiple stages, the shock absorbing structures 10A each including a thin plate-shaped support member 11 and a plurality of shock absorbers 1A.

In this case, the shock absorbing structures 10A stacked and thereby coming into contact with each other can be bonded to each other by adhesion or welding, or can be simply stacked without being bonded to each other. However, when the shock absorbing structures 10A are bonded to each other, not only the handling thereof can be facilitated, but also the positional displacement between the shock absorbing structures 10A can be prevented.

As described above, when the shock absorber 1A is increased in external dimension in the axial direction, its shock absorbing function can be enhanced. However, when the shock absorber 1A is extremely increased in external dimension in the axial direction, it can become inferior in stability and durability.

In this regard, when the shock absorbing structure 10B is formed by stacking the shock absorbing structures 10A each including the thin plate-like support member 11 and the plurality of shock absorbers 1A as in the present embodiment, the resultant shock absorbing structure can be further enhanced in shock absorbing function while being improved in stability and durability.

Fourth Embodiment

Figure 11:
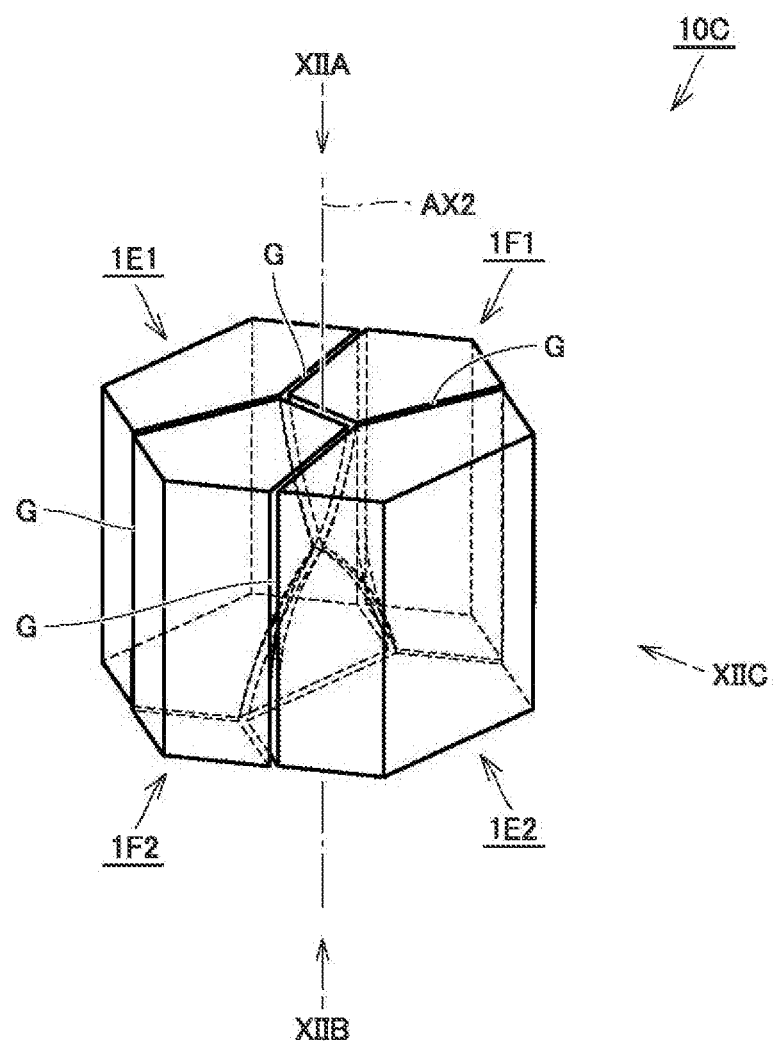
FIG. 11 is a perspective view of a shock absorbing structure according to a fourth embodiment.
Figure 12A:
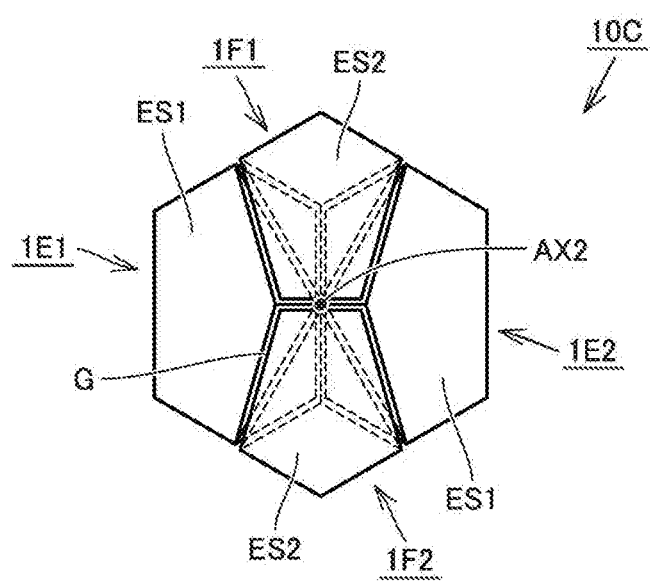
FIGS. 12A to 12C illustrates a plan view, a bottom view, and a side view of the shock absorbing structure shown in FIG. 11.
Figure 12B:
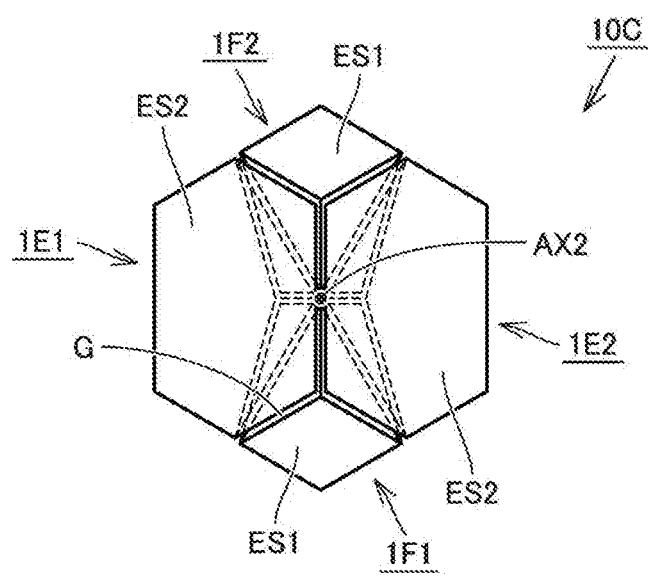
Figure 12C:
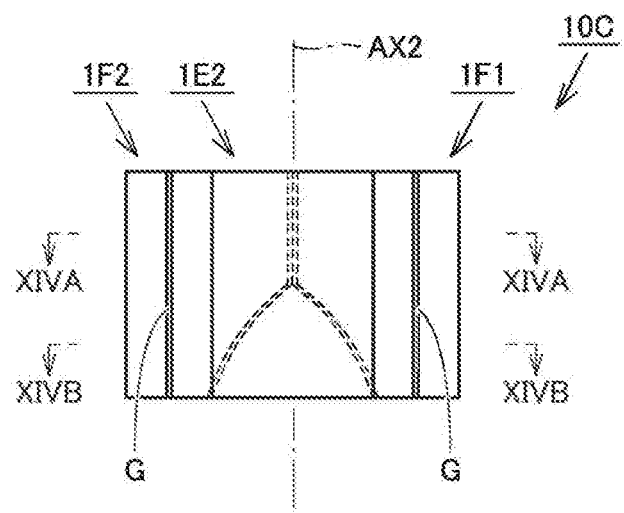
Figure 13:
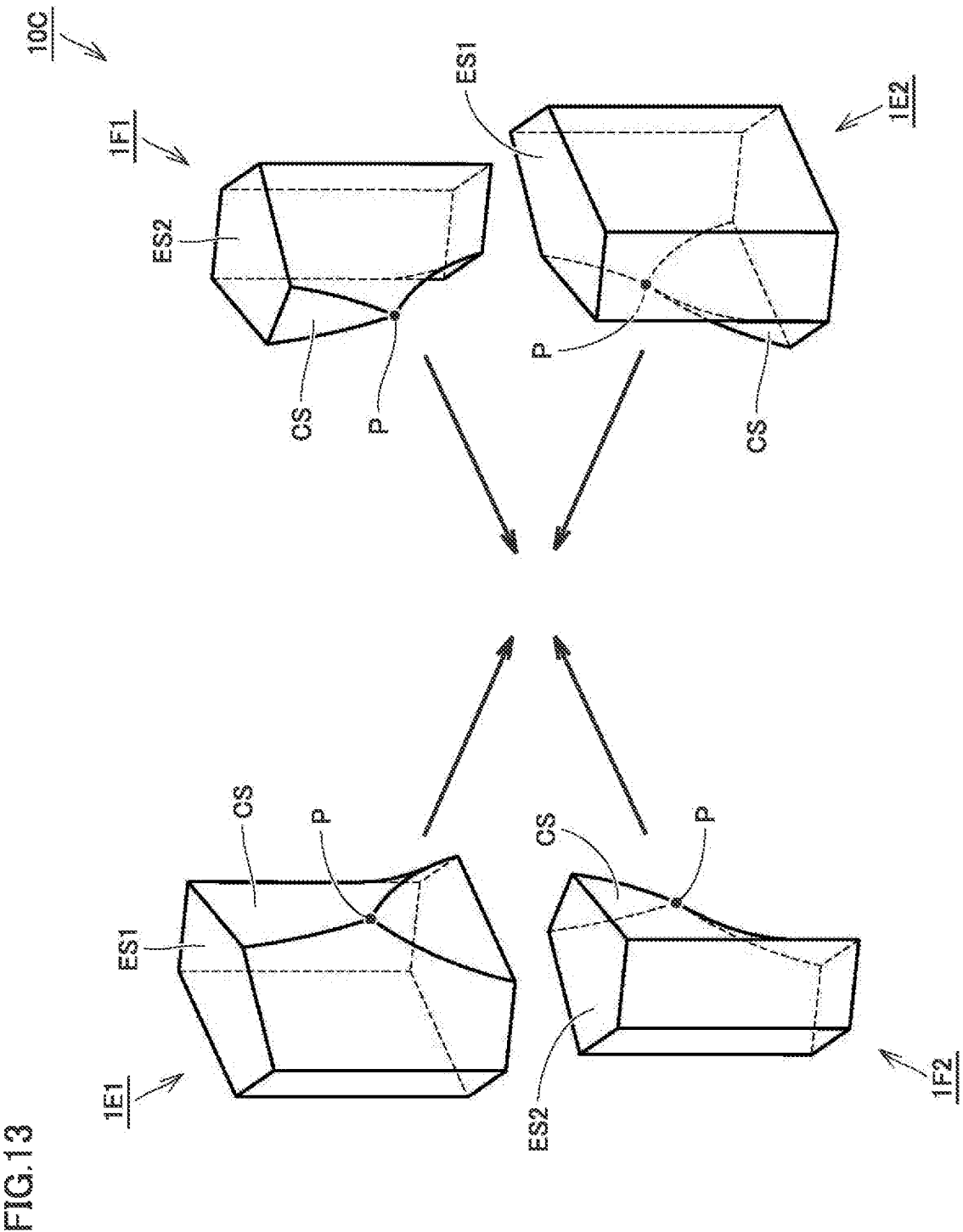
FIG. 13 is an exploded perspective view of the shock absorbing structure shown in FIG. 11.
Figure 14A:
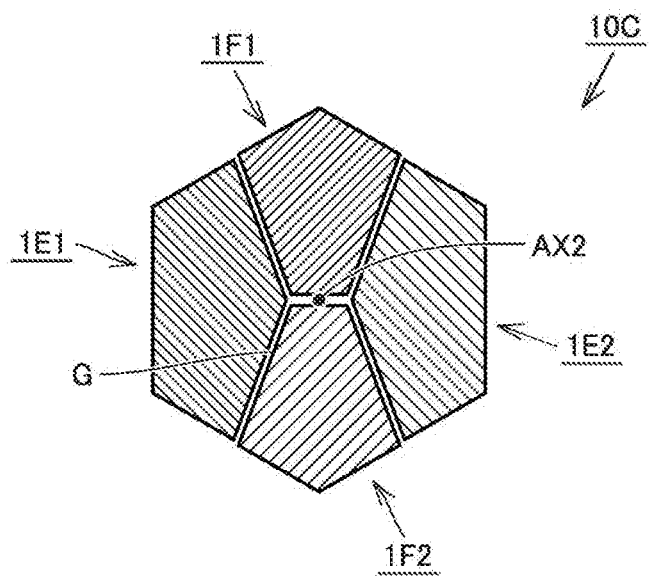
FIG. 14A and FIG. 14B illustrate a schematic cross-sectional view of the shock absorbing structure shown in FIG. 11.
Figure 14B:
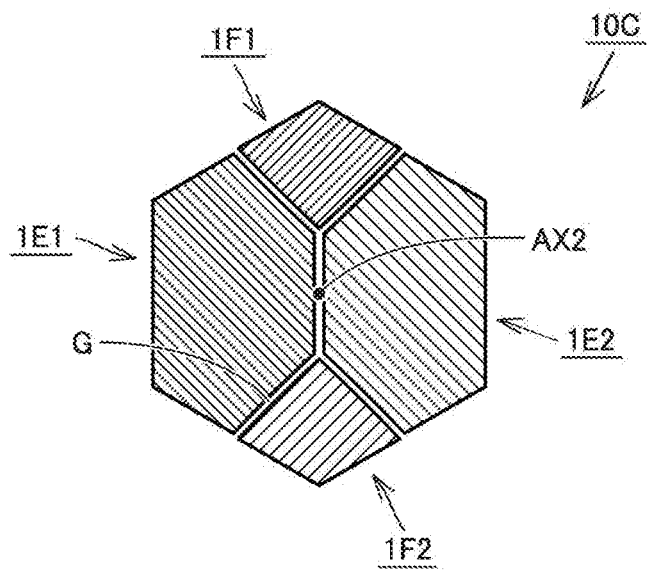

FIG. 11 is a perspective view of a shock absorbing structure according to the fourth embodiment. FIG. 12A is a plan view of the shock absorbing structure viewed in the direction indicated by an arrow XIIA shown in FIG. 11. FIG. 12B is a bottom view of the shock absorbing structure viewed in the direction indicated by an arrow XIIB shown in FIG. 11. FIG. 12C is a side view of the shock absorbing structure viewed in the direction indicated by an arrow XIIC shown in FIG. 11. FIG. 13 is an exploded perspective view of the shock absorbing structure shown in FIG. 11. FIG. 14A is a schematic cross-sectional view of the shock absorbing structure shown in FIG. 12C, which is taken along a line XIVA-XIVA. FIG. 14B is a schematic cross-sectional view of the shock absorbing structure shown in, which is taken along a line XIVB-XIVB. The following describes a shock absorbing structure 10C according to the present embodiment with reference to FIGS. 11, 12A to 12C, 13, 14A, and 14B.

As shown in FIGS. 11, 12A to 12B, 13, 14A, and 14B, the shock absorbing structure 10C includes a shock absorbing unit unitized by combining a plurality of shock absorbers. In the present embodiment, the shock absorbing unit is formed of four shock absorbers in total including two first shock absorbers 1E1 and 1E2 and two second shock absorbers 1F1 and 1F2.

The first shock absorbers 1E1 and 1E2 and the second shock absorbers 1F1 and 1F2 are different in number of M and N described above but each are configured basically based on the shock absorber 1A according to the first embodiment described above.

More specifically, each of the first shock absorbers 1E1 and 1E2 is formed of a column-shaped member having an outer surface defined by the first end surface ES1, the second end surface ES2, and the plurality of connection surfaces CS. The first end surface ES1 is a flat surface having a pentagonal outer shape when viewed in the axial direction. The second end surface ES2 is a flat surface having a hexagonal outer shape when viewed in the axial direction. In other words, N represents 5 and M represents 6 in the first shock absorbers 1E1 and 1E2.

A vertex P is provided at an intermediate position between the first end surface ES1 and the second end surface ES2 of each of the first shock absorbers 1E1 and 1E2. Thereby, each of the first shock absorbers 1E1 and 1E2 has one first ridgeline LI, two second ridgelines L2, and four third ridgelines L3. Further, each of the first shock absorbers 1E1 and 1E2 has six connection surfaces CS in total that are defined by the one first ridgeline L1, the two second ridgelines L2, and the four third ridgelines L3.

Each of the second shock absorbers 1F1 and 1F2 is formed of a column-shaped member having an outer surface defined by the first end surface ES1, the second end surface ES2, and the plurality of connection surfaces CS. The first end surface ES1 is a flat surface having a quadrangular outer shape when viewed in the axial direction. The second end surface ES2 is a flat surface having a pentagonal outer shape when viewed in the axial direction. In other words, N represents 4 and M represents 5 in the second shock absorbers 1F1 and 1F2.

A vertex P is disposed at an intermediate position between the first end surface ES1 and the second end surface ES2 of each of the second shock absorbers 1F1 and 1F2. Thereby, each of the second shock absorbers 1F1 and 1F2 has one first ridgeline L1, two second ridgelines L2, and three third ridgelines L3. Further, each of the second shock absorbers 1F1 and 1F2 has five connection surfaces CS in total that are defined by the one first ridgeline L1, the two second ridgelines L2, and the three third ridgelines L3.

The first shock absorbers 1E1 and 1E2 and the second shock absorbers 1E1 and 1F2 are disposed alternately in the circumferential direction of the shock absorbing unit. Thereby, the first shock absorbers 1E1 and 1E2 and the second shock absorbers 1E1 and 1F2 in the combined state are located side by side so as to surround an axial line AX2 of the shock absorbing unit.

In this case, the first shock absorbers 1E1 and 1E2 are oriented opposite in the axial direction to the second shock absorbers 1F1 and 1F2. In other words, the first end surface ES1 of each of the first shock absorbers 1E1 and 1E2 is located flush with the second end surface ES2 of each of the second shock absorbers 1F1 and 1F2. Also, the second end surface ES2 of each of the first shock absorbers 1E1 and 1E2 is located flush with the first end surface ES1 of each of the second shock absorbers 1F1 and 1F2.

Further, the first shock absorbers 1E1 and 1E2 and the second shock absorbers 1F1 and 1F2 each including the plurality of connection surfaces CS are disposed adjacent to each other such that, among the plurality of connection surfaces CS, the connection surfaces each defined by the first ridgeline L1 and the second ridgelines L2 face each other with a gap G interposed therebetween. Thereby, the vertices P of the first shock absorbers 1E1, 1E2 and the second shock absorbers 1F1, 1F2 face each other.

In the present embodiment, the outer shapes of the first shock absorbers 1E1 and 1E2 and the second shock absorbers 1F1 and 1F2 are configured to be fitted to each other with the above-mentioned gap G interposed therebetween. Further, the sizes of the gaps G provided between any pair of the first shock absorbers 1E1, 1E2 and the second shock absorbers 1F1, 1F2 are substantially the same at any position.

By the configuration as described above, in the state in which the first shock absorbers 1E1 and 1E2 and the second shock absorbers 1F1 and 1F2 are combined with one another, the shock absorbing unit (i.e., the shock absorbing structure 10C) entirely has an outer shape of a substantially hexagonal column shape.

Due to the structural characteristics (shape-related characteristics) of the shock absorbing structure 10C according to the present embodiment, the shock absorbing structure 10C can exhibit a high shock absorbing function in the axial direction in which the axial line AX2 of the shock absorbing unit extends, and also, can be disposed in the state in which a plurality of shock absorbers are highly densely mounted in the direction orthogonal to the axial line AX2.

In other words, as described in the above first embodiment, each of the first shock absorbers 1E1 and 1E2 and the second shock absorbers 1F1 and 1F2 provided as the plurality of shock absorbers is shaped such that shear deformation is more likely to occur upon receipt of a load in the axial direction. Thus, the amount of deformation per volume is increased correspondingly, so that a lightweight shock absorbing structure exhibiting a high shock absorbing function can be achieved.

Further, the first shock absorbers 1E1 and 1E2 and the second shock absorbers 1F1 and 1F2 are disposed close to each other due to the sufficiently small gaps G disposed therebetween, and thus, can be highly densely mounted as described above and can be reduced in volume where these shock absorbers occupy, thereby contributing to size reduction. Note that the size of each gap G is not particularly limited, but can be suitably about 2 mm when the shock absorbing unit is applied to a shoe sole as presented in any one of the fourteenth to seventeenth embodiments described later and a shoe including the shoe sole.

Therefore, by the shock absorbing structure 10C according to the present embodiment, a lightweight shock absorbing structure exhibiting a high shock absorbing function can be further reduced in size as compared with the shock absorbing structures 10A and 10B according to the respective ones of the second and third embodiments described above.

Fifth Embodiment

Figure 15:
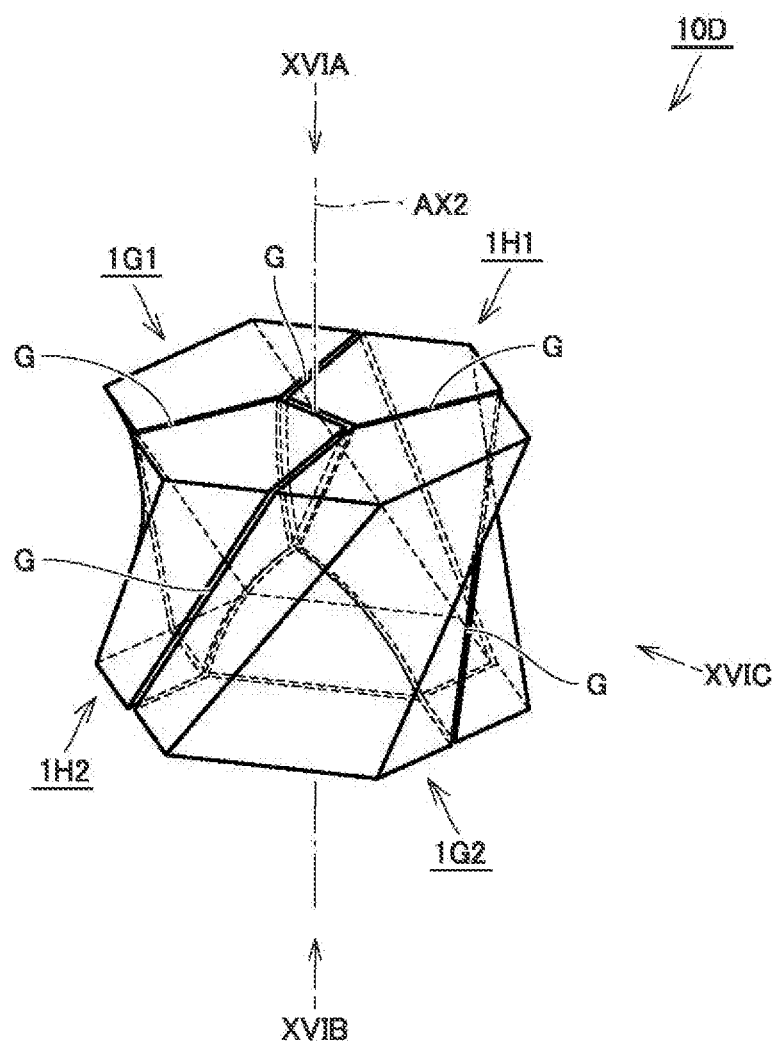
FIG. 15 is a perspective view of a shock absorbing structure according to a fifth embodiment.
Figure 16A:
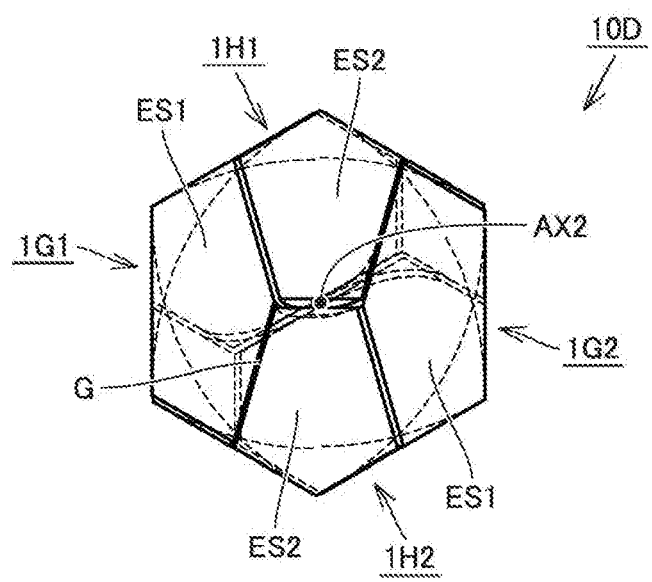
FIGS. 16A-16C illustrate a plan view, a bottom view, and a side view of the shock absorbing structure shown in FIG. 15.
Figure 16B:
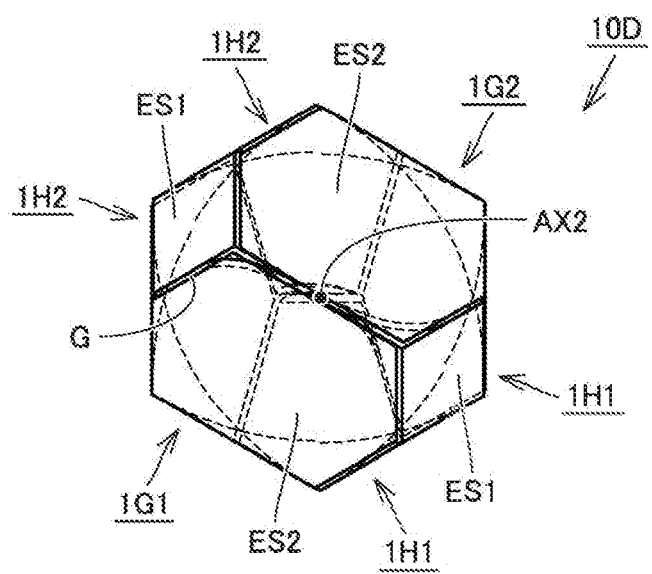
Figure 16C:
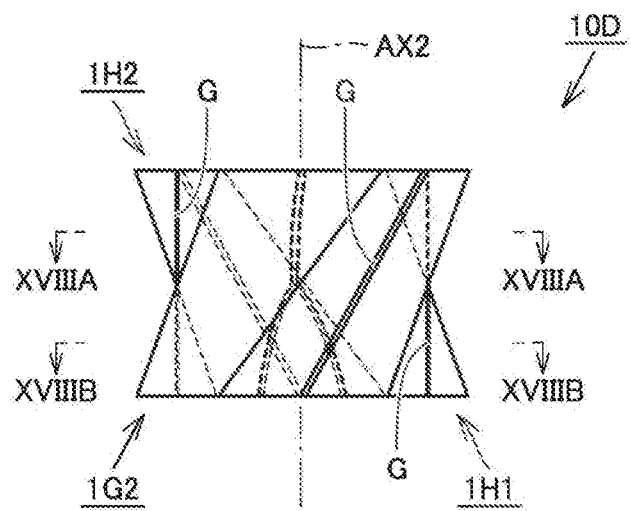
Figure 17:
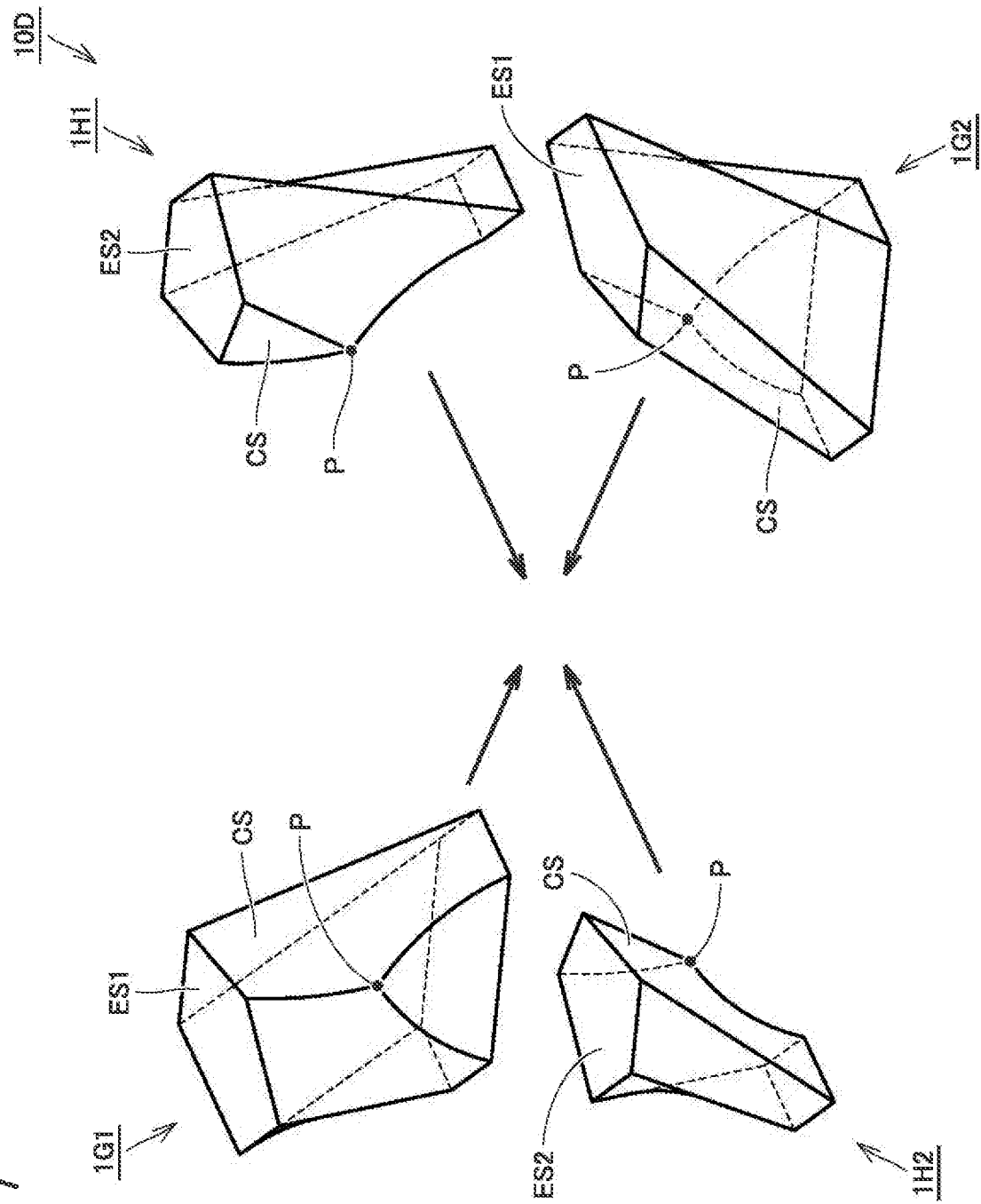
FIG. 17 is an exploded perspective view of the shock absorbing structure shown in FIG. 15.
Figure 18A:
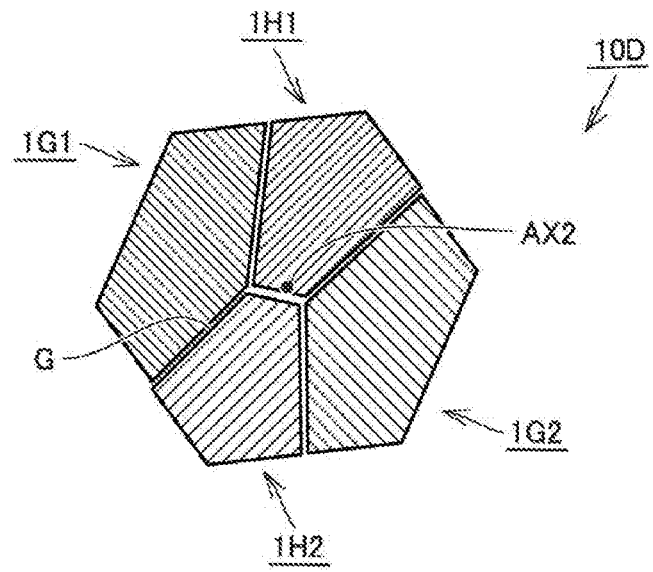
FIGS. 18A and 18B illustrate a schematic cross-sectional view of the shock absorbing structure shown in FIG. 15.
Figure 18B:
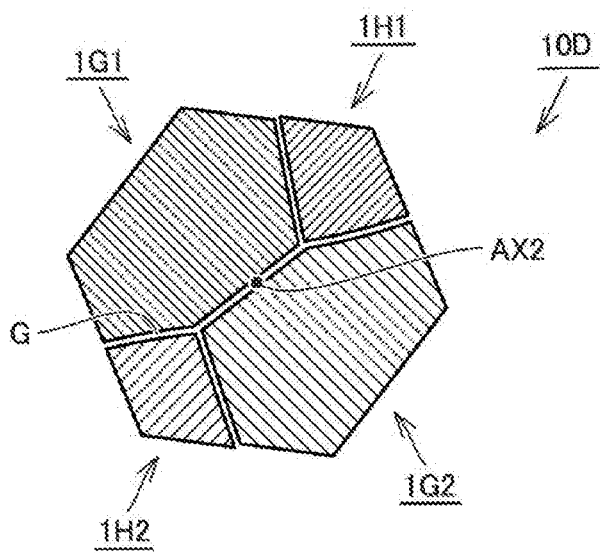

FIG. 15 is a perspective view of a shock absorbing structure according to the fifth embodiment. FIG. 16A is a plan view of the shock absorbing structure viewed in the direction indicated by an arrow XVIA shown in FIG. 15. FIG. 16B is a bottom view of the shock absorbing structure viewed in the direction indicated by an arrow XVIB shown in FIG. 15. FIG. 16C is a side view of the shock absorbing structure viewed in the direction indicated by an arrow XVIC shown in FIG. 15. Further, FIG. 17 is an exploded perspective view of the shock absorbing structure shown in FIG. 15. FIG. 18A is a schematic cross-sectional view of the shock absorbing structure shown in FIG. 16C, which is taken along a line XVIIIA-XVIIIA. FIG. 18B is a schematic cross-sectional view of the shock absorbing structure shown in FIG. 16C, which is taken along a line XVIIIB-XVIIIB. The following describes a shock absorbing structure 10D according to the present embodiment with reference to FIG. 15, FIGS. 16A to 16C, 17, 18A and 18B.

As shown in FIG. 15, FIGS. 15A to 16C, 17, 18A and 18B, in the shock absorbing structure 10D, the first ridgeline L1 and the third ridgelines L3 in each of the first shock absorbers 1G1 and 1G2 and each of the second shock absorbers 1H1 and 1H2 are inclined in the same direction around the axial line AX2 of the shock absorbing unit as compared with the shock absorbing structure 10C according to the fourth embodiment described above. In this case, the first ridgeline L1 and the third ridgelines L3 are inclined more than those in the shock absorbing structure 10C according to the fourth embodiment, so that the shock absorbing unit (i.e., the shock absorbing structure 10D) has an entirely twisted shape.

In the case of the shock absorbing structure 10D described above, as the first ridgeline L1 and the third ridgelines L3 are inclined more than those of the shock absorbing structure 10C according to the above-described fourth embodiment, shear deformation is more likely to occur upon receipt of a load in the axial direction of the shock absorbing unit. Thus, as shear deformation is more likely to occur, the amount of deformation per volume is increased correspondingly, so that high deformability is achieved accordingly. Therefore, the shock absorbing structure 10D according to the present modification can provide a lightweight shock absorber exhibiting a higher shock absorbing function than that of the shock absorbing structure 10C according to the above-described fourth embodiment. In other words, the shock absorbing function can be enhanced by twisting of the shock absorbing unit (i.e., the shock absorbing structure 10D).

In the above description of the present embodiment, by way of example, all of the first ridgeline L1 and the third ridgelines L3 are inclined in the same direction around the axial line AX1, but not all of the first ridgeline L1 and the third ridgelines L3 have to be inclined. Even when only some of the first ridgeline L1 and the third ridgelines L3 are inclined, a considerable effect can still be achieved.

Sixth Embodiment

Figure 19:
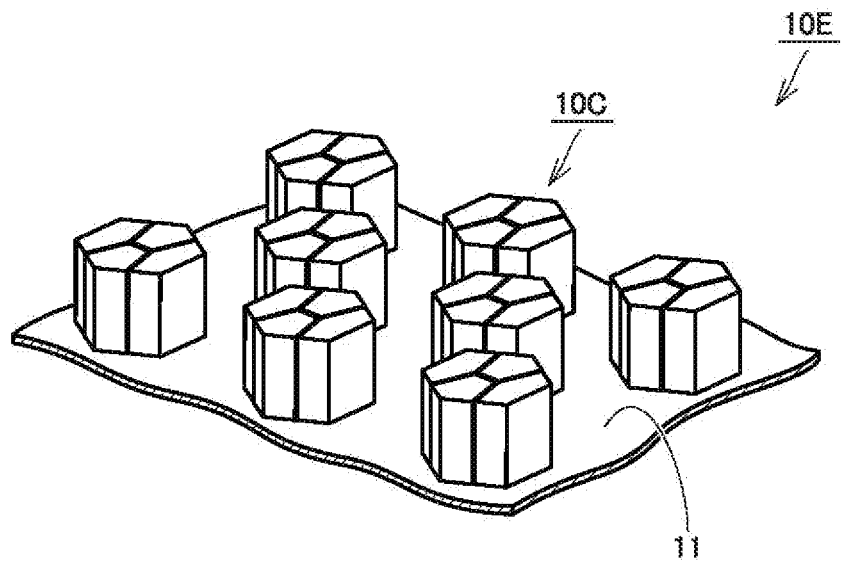
FIG. 19 is a partially cutaway perspective view of a shock absorbing structure according to a sixth embodiment.

FIG. 19 is a partially cutaway perspective view of a shock absorbing structure according to the sixth embodiment. The following describes a shock absorbing structure 10E according to the present embodiment with reference to FIG. 19.

As shown in FIG. 19, the shock absorbing structure 10E includes a plurality of shock absorbing structures 10C each as a shock absorbing unit according to the fourth embodiment described above. More specifically, the shock absorbing structure 10E includes a support member 11 having a thin plate shape and the shock absorbing structures 10C as a plurality of the shock absorbing units disposed on the support member 11.

The support member 11 supports the shock absorbing structures 10C as the plurality of shock absorbing units such that the plurality of shock absorbing units are integrated together. The plurality of shock absorbers included in each of the plurality of shock absorbing units are bonded to the support member 11, for example, by adhesion or welding. The plurality of shock absorbing units are arranged on the support member 11 in a regular manner (in a staggered manner in the illustrated example), for example, according to a prescribed rule.

In this case, the support member 11 can be made of the same material as that of the shock absorber or can be made of a material different from that of the shock absorber. Further, the support member 11 can be flexible or cannot be easily deformed.

The shock absorbing structure 10E as described above can exhibit a high shock absorbing function over a wider range. Further, by integrating the plurality of shock absorbing units together by the support member 11, not only the handling thereof can be facilitated, but also the positional displacement of the shock absorbing units can be prevented. This can result in a shock absorbing structure that can be readily installed and can reliably achieve the desired shock absorbing performance.

In the above description of the present embodiment, by way of example, a plurality of shock absorbing units are disposed on a single support member, but a plurality of shock absorbing units can be sandwiched between a pair of support members. Further, an opening can be provided as required in a region of the support member where no shock absorbing unit is disposed.

Further, instead of integrating together the plurality of shock absorbers included in each of the plurality of shock absorbing units by a support member formed of a member different from that of the plurality of shock absorbers, a coupling portion can be provided integrally with the plurality of shock absorbers included in each of the plurality of shock absorbing units such that the end portions of the plurality of shock absorbers in the axial direction are coupled to each other by the coupling portion. Such a configuration can be implemented, for example, by injection molding using a mold, additive manufacturing using a three-dimensional additive manufacturing apparatus, thermoforming (press forming) using a mold, additive manufacturing by cutting, and the like.

Seventh Embodiment

Figure 20:
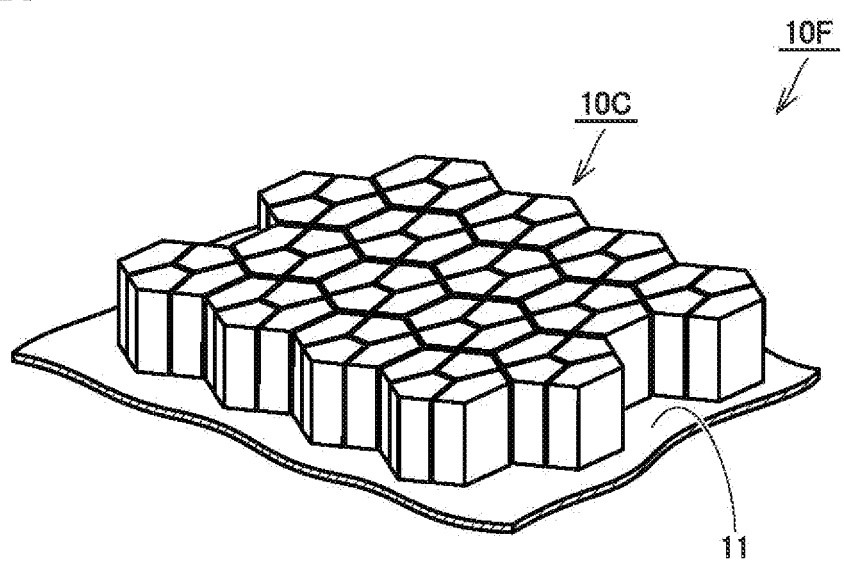
FIG. 20 is a partially cutaway perspective view of a shock absorbing structure according to a seventh embodiment.

FIG. 20 is a partially cutaway perspective view of a shock absorbing structure according to the seventh embodiment. The following describes a shock absorbing structure 10F according to the present embodiment with reference to FIG. 20.

As shown in FIG. 20, the shock absorbing structure 10F is different from the shock absorbing structure 10E according to the above-described sixth embodiment in arrangement of the shock absorbing structures 10C as shock absorbing units disposed on the support member 11. More specifically, the shock absorbing structure 10F is configured to have a honeycomb structure by arranging individual shock absorbing units close to each other such that the shock absorbing structures 10C as the shock absorbing units are highly densely mounted.

In this case, the gap between the shock absorbing structures 10C as the shock absorbing units adjacent to each other can be substantially the same as the above-described gap G provided in the shock absorbing units. Therefore, by arranging the shock absorbing units as described above, the shock absorbing units can be highly densely mounted and can be reduced in volume where these units occupy, thereby contributing to size reduction.

Therefore, by the shock absorbing structure 10F according to the present embodiment, a lightweight shock absorbing structure exhibiting a high shock absorbing function can be further reduced in size as compared with the shock absorbing structure 10C according to the above-described sixth embodiment.

Eighth Embodiment

Figure 21:
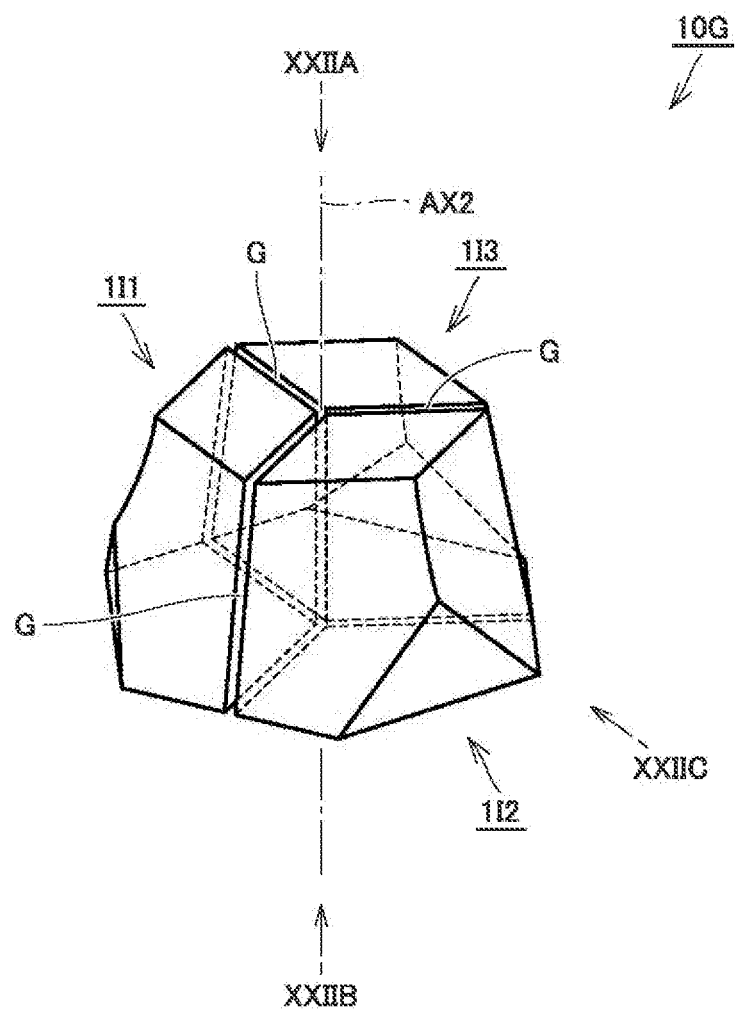
FIG. 21 is a perspective view of a shock absorbing structure according to an eighth embodiment.
Figure 22A:
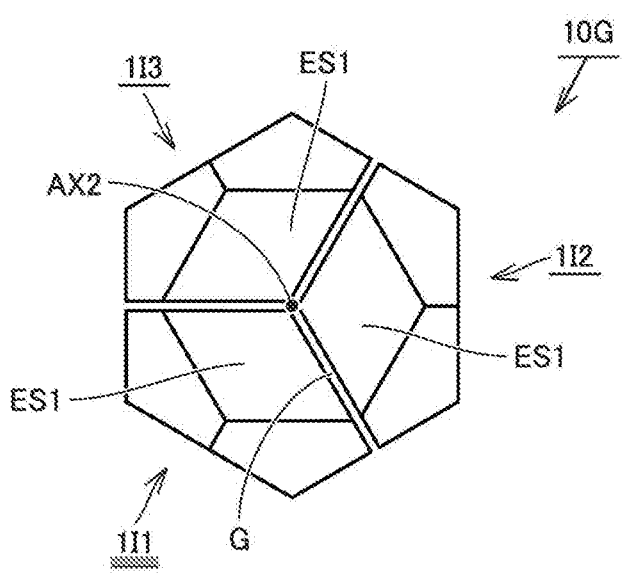
FIGS. 22A-22C illustrate a plan view, a bottom view, and a side view of the shock absorbing structure shown in FIG. 21.
Figure 22B:
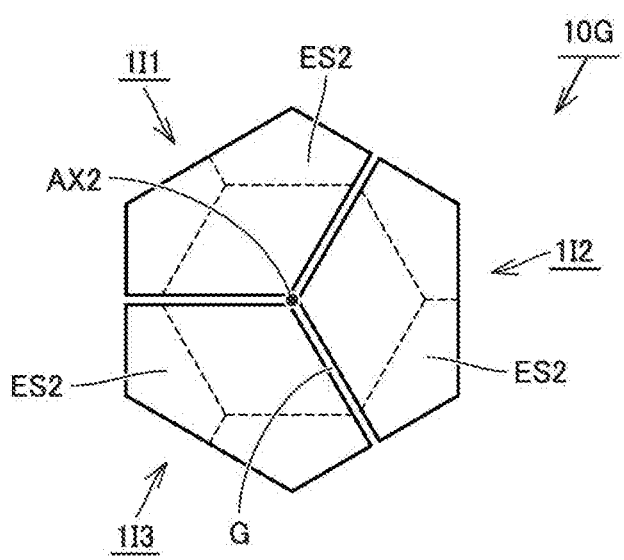
Figure 22C:
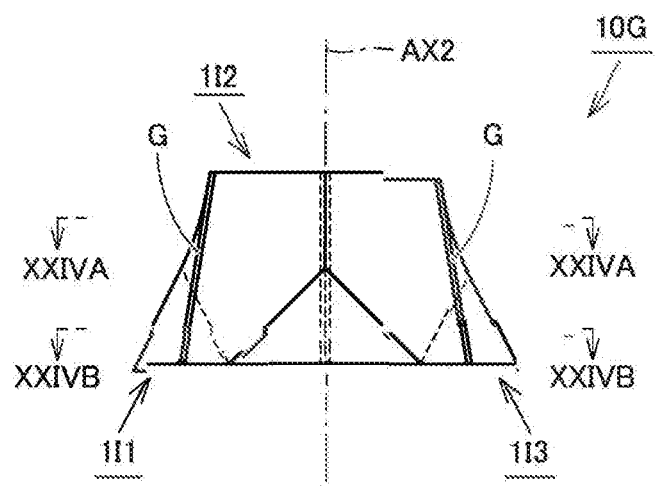
Figure 23:
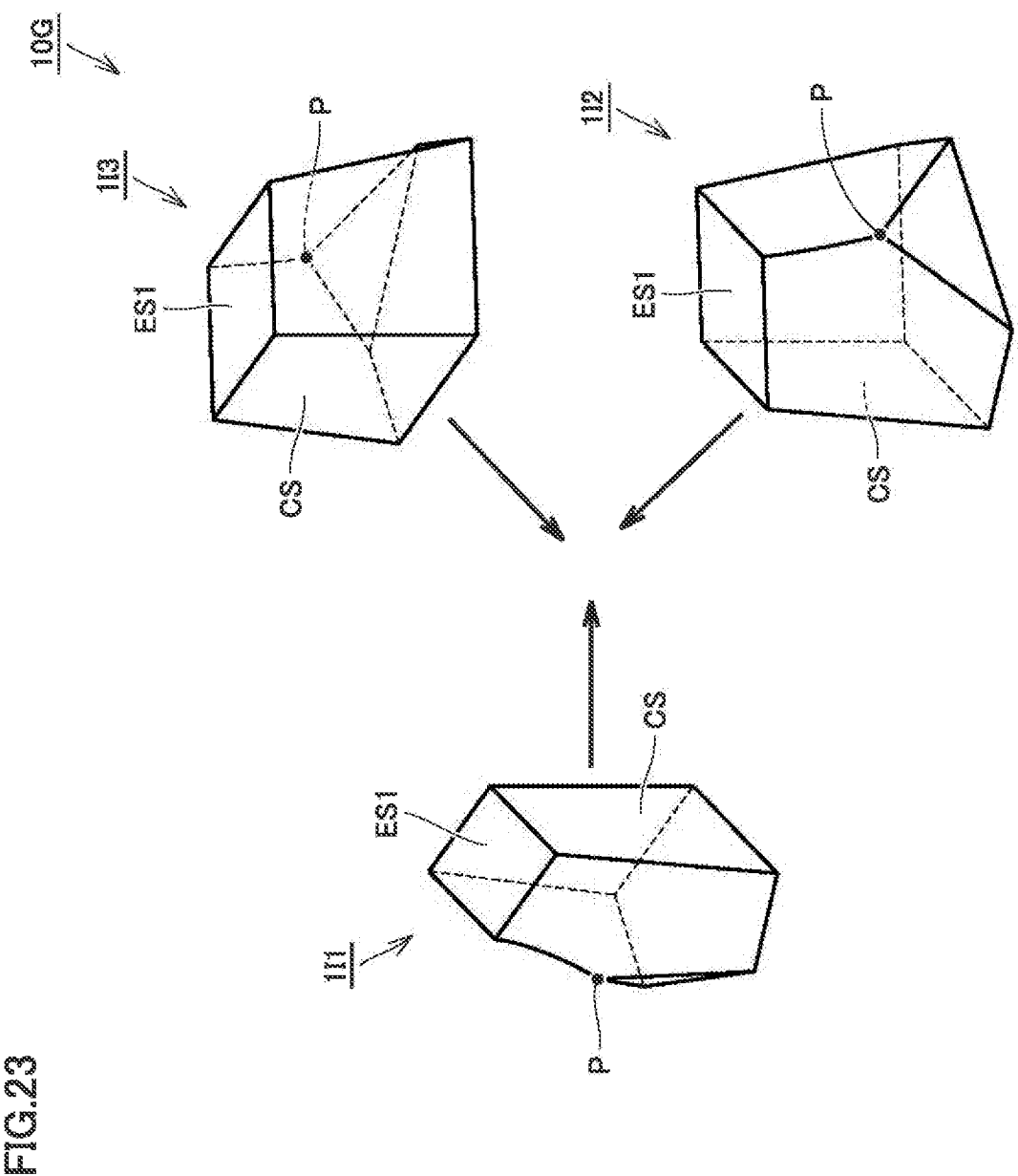
FIG. 23 is an exploded perspective view of the shock absorbing structure shown in FIG. 21.
Figure 24A:
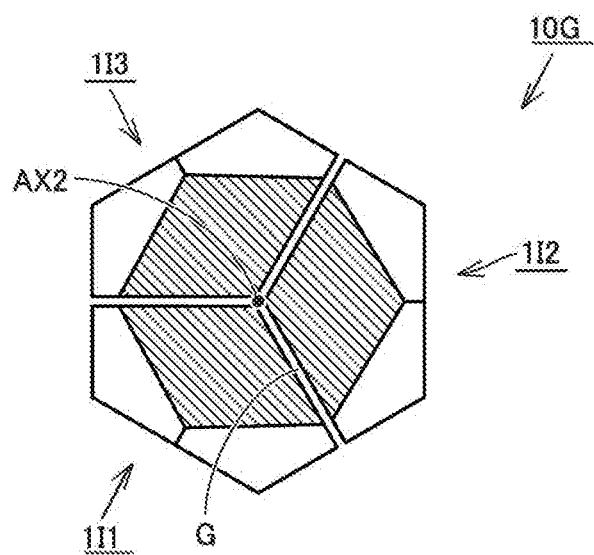
FIGS. 24A and 24B a schematic cross-sectional view of the shock absorbing structure shown in FIG. 21.
Figure 24B:
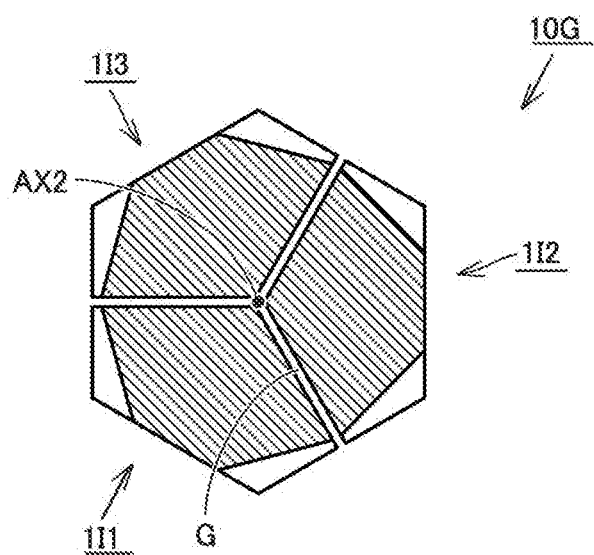

FIG. 21 is a perspective view of a shock absorbing structure according to the eighth embodiment. FIG. 22A is a plan view of the shock absorbing structure viewed in the direction indicated by an arrow XXIIA shown in FIG. 21. FIG. 22B is a bottom view of the shock absorbing structure viewed in the direction indicated by an arrow XXIIB shown in FIG. 21. FIG. 22C is a side view of the shock absorbing structure viewed in the direction indicated by an arrow XXIIC shown in FIG. 21. FIG. 23 is an exploded perspective view of the shock absorbing structure shown in FIG. 21. FIG. 24A is a schematic cross-sectional view of the shock absorbing structure shown in FIG. 22C, which is taken along a line XXIVA-XXIVA. FIG. 24B is a schematic cross-sectional view of the shock absorbing structure shown in FIG. 22C, which is taken along a line XXIVB-XXIVB. The following describes a shock absorbing structure 10G according to the present embodiment with reference to FIGS. 21, 22A to 22C, 23, 24A and 24B.

As shown in FIGS. 21, 22A to 22C, 23, 24A and 24B, the shock absorbing structure 10G includes a shock absorbing unit unitized by combining a plurality of shock absorbers. In the present embodiment, three shock absorbers 1I1, 1I2, and 1I3 constitute a shock absorbing unit.

The shock absorbers 1I1 to 1I3 are different in number of M and N described above but each are configured basically based on the shock absorber 1A according to the first embodiment described above.

More specifically, each of the shock absorbers 1I1 to 1I3 is formed of a column-shaped member having an outer surface defined by the first end surface ES1, the second end surface ES2, and the plurality of connection surfaces CS. The first end surface ES1 is a flat surface having a quadrangular outer shape when viewed in the axial direction. The second end surface ES2 is a flat surface having a pentagonal outer shape when viewed in the axial direction. In other words, N represents 4 and M represents 5 in the shock absorbers 1I1 to 1I3.

A vertex P is provided at an intermediate position between the first end surface ES1 and the second end surface ES2 of each of the shock absorbers 1I1 to 1I3. Thereby, each of the shock absorbers 1I1 to 1I3 has one first ridgeline L1, two second ridgelines L2, and three third ridgelines L3. Further, each of the shock absorbers 1I1 to 1I3 has five connection surfaces CS in total that are defined by the one first ridgeline L1, the two second ridgelines L2, and the three third ridgelines L3.

The shock absorbers 1I1 to 1I3 are disposed in the circumferential direction of the shock absorbing unit. Thus, the shock absorbers 1I1 to 1I3 in the combined state are located side by side so as to surround the axial line AX2 of the shock absorbing unit.

In this case, the orientations of the shock absorbers 1I1 to 1I3 in the axial direction are the same. In other words, the first end surfaces ES1 of the shock absorbers 1I1 to 1I3 are located flush with one another, and the second end surfaces ES2 of the shock absorbers 1I1 to 1I3 are located flush with one another.

Further, the shock absorbers 1I1 to 1I3 each having the plurality of connection surfaces CS are disposed adjacent to each other such that, among the plurality of connection surfaces CS, the connection surfaces defined only by the third ridgelines L3 face each other with a gap G interposed therebetween. Thus, the vertices P of the shock absorbers 1I1 to 1I3 are positioned along the circumferential surface of the shock absorbing unit.

The present embodiment has a configuration in which the outer shapes of the shock absorbers 1I1 to 1I3 face each other with the gap G interposed therebetween, and also, the sizes of the gaps G disposed between the shock absorbers 1I1 to 1I3 are substantially the same at any position.

By the configuration as described above, in the state in which the shock absorbers 1I1 to 1I3 are combined with each other, the shock absorbing unit (i.e., the shock absorbing structure 10G) entirely has a substantially columnar outer shape in which a pair of surfaces located in the axial direction of the shock absorbing unit each have an approximately hexagonal shape.

Due to the structural characteristics (shape-related characteristics) of the shock absorbing structure 10G according to the present embodiment, the shock absorbing structure 10G can exhibit a high shock absorbing function in the axial direction in which the axial line AX2 of the shock absorbing unit extends, and also, can be disposed in the state in which a plurality of shock absorbers are highly densely mounted in the direction orthogonal to the axial line AX2.

In other words, as described in the above first embodiment, each of the plurality of shock absorbers 1I1 to 1I3 is shaped such that shear deformation is more likely to occur upon receipt of a load in the axial direction. Thus, the amount of deformation per volume is increased correspondingly, so that a lightweight shock absorbing structure exhibiting a high shock absorbing function can be achieved.

Further, the shock absorbers 1I1 to 1I3 are disposed close to each other due to the sufficiently small gaps G provided therebetween, and thus, can be highly densely mounted as described above and can be reduced in volume where these shock absorbers occupy, thereby contributing to size reduction. Note that the size of each gap G is not particularly limited, but can be suitably about 2 mm when the shock absorbing unit is applied to a shoe sole as presented in any one of the eighteenth and nineteenth embodiments described later and a shoe including the shoe sole.

Therefore, by the shock absorbing structure 10G according to the present embodiment, a lightweight shock absorbing structure exhibiting a high shock absorbing function can be further reduced in size as compared with the shock absorbing structures 10A and 10B according to the respective ones of the second and third embodiments described above.

In the shock absorbing structure 10G according to the present embodiment, each of the connection surfaces CS that are included in the plurality of shock absorbers 1I1 to 1I3 to be combined and that are disposed to face each other is formed in a single flat surface. By the configuration in this way, any undercut can be prevented from occurring when the shock absorbing structure is manufactured by molding using a mold. Thus, the shock absorbing structure 10G can be manufactured more readily in the case of molding using a mold, as compared with the shock absorbing structure 10C according to the above-described fourth embodiment in which the connection surfaces are formed of a plurality of flat surfaces and a plurality of curved surfaces.

Fourth to Sixth Modifications

Figure 25:
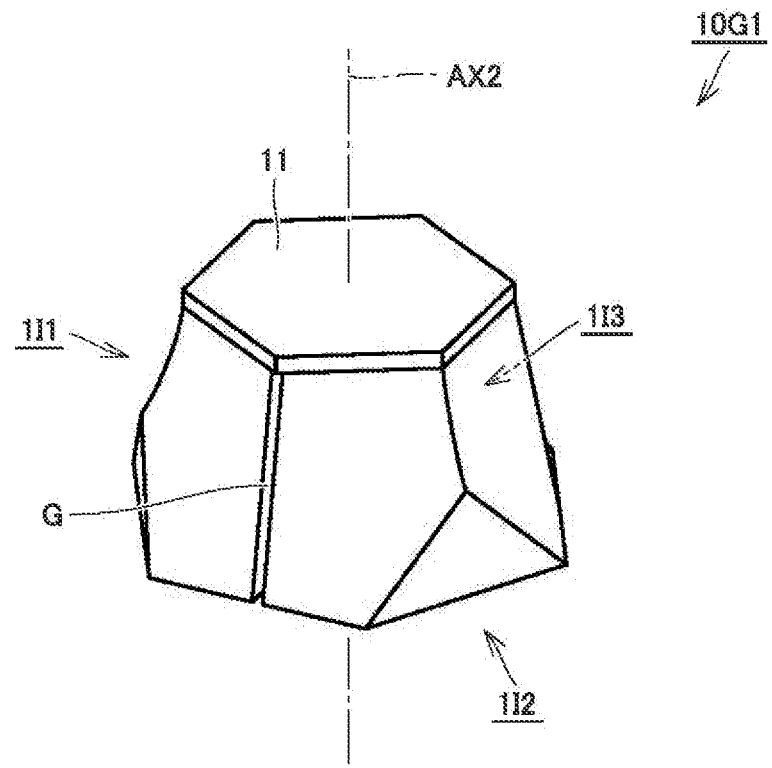
FIG. 25 is a perspective view of a shock absorbing structure according to a fourth modification.
Figure 26:
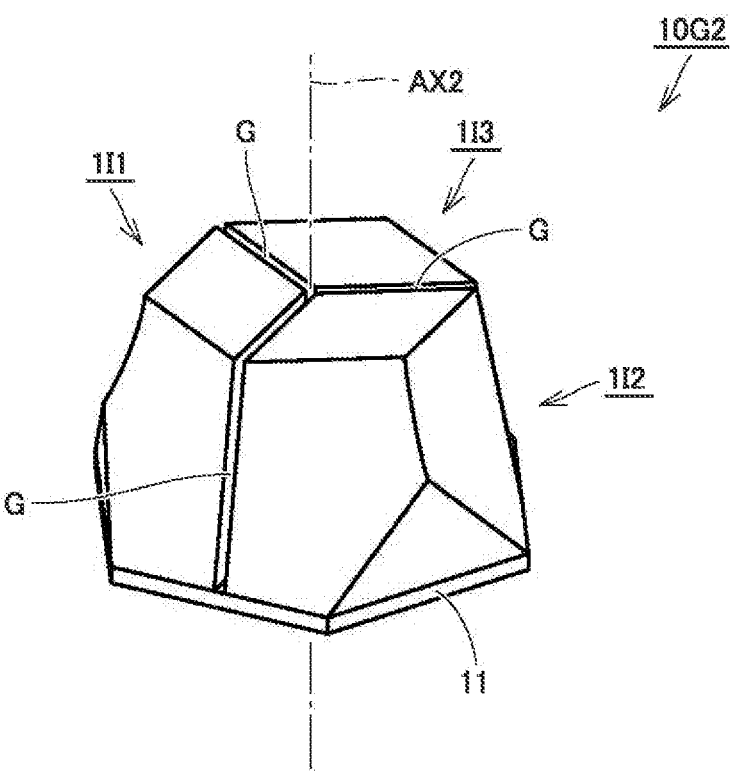
FIG. 26 is a perspective view of a shock absorbing structure according to a fifth modification.
Figure 27:
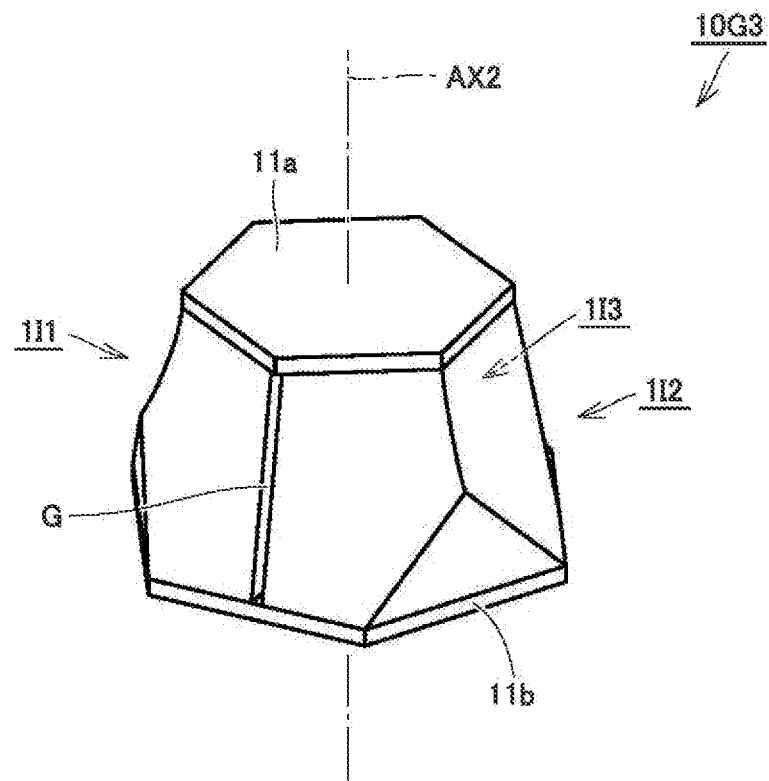
FIG. 27 is a perspective view of a shock absorbing structure according to a sixth modification.

The following describes shock absorbing structures according to the fourth to sixth modifications based on the above-described eighth embodiment. FIGS. 25, 26, and 27 are perspective views of the shock absorbing structures according to the fourth, fifth, and sixth modifications, respectively. Each of the shock absorbing structures 10G1 to 10G3 according to the fourth to sixth modifications further includes a support member that connects the above-described three shock absorbers 1I1 to 1I3 to each other.

As shown in FIG. 25, in addition to the three shock absorbers 1I1 to 1I3 constituting the shock absorbing unit, the shock absorbing structure 10G1 according to the fourth modification includes a thin plate-like support member 11 having a hexagonal shape in plan view that extends over the first end surfaces ES1 of the three shock absorbers 1I1 to 1I3 to cover these first end surfaces ES1. On the other hand, each of the second end surfaces ES2 of the three shock absorbers 1I1 to 1I3 is exposed.

As shown in FIG. 27, in addition to the three shock absorbers 1I1 to 1I3 constituting the shock absorbing unit, the shock absorbing structure 10G3 according to the sixth modification includes: a thin plate-like support member 11a having a hexagonal shape in a plan view that extends over the first end surfaces ES1 of the three shock absorbers 1I1 to 1I3 to cover these first end surfaces ES1; and a thin plate-like support member 11b having a hexagonal shape in a plan view that extends over the second end surfaces ES2 of the three shock absorbers 1I1 to 1I3 to cover the second end surfaces ES2.

By any one of the shock absorbing structures 10G1 to 10G3 as described above, the three shock absorbers 1I1 to 1I3 are integrated together by the support member 11 or by the support members 11a and 11b, and thereby, not only the handling thereof can be facilitated, but also the positional displacement of the shock absorbers 1I1 to 1I3 can be prevented. Therefore, adopting the above-described configuration can result in a shock absorbing structure that can be readily installed and also can reliably achieve the desired shock absorbing performance.

Further, instead of integrating the plurality of shock absorbers together by a support member formed of a member different from that of the plurality of shock absorbers, a coupling portion can be provided integrally with the plurality of shock absorbers such that the end portions of the plurality of shock absorbers in the axial direction are coupled to each other by the coupling portion. Such a configuration can be implemented, for example, by injection molding using a mold, additive manufacturing using a three-dimensional additive manufacturing apparatus, thermoforming (press forming) using a mold, additive manufacturing by cutting, and the like.

Ninth to Eleventh Embodiments

The following describes the structural characteristics as particularly effective factors for enhancing the shock absorbing performance in specifically designing the shock absorbing structure according to the eighth embodiment and the modification thereof as described above.

Figure 28:
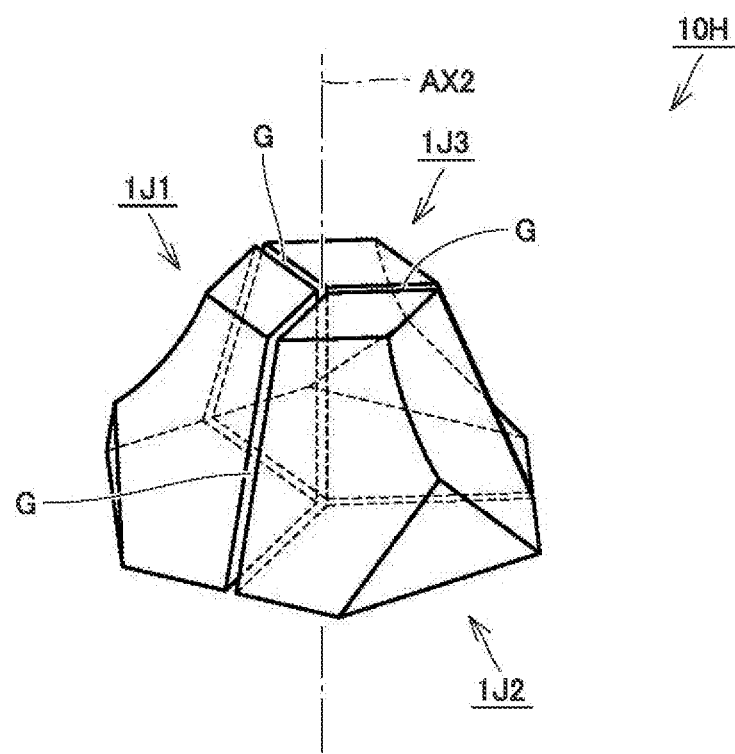
FIG. 28 is a perspective view of a shock absorbing structure according to a ninth embodiment.

FIG. 28 is a perspective view of a shock absorbing structure according to the ninth embodiment. A shock absorbing structure 10H according to the present embodiment is formed only of three shock absorbers 1J1 to 1J3 and obtained by adding a structural (shape-related) modification to the shock absorbing structure 10G according to the eighth embodiment described above.

As shown in FIG. 28, the shock absorbing structure 10H according to the present embodiment is reduced in total area of the first end surfaces ES1 as compared with the shock absorbing structure 10G according to the eighth embodiment described above. Specifically, each of the shock absorbers 1J1 to 1J3 included in the shock absorbing structure 10H is reduced in area of each first end surface ES1 kept in a similar shape without changing the position of the vertex P, as compared with each of the shock absorbers 1I1 to 1I3 included in the above-described shock absorbing structure 10G. In this case, the third ridgelines L3 and the first ridgeline L1 provided in each of the shock absorbers 1J1 to 1J3 included in the shock absorbing structure 10H and located on the circumferential surface of the shock absorbing structure 10H are inclined more than those in the above-described shock absorbing structure 10G, and thus, the shock absorbing structure 10H entirely has a tapered shape whose cross-sectional area decreases toward the first end surface ES1.

In the case of the shock absorbing structure 10H described above, as the first ridgeline L1 and the third ridgelines L3 are inclined more than those of the above-described shock absorbing structure 10G, shear deformation is more likely to occur upon receipt of a load in the axial direction. Thus, as shear deformation is more likely to occur, the amount of deformation per volume is increased correspondingly, so that high deformability is achieved accordingly. Therefore, the configuration as described above can implement a lightweight shock absorber exhibiting a higher shock absorbing function than that of the shock absorbing structure 10G. In other words, the shock absorbing function can be enhanced by increasing the area difference between the first end surface ES1 and the second end surface ES2.

Figure 29:
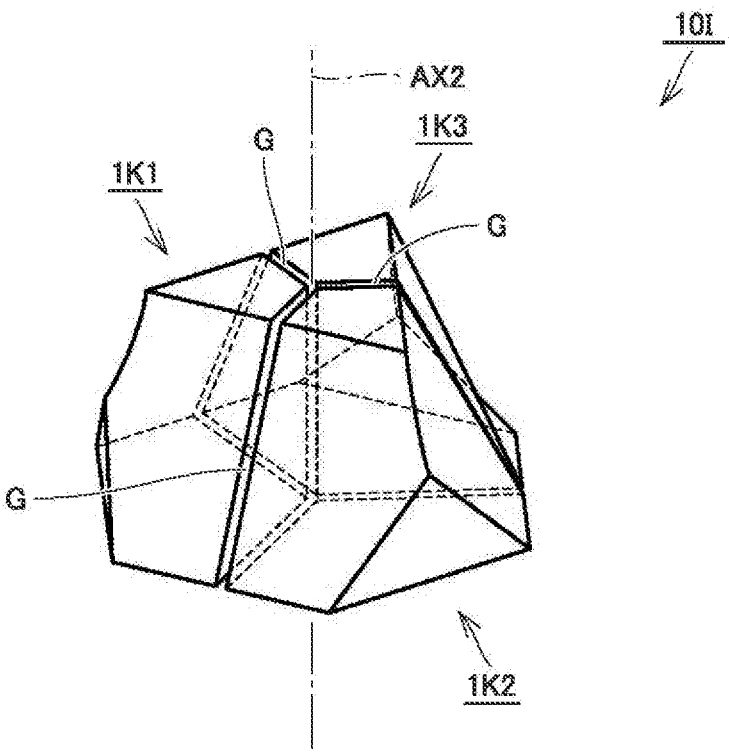
FIG. 29 is a perspective view of a shock absorbing structure according to a tenth embodiment.

FIG. 29 is a perspective view of a shock absorbing structure according to the tenth embodiment. A shock absorbing structure 10I according to the present embodiment is formed only of three shock absorbers 1K1 to 1K3 and obtained by adding a structural (shape-related) modification to the shock absorbing structure 10G according to the above-described eighth embodiment.

As shown in FIG. 29, the shock absorbing structure 10I according to the present embodiment is reduced in total area of the first end surfaces ES1 as compared with the shock absorbing structure 10G according to the above-described eighth embodiment. Specifically, each of the shock absorbers 1K1 to 1K3 included in the shock absorbing structure 10I is reduced in area of each first end surface ES1 without changing the positions of the vertex P and the first ridgeline L1 as compared with each of the shock absorbers 1I1 to 1I3 included in the above-described shock absorbing structure 10G. In this case, the third ridgelines L3 provided in each of the shock absorbers 1K1 to 1K3 included in the shock absorbing structure 10I and located on the circumferential surface of the shock absorbing structure 10I are inclined more than those in the above-described shock absorbing structure 10G, and thus, the shock absorbing structure 10I entirely has a tapered shape whose cross-sectional area decreases toward the first end surface ES1.

In the case of the shock absorbing structure 10I described above, as the first ridgeline L1 and the third ridgelines L3 are inclined more than those of the above-described shock absorbing structure 10G, shear deformation is more likely to occur upon receipt of a load in the axial direction. Thus, as shear deformation is more likely to occur, the amount of deformation per volume is increased correspondingly, so that high deformability is achieved accordingly. Therefore, the configuration as described above can implement a lightweight shock absorber exhibiting a higher shock absorbing function than that of the shock absorbing structure 10G. In other words, the shock absorbing function can be enhanced by increasing the area difference between the first end surface ES1 and the second end surface ES2.

In the above description of the present embodiment, by way of example, the outer shape of the surface including the first end surface ES1 among the pair of surfaces of the shock absorbing structure 10I that are located in the axial direction has an approximately triangular shape, but the third ridgelines L3 provided in each of the shock absorbers 1K1 to 1K3 included in the shock absorbing structure 10I and located on the circumferential surface of the shock absorbing structure 10I can be further more inclined such that the outer shape of the above-mentioned surface can have a substantially triangular shape in which the central portion of each side is recessed inward.

Figure 30:
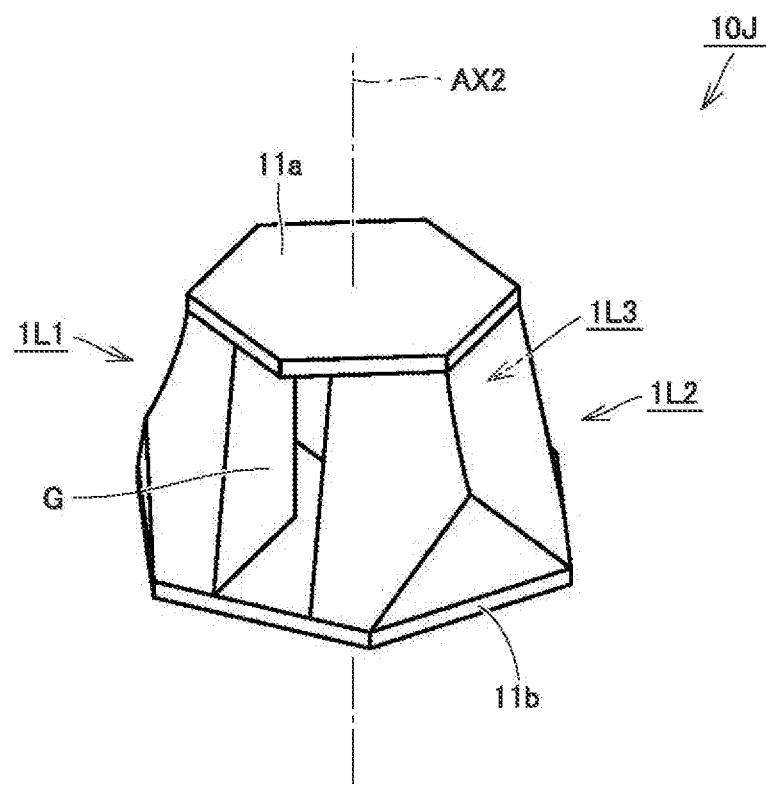
FIG. 30 is a perspective view of a shock absorbing structure according to an eleventh embodiment.

FIG. 30 is a perspective view of a shock absorbing structure according to the eleventh embodiment. A shock absorbing structure 10J according to the present embodiment includes three shock absorbers 1L1 to 1L3 and a pair of support members 11a and 11b positioned so as to sandwich the shock absorbers 1L1 to 1L3 therebetween, and is obtained by adding a structural (shape-related) modification to the shock absorbing structure 10G3 according to the sixth modification described above.

As shown in FIG. 30, the shock absorbing structure 10J according to the present embodiment is wider in gap G than the shock absorbing structure 10G according to the eighth embodiment described above. Specifically, in each of the shock absorbers 1L1 to 1L3 included in the shock absorbing structure 10J, the width of the connection surface adjacent to the third ridgeline L3 among the plurality of connection surfaces CS is reduced without changing the positions of the vertex P and the first ridgeline L1, as compared with the shock absorbers 1I1 to 1I3 included in the above-described shock absorbing structure 10G. In this case, the cross-sectional area of each of the shock absorbers 1L1 to 1L3 included in the shock absorbing structure 10J that is orthogonal to the axial line AX2 of the shock absorbing structure 10J is generally smaller than that of the above-described shock absorbing structure 10G.

In the case of the shock absorbing structure 10J described above, as the cross-sectional area of each of the shock absorbers ILI to 1L3 is smaller than that of the above-described shock absorbing structure 10G, shear deformation is more likely to occur upon receipt of a load in the axial direction. Thus, as shear deformation is more likely to occur, the amount of deformation per volume is increased correspondingly, so that high deformability is achieved accordingly. Therefore, the configuration as described above can implement a lightweight shock absorber exhibiting a higher shock absorbing function than that of the shock absorbing structure 10G. In other words, the shock absorbing function can be enhanced by reducing the above-mentioned cross-sectional area of each of the shock absorbers.

In addition to the above, the shock absorbing function can be enhanced also by: inclining, around the axial line of the shock absorbing structure, the first ridgeline of each of the plurality of shock absorbers included in the shock absorbing structure; inclining, around the axial line of the shock absorbing structure, each third ridgeline located on the circumferential surface of the shock absorbing structure among the third ridgelines included in each of the plurality of shock absorbers; entirely inclining the plurality of shock absorbers in one direction; increasing the external dimension of each of the shock absorbers in the axial direction; forming the first ridgeline in each of the shock absorbers in a curved shape recessed toward the center of the corresponding shock absorber; or forming the second ridgeline in each of the shock absorbers in a curved shape protruding outward of the corresponding shock absorber.

In this case, when any ridgelines located on the circumferential surface of the shock absorbing structure among the first ridgeline and the third ridgelines provided in each of the shock absorbers included in the shock absorbing structure are inclined around the axial line of the shock absorbing structure, all of the ridgelines can be inclined or some of the ridgelines can be inclined. When two or more of the ridgelines are inclined, these ridgelines can be inclined in the same direction around the axial line of the shock absorbing unit, and thereby, a higher shock absorbing function is exhibited.

Twelfth Embodiment

Figure 31:
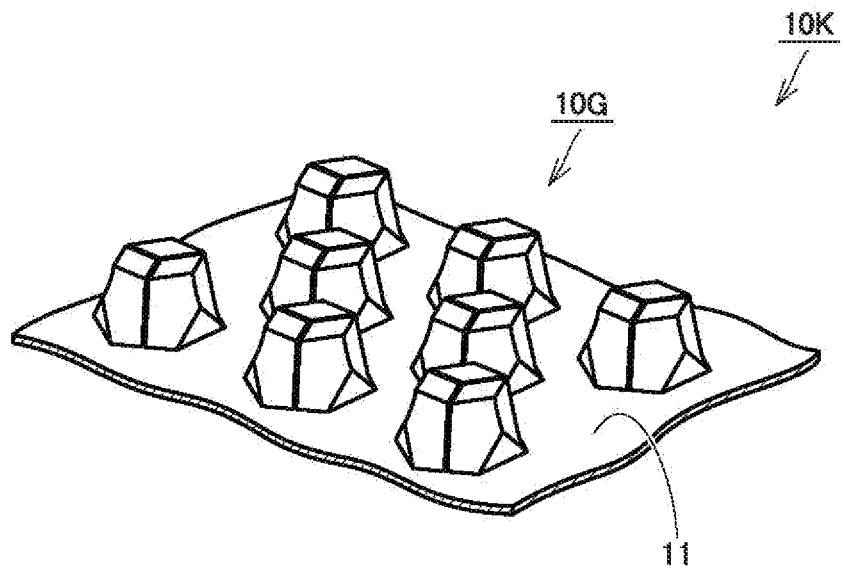
FIG. 31 is a partially cutaway perspective view of a shock absorbing structure according to a twelfth embodiment.

FIG. 31 is a partially cutaway perspective view of a shock absorbing structure according to the twelfth embodiment. The following describes a shock absorbing structure 10K according to the present embodiment with reference to FIG. 31.

As shown in FIG. 31, the shock absorbing structure 10K includes a plurality of shock absorbing structures 10G as the shock absorbing units according to the eighth embodiment described above. More specifically, the shock absorbing structure 10K includes a thin plate-like support member 11 and the shock absorbing structures 10G as a plurality of shock absorbing units disposed on the support member 11.

The support member 11 supports the shock absorbing structures 10G as a plurality of shock absorbing units such that the plurality of shock absorbing units are integrated together. The plurality of shock absorbers included in each of the plurality of shock absorbing units are bonded to the support member 11, for example, by adhesion, welding or the like. The plurality of shock absorbing units are disposed on the support member 11 in a regular manner (in a staggered manner in the illustrated example), for example, according to a prescribed rule.

In this case, the support member 11 can be made of the same material as that of the shock absorber or can be made of a material different from that of the shock absorber. Further, the support member 11 can be flexible or can not be easily deformed.

The shock absorbing structure 10K as described above can exhibit a high shock absorbing function over a wider range. Further, by integrating the plurality of shock absorbing units together by the support member 11, not only the handling thereof can be facilitated, but also the positional displacement of the shock absorbing units can be prevented. This can result in a shock absorbing structure that can be readily installed and can reliably achieve the desired shock absorbing performance.

In the above description of the present embodiment, by way of example, a plurality of shock absorbing units are disposed on a single support member, but a plurality of shock absorbing units can be sandwiched between a pair of support members. Further, an opening can be disposed as required in a region of the support member where no shock absorbing unit is disposed.

Further, instead of integrating, together, the plurality of shock absorbers included in each of the plurality of shock absorbing units by a support member formed of a member different from that of the plurality of shock absorbers, a coupling portion can be provided integrally with the plurality of shock absorbers included in each of the plurality of shock absorbing units such that the end portions of the plurality of shock absorbers in the axial direction are coupled to each other by the coupling portion. Such a configuration can be implemented, for example, by injection molding using a mold, additive manufacturing using a three-dimensional additive manufacturing apparatus, thermoforming (press forming) using a mold, additive manufacturing by cutting, and the like.

Thirteenth Embodiment

Figure 32:
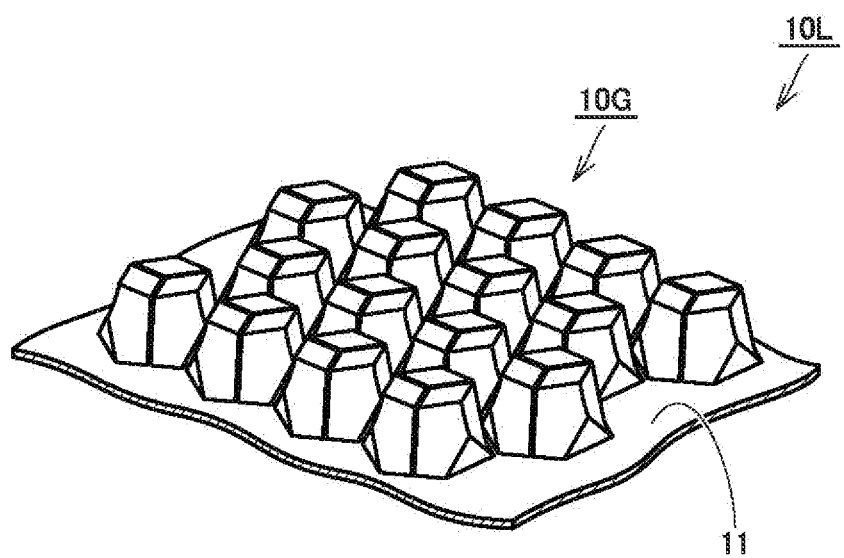
FIG. 32 is a partially cutaway perspective view of a shock absorbing structure according to a thirteenth embodiment.

FIG. 32 is a partially cutaway perspective view of a shock absorbing structure according to the thirteenth embodiment. The following describes a shock absorbing structure 10L according to the present embodiment with reference to FIG. 32.

As shown in FIG. 32, the shock absorbing structure 10L is different from the shock absorbing structure 10K according to the above-described twelfth embodiment in arrangement of the shock absorbing structures 10G as shock absorbing units disposed on the support member 11. More specifically, the shock absorbing structure 10L is configured to have a honeycomb structure on the surface on the support member 11 side by arranging individual shock absorbing units close to each other such that the shock absorbing structures 10G as shock absorbing units are highly densely mounted.

By arranging the shock absorbing units as described above, the shock absorbing units can be highly densely mounted and can be reduced in volume where these shock absorbing units occupy, thereby contributing to size reduction.

Therefore, by the shock absorbing structure 10L according to the present embodiment, a lightweight shock absorbing structure exhibiting a high shock absorbing function can be further reduced in size as compared with the shock absorbing structure 10K according to the above-described twelfth embodiment.

Fourteenth Embodiment

Figure 33:
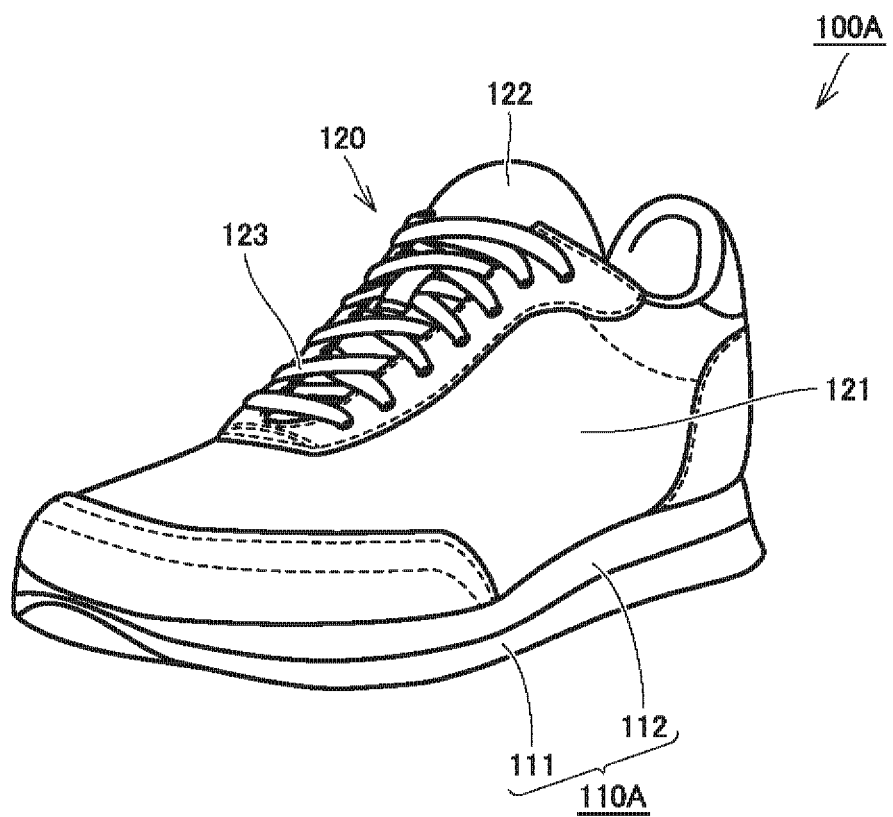
FIG. 33 is a perspective view of a shoe sole according to a fourteenth embodiment and a shoe including the shoe sole.
Figure 34:
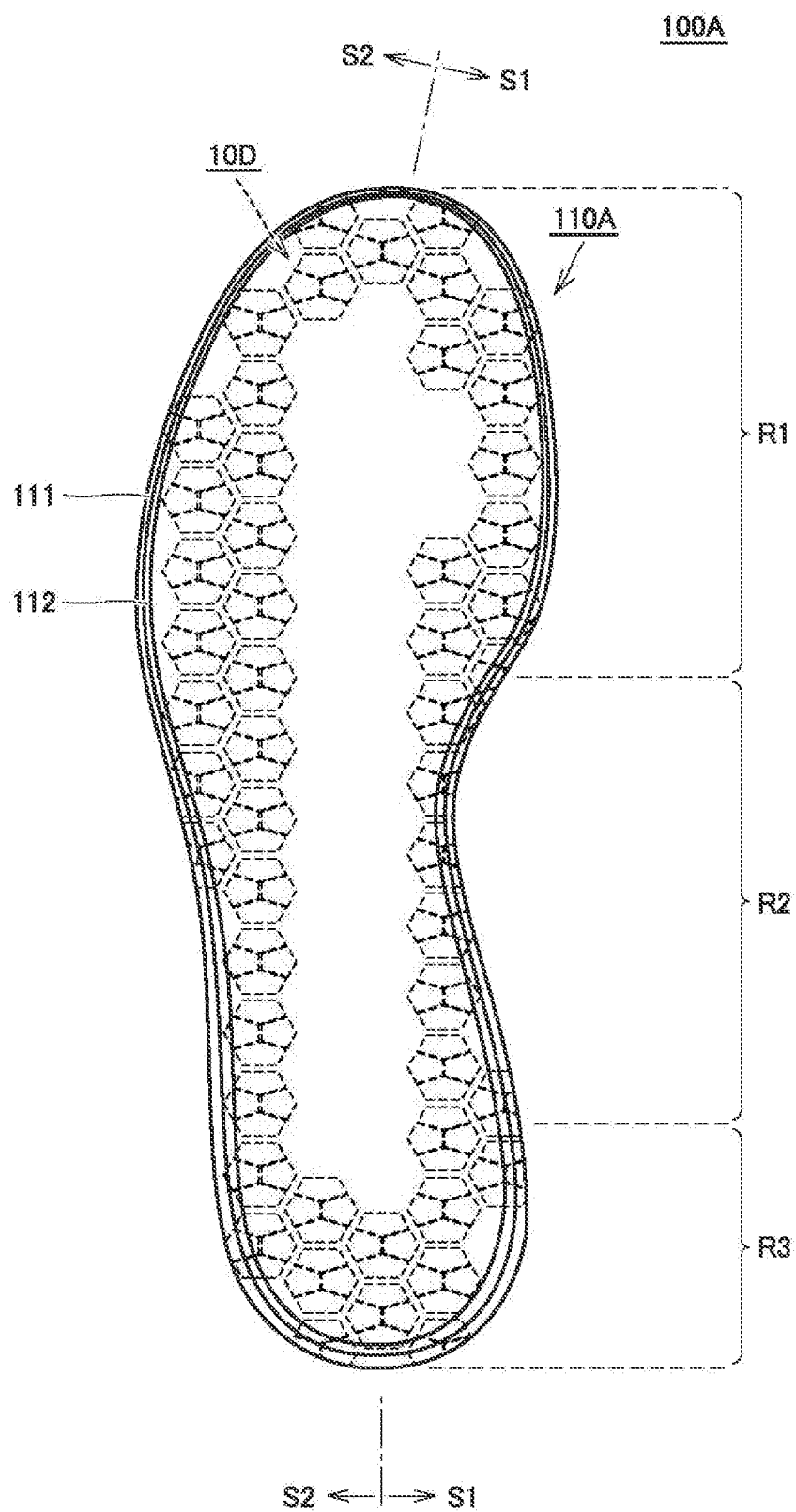
FIG. 34 is a plan view of the shoe sole shown in FIG. 33.

FIG. 33 is a perspective view of a shoe sole according to the fourteenth embodiment and a shoe including the shoe sole. FIG. 34 is a plan view of the shoe sole shown in FIG. 33. The following describes a shoe sole 110A according to the present embodiment and a shoe 100A including the shoe sole 110A with reference to FIGS. 33 and 34. The shoe sole 110A according to the present embodiment includes a plurality of the shock absorbing structures 10D according to the above-described fifth embodiment.

As shown in FIG. 33, the shoe 100A includes a shoe sole 110A and an upper 120. The shoe sole 110A is a member covering a sole of a foot and having a substantially flat shape. The upper 120 has a bag-like shape enclosing the entire foot inserted into a shoe and is positioned above the shoe sole 110A.

The upper 120 includes an upper body 121, a shoe tongue 122, and a shoelace 123. The upper body 121 has a bag-like shape as described above. Both the shoe tongue 122 and the shoelace 123 are fixed or attached to the upper body 121.

The upper body 121 has: a lower portion having a bottom portion to be fixed to the shoe sole 110A; and an upper portion including an opening through which an upper part of an ankle and a part of the top of the foot are exposed. The shoe tongue 122 is fixed to the upper body 121 by sewing, welding, bonding, or a combination thereof so as to cover a portion of the opening provided in the upper body 121 through which a part of the top of a foot is exposed. For the upper body 121 and the shoe tongue 122, for example, woven fabric, knitted fabric, synthetic leather, resin, or the like can be used. For shoes particularly required to be air permeable and lightweight, a double raschel warp knitted fabric with a polyester yarn knitted therein can be used.

The shoelace 123 is formed of a member in the form of a string for pulling together, in the foot width direction, portions of a peripheral edge of the opening which is provided in the upper body 121 and through which a part of the top of a foot is exposed. The shoelace 123 is passed through a plurality of holes provided along the peripheral edge of the opening. When the shoelace 123 is tightened in the state where a foot is inserted into the upper body 121, the upper body 121 can be brought into close contact with the foot.

As shown in FIGS. 33 and 34, the shoe sole 110A includes a lower support member 111, an upper support member 112, and a plurality of shock absorbing structures 10D. The lower support member 111 defines a lower surface of the shoe sole 110A, and the lower surface of the lower support member 111 forms a ground contact surface. The upper support member 112 defines an upper surface of the shoe sole 110A, and the upper surface of the upper support member 112 is bonded to the outer bottom surface of the bottom portion of the upper body 121. The plurality of shock absorbing structures 10D are sandwiched by the lower support member 111 and the upper support member 112, and thereby embedded in the shoe sole 110A. Note that the thickness of the lower support member 111 and the thickness of the upper support member 112 can be changed as appropriate, and both the thicknesses can be substantially the same, or one thickness can be thicker than the other thickness.

As shown in FIG. 34, in a front-rear direction (substantially in the up-down direction in the figure) corresponding to a longitudinal axis direction in a plan view, the shoe sole 110A is divided into: a forefoot portion R1 that supports a toe portion and a ball portion of a foot; a midfoot portion R2 that supports an arch portion of the foot; and a rearfoot portion R3 that supports a heel portion of the foot. Further, the shoe sole 110A is divided into a portion on the medial foot side (a portion on the S1 side shown in the figure) and a portion on the lateral foot side (a portion on the S2 side shown in the figure) in the foot width direction intersecting with the longitudinal axis direction in a plan view. In this case, the portion on the medial foot side corresponds to the medial side of the foot in anatomical position (i.e., the side close to the midline) and the portion on the lateral foot side is opposite to the medial side of the foot in anatomical position (i.e., the side away from the midline).

The plurality of shock absorbing structures 10D are disposed along the peripheral edge portion of the shoe sole 110A. More specifically, the plurality of shock absorbing structures 10D are highly densely mounted so as to be adjacent to each other along: the edge portion of the forefoot portion R1 on the front side; the edge portion of the forefoot portion R1 on the medial foot side; the edge portion of the midfoot portion R2 on the medial foot side; the edge portion of the rearfoot portion R3 on the medial foot side; the edge portion of the rearfoot portion R3 on the rear side; the edge portion of the rearfoot portion R3 on the lateral foot side; the edge portion of the midfoot portion R2 on the lateral foot side; and the edge portion of the forefoot portion R1 on the lateral foot side. Note that the portions where the plurality of shock absorbing structures 10D are disposed include a part for supporting a big toe of a foot, a part for supporting a little toe of the foot, and a part for supporting a heel bone of the foot.

In this case, each of the plurality of shock absorbing structures 10D is disposed such that its axial line AX2 (see FIG. 15 and the like) is orthogonal to the ground contact surface of the shoe sole 110A. By the configuration as described above, the load applied to the shoe sole 110A from the sole of each foot and the ground upon landing is absorbed by a large amount of deformation of the plurality of shock absorbing structures 10D (by a significant deformation including compressive deformation and shear deformation as described above). Thus, the load applied to a sole of each foot from the shoe sole 110A is reduced, so that a high shock absorbing function is achieved.

Therefore, the shoe sole 110A according to the present embodiment and the shoe 100A including the shoe sole 110A can implement: a shoe sole configured to exhibit a high shock absorbing function in terms of not only material but also structure; and a shoe including the shoe sole.

Note that the lower support member 111 and the upper support member 112 are fixed by adhesion, welding, or the like. Also, in each of the plurality of shock absorbing structures 10D, the first end surface ES1 and the second end surface ES2 (see FIG. 12 and the like) are fixed to the lower support member 111 and the upper support member 112, respectively, by adhesion, welding, or the like.

The materials of the lower support member 111 and the upper support member 112 are not particularly limited but can for example be a foam material of resin or rubber, and can be particularly suitably a foam material of a thermoplastic resin such as ethylene-vinyl acetate copolymer (EVA), thermoplastic polyurethane (TPU), thermoplastic polyamide elastomer (TPAE), or butadiene rubber. Note that the lower support member 111 and the upper support member 112 can be made of the same material or can be made of different materials.

Further, as described in the above first embodiment, the material of the plurality of shock absorbers included in each of the plurality of shock absorbing structures 10D is not particularly limited, but can for example be a foam material of resin or rubber or can be a non-foam material of resin or rubber, and can be particularly suitably: a non-foam material of a thermoplastic resin such as ethylene-vinyl acetate copolymer (EVA), thermoplastic polyurethane (TPU), and thermoplastic polyamide elastomer (TPAE), butadiene rubber, or the like; or a polymer composition such as an olefin-based polymer, an amide-based polymer, an ester-based polymer, a urethane-based polymer, a styrene-based polymer, or an acrylic-based polymer.

Fifteenth Embodiment

Figure 35:
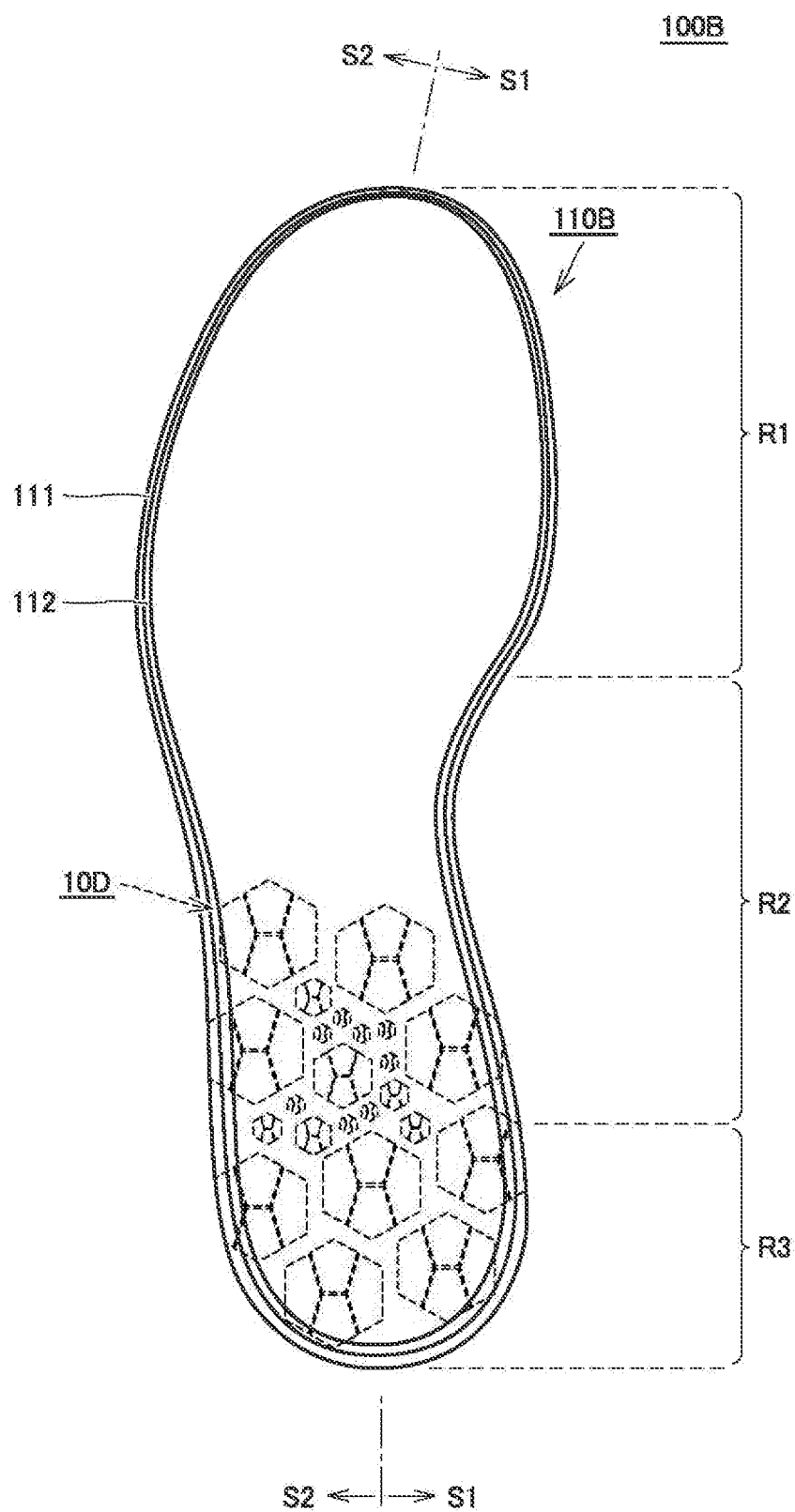
FIG. 35 is a plan view of a shoe sole of a shoe according to a fifteenth embodiment.

FIG. 35 is a plan view of a shoe sole of a shoe according to the fifteenth embodiment. The following describes a shoe sole 110B according to the present embodiment and a shoe 100B including the shoe sole 110B with reference to FIG. 35. In place of the shoe sole 110A provided in the shoe 100A according to the above-described fourteenth embodiment, the shoe 100B according to the present embodiment includes the shoe sole 110B which will be described below. The shoe sole 110B according to the present embodiment includes a plurality of the shock absorbing structures 10D according to the above-described fifth embodiment, similarly to the shoe sole 110A according to the above-described fourteenth embodiment.

As shown in FIG. 35, the shoe sole 110B includes a lower support member 111, an upper support member 112, and a plurality of shock absorbing structures 10D. The plurality of shock absorbing structures 10D are sandwiched between the lower support member 111 and the upper support member 112, and thereby embedded in the shoe sole 110B.

The plurality of shock absorbing structures 10D are disposed only at positions on the rear side in the front-rear direction in the shoe sole 110B. More specifically, the plurality of shock absorbing structures 10D are highly densely mounted to be adjacent to each other in the rear side portion of the midfoot portion R2 and the entire area of the rearfoot portion R3. The region where the plurality of shock absorbing structures 10D are disposed includes a part that supports a heel bone of a foot.

In this case, the plurality of shock absorbing structures 10D include a plurality of types of shock absorbing structures having different sizes. This allows a prescribed distribution of the shock absorbing functions in respective portions of the shoe sole 110B.

Thus, similarly to the above-described fourteenth embodiment, the shoe sole 110B according to the above-described present embodiment and the shoe 100B including the shoe sole 110B can also implement: a shoe sole configured to exhibit a high shock absorbing function in terms of not only material but also structure; and a shoe including the shoe sole.

Sixteenth Embodiment

Figure 36:
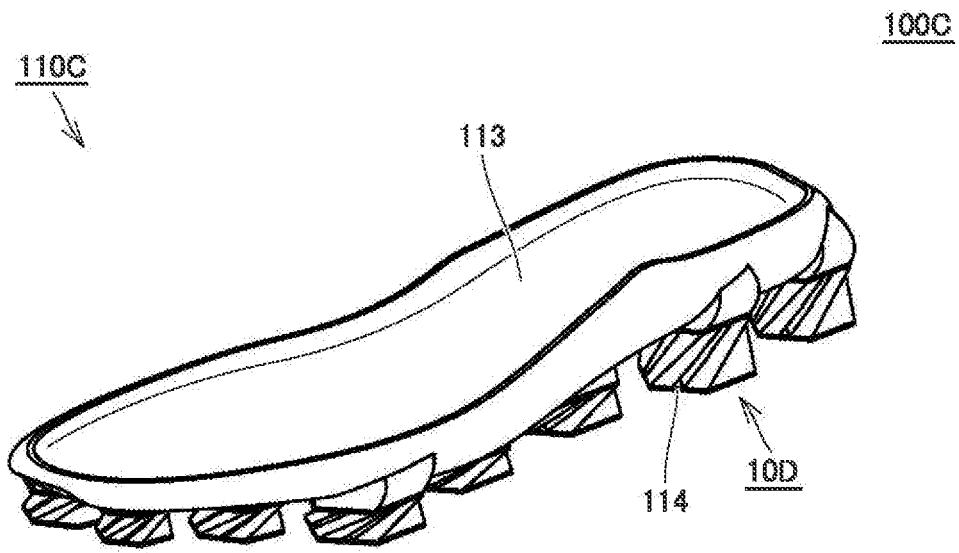
FIG. 36 is a perspective view of a shoe sole of a shoe according to a sixteenth embodiment when viewed from the upper surface side.
Figure 37:
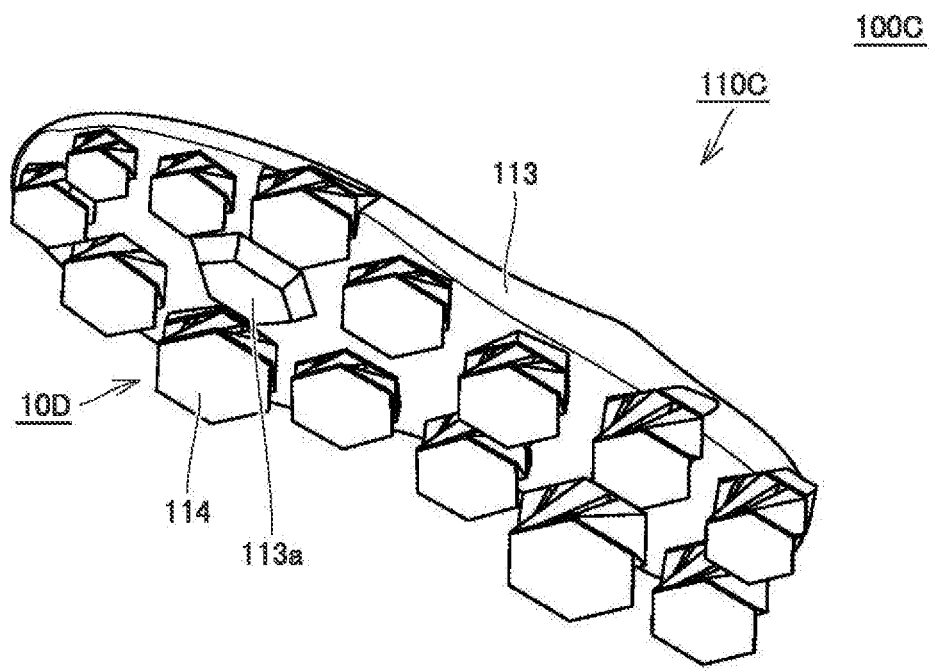
FIG. 37 is a perspective view of the shoe sole shown in FIG. 36 when viewed from the ground contact surface side.

FIG. 36 is a perspective view of a shoe sole of a shoe according to the sixteenth embodiment when viewed from the upper surface side. FIG. 37 is a perspective view of the shoe sole shown in FIG. 36 when viewed from the ground contact surface side. The following describes a shoe sole 110C according to the present embodiment and a shoe 100C including the shoe sole 110C with reference to FIGS. 36 and 37. In place of the shoe sole 110A included in the shoe 100A according to the above-described fourteenth embodiment, the shoe 100C according to the present embodiment includes the shoe sole 110C which will be described below. The shoe sole 110C according to the present embodiment includes a plurality of the shock absorbing structures 10D according to the above-described fifth embodiment, similarly to the shoe sole 110A according to the above-described fourteenth embodiment.

As shown in FIGS. 36 and 37, the shoe sole 110C includes a base portion 113, a plurality of shock absorbing structures 10D, and a lower support member 114 provided on each of the plurality of shock absorbing structures 10D. The base portion 113 defines an upper surface of the shoe sole 110C, and the upper surface of the base portion 113 is bonded to an outer bottom surface of a bottom portion of the upper body 121. The plurality of shock absorbing structures 10D are disposed at a distance from each other on the lower surface of the base portion 113.

The plurality of shock absorbing structures 10D are disposed entirely on the lower surface of the base portion 113 of the shoe sole 110C. In other words, the plurality of shock absorbing structures 10D are located in each of the forefoot portion, the midfoot portion, and the rearfoot portion described above of the shoe sole 110C. Further, some shock absorbing structures of the plurality of shock absorbing structures 10D that are located at the peripheral edge of the shoe sole 110C are located so as to reach not only the lower surface of the base portion 113 but also the circumferential surface of the base portion 113. Further, the plurality of shock absorbing structures 10D include a plurality of types of shock absorbing structures having different sizes.

As described above, the lower support member 114 is provided on the lower surface of each of the plurality of shock absorbing structures 10D. The lower support member 114 that is formed of a thin plate-like member supports a plurality of shock absorbers included in each of the plurality of shock absorbing structures 10D and also defines a ground contact surface.

Note that a protrusion 113a is disposed in a center portion in the forefoot portion of the shoe sole 110C in place of the shock absorbing structure 10D. The protrusion 113a is formed of a portion protruding from a part of the base portion 113 and defines a ground contact surface together with the plurality of shock absorbing structures 10D. The protrusion 113a is more excellent in compression rigidity than the shock absorbing structure 10D and serves to enhance the stability upon landing. The protrusion 113a does not necessarily have to be provided. When the protrusion 113a is not provided, the portion corresponding to the protrusion 13a can be a space (i.e., a space can be created between the base portion 113 and the ground upon landing) or can include the shock absorbing structure 10D.

In this case, each of the plurality of shock absorbing structures 10D is disposed such that its axial line AX1 (see FIG. 15 and the like) is orthogonal to the ground contact surface of the shoe sole 110C. By the configuration as described above, the load applied to the shoe sole 110C from the sole of each foot and the ground upon landing is absorbed by a large amount of deformation of the plurality of shock absorbing structures 10D (by a significant deformation including compressive deformation and shear deformation as described above). Thus, the load applied to the sole of each foot from the shoe sole 110C is reduced, so that a high shock absorbing function is exhibited.

Therefore, the shoe sole 110C according to the present embodiment and the shoe 100C including the shoe sole 110C can implement: a shoe sole configured to exhibit a high shock absorbing function in terms of not only material but also structure; and a shoe including the shoe sole.

In each of the plurality of shock absorbing structures 10D, the first end surface ES1 and the second end surface ES2 (see FIGS. 16(A) to 16(C) and the like) are fixed to the base portion 113 and the lower support member 114 by adhesion, welding, or the like.

The material of the base portion 113 is not particularly limited but can for example be a foam material of resin or rubber, and can be particularly suitably a foam material of: a thermoplastic resin such as ethylene-vinyl acetate copolymer (EVA); a thermosetting resin such as polyurethane (PU); or butadiene rubber. The base portion 113 according to the present embodiment is commonly referred to as a midsole.

On the other hand, the lower support member 114 can be made of rubber, for example. The lower support member 114 according to the present embodiment is commonly referred to as an outsole.

Further, the plurality of shock absorbers included in each of the plurality of shock absorbing structures 10D can be made of the same material as that in the above-described fourteenth embodiment.

Seventeenth Embodiment

Figure 38:
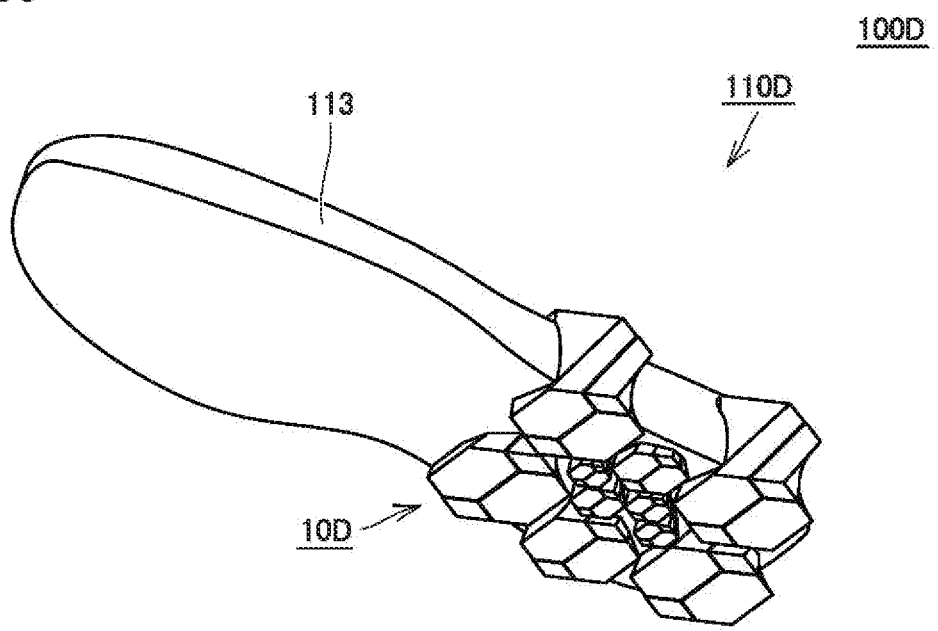
FIG. 38 is a perspective view of a shoe sole of a shoe according to a seventeenth embodiment when viewed from the ground contact surface side.

FIG. 38 is a perspective view of a shoe sole of a shoe according to the seventeenth embodiment when viewed from the ground contact surface side. The following describes a shoe sole 110D according to the present embodiment and a shoe 100D including the shoe sole 110D with reference to FIG. 38. In place of the shoe sole 110A included in the shoe 100A according to the above-described fourteenth embodiment, the shoe 100D according to the present embodiment includes the shoe sole 110D which will be described below. The shoe sole 110D according to the present embodiment includes a plurality of the shock absorbing structures 10D according to the above-described fifth embodiment, similarly to the shoe sole 110A according to the above-described fourteenth embodiment.

As shown in FIG. 38, the shoe sole 110D includes a base portion 113 and a plurality of shock absorbing structures 10D. The plurality of shock absorbing structures 10D are disposed at a distance from each other on the lower surface of the base portion 113.

The plurality of shock absorbing structures 10D are disposed only at positions on the rear side in the front-rear direction in the shoe sole 110D. More specifically, the plurality of shock absorbing structures 10D are highly densely mounted to be adjacent to each other in the rear side portion of the midfoot portion and the entire area of the rearfoot portion. The region where the plurality of shock absorbing structures 10D are disposed includes a part that supports a heel bone of a foot.

In this case, some shock absorbing structures 10D of the plurality of shock absorbing structures 10D that are located at the peripheral edge of the shoe sole 110D are located so as to reach not only the lower surface of the base portion 113 but also the circumferential surface of the base portion 113. Further, the plurality of shock absorbing structures 10D include a plurality of types of shock absorbing structures having different sizes. Note that the shoe sole 110D according to the present embodiment does not include the lower support member 114 (see FIGS. 36 and 37) included in the shoe sole 110C according to the above-described sixteenth embodiment, but the lower surfaces of the plurality of shock absorbing structures 10D directly define a ground contact surface.

Thus, similarly to the above-described sixteenth embodiment, the shoe sole 110D according to the present embodiment and the shoe 100D including the shoe sole 110D as describe above can also implement: a shoe sole configured to exhibit a high shock absorbing function in terms of not only material but also structure; and a shoe including the shoe sole.

Eighteenth Embodiment

Figure 39:
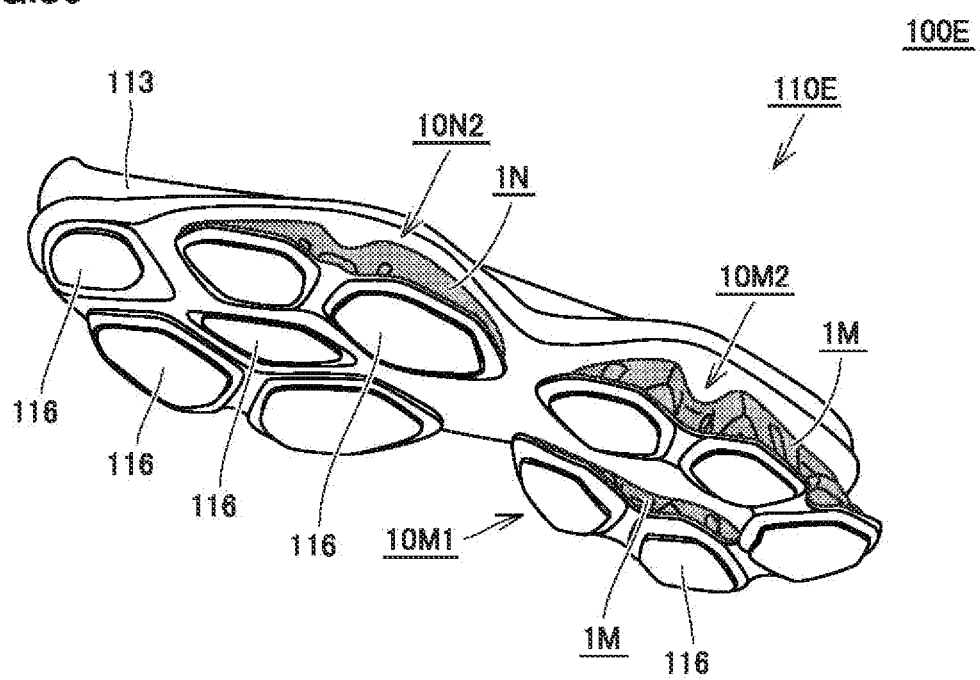
FIG. 39 is a perspective view of a shoe sole of a shoe according to an eighteenth embodiment when viewed from the ground contact surface side.
Figure 40:
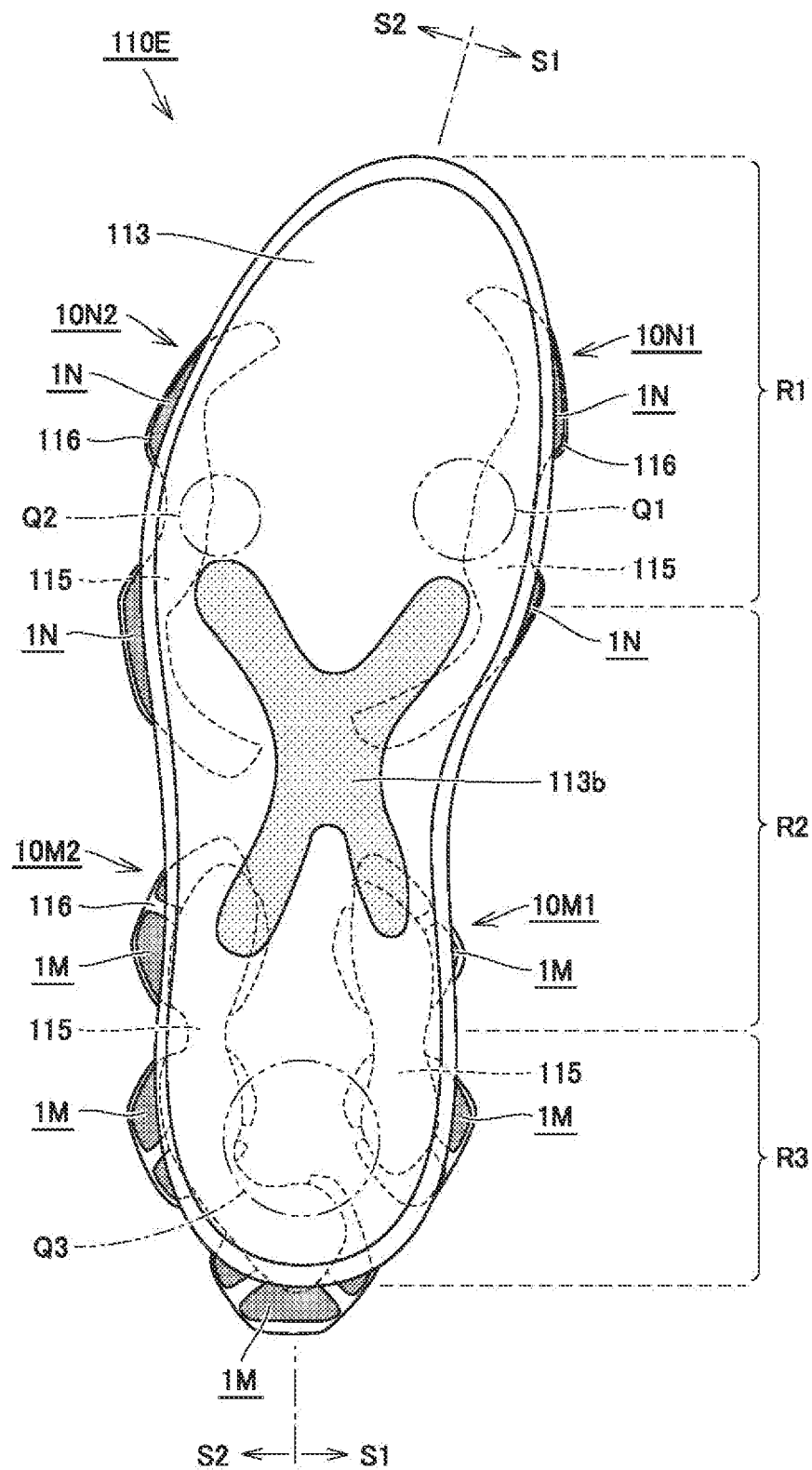
FIG. 40 is a plan view of the shoe sole shown in FIG. 39.
Figure 41:
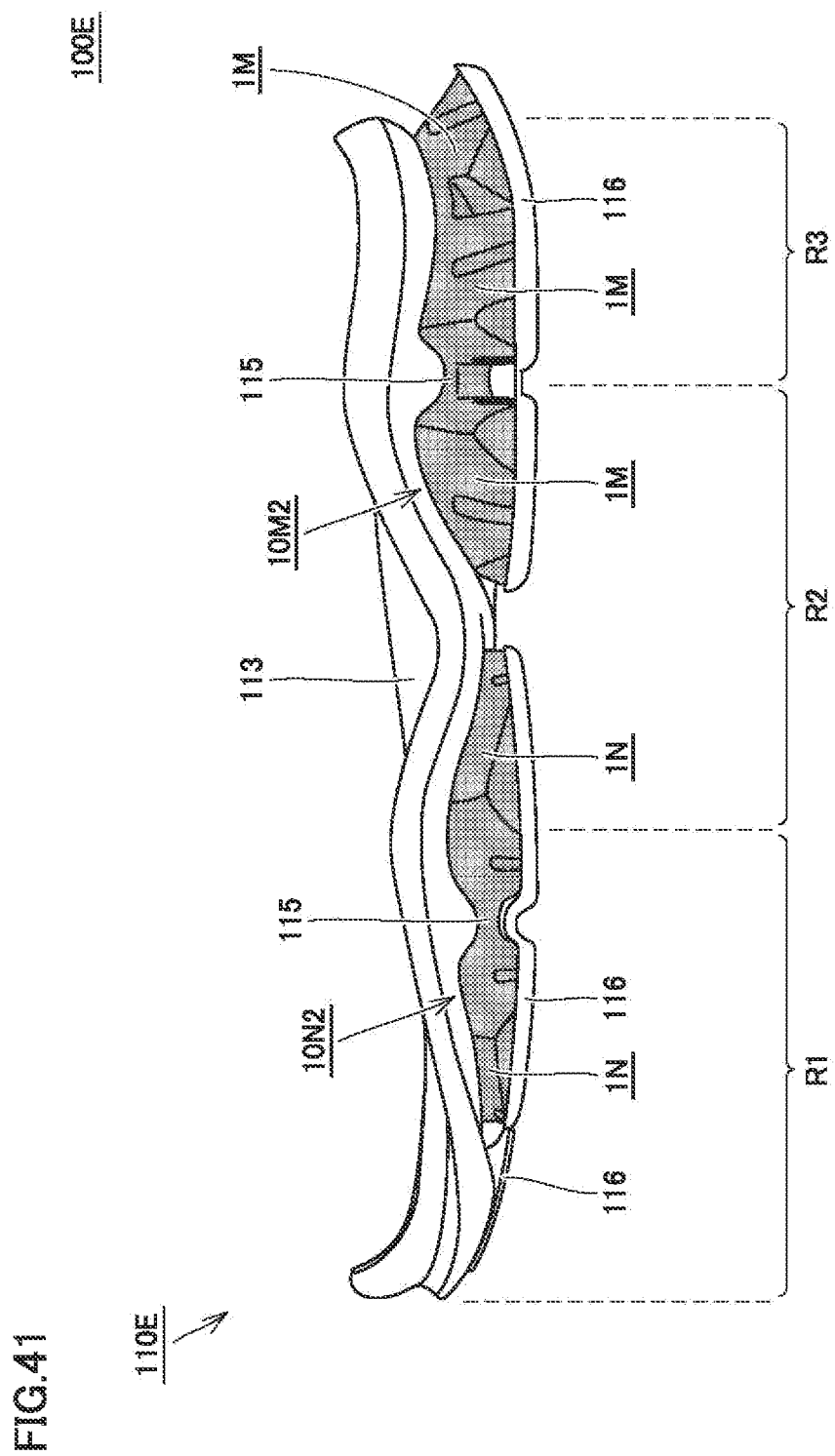
FIG. 41 is a side view of the shoe sole shown in FIG. 39.
Figure 42:
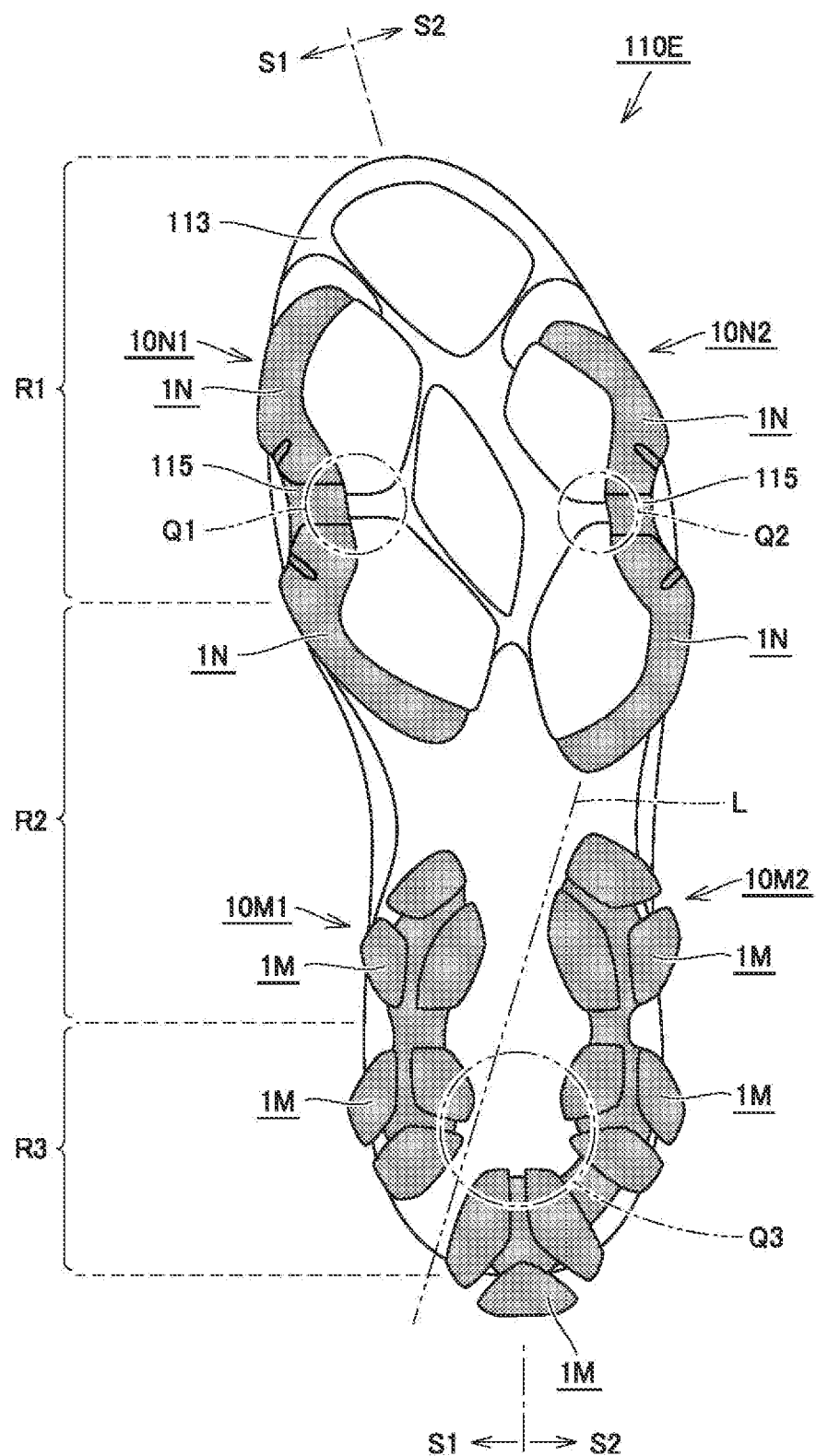
FIG. 42 is a schematic bottom view of the shoe sole shown in FIG. 39.

FIG. 39 is a perspective view of a shoe sole of a shoe according to the eighteenth embodiment when viewed from the ground contact surface side. FIG. 40 is a plan view of the shoe sole shown in FIG. 39. FIG. 41 is a side view of the shoe sole shown in FIG. 39 when viewed from the lateral foot side. FIG. 42 is a schematic bottom view of the shoe sole shown in FIG. 39, from which the lower support member has been removed. The following describes a shoe sole 110E according to the present embodiment and a shoe 100E including the shoe sole 110E with reference to FIGS. 39 to 42. In place of the shoe sole 110A included in the shoe 100A according to the above-described fourteenth embodiment, the shoe 100E according to the present embodiment includes the shoe sole 110E which will be described below.

As shown in FIGS. 39 to 42, the shoe sole 110E includes a base portion 113, a medial rearfoot-side shock absorbing structure 10M1, a lateral rearfoot-side shock absorbing structure 10M2, a medial forefoot-side shock absorbing structure 10N1, a lateral forefoot-side shock absorbing structure 10N2, and a lower support member 116. The base portion 113 is what is called a midsole and defines an upper surface of the shoe sole 110A. The upper surface of the base portion 113 is bonded to the upper body 121 (see FIG. 33), for example, by adhesion or the like. The lower support member 111 is what is called an outsole and defines a lower surface of the shoe sole 110E. The lower surface of the lower support member 116 forms a ground contact surface. The medial rearfoot-side shock absorbing structure 10M1, the lateral rearfoot-side shock absorbing structure 10M2, the medial forefoot-side shock absorbing structure 10N1, and the lateral forefoot-side shock absorbing structure 10N2 are sandwiched by the base portion 113 and the lower support member 116.

In FIGS. 39 to 42, for ease of understanding, the medial rearfoot-side shock absorbing structure 10M1, the lateral rearfoot-side shock absorbing structure 10M2, the medial forefoot-side shock absorbing structure 10N1, and the lateral forefoot-side shock absorbing structure 10N2 each are shown in dark color to indicate the boundary with other members, thereby clarifying the positions where these shock absorbing structures are disposed.

The medial rearfoot-side shock absorbing structure 10M1 includes two shock absorbing structures and an upper support member 115 that supports these two shock absorbing structures. Each of these two shock absorbing structures has a configuration similar to that of the shock absorbing structure 10G according to the above-described eighth embodiment, and includes a shock absorbing unit in which three shock absorbers 1M are disposed close to each other with a gap G interposed therebetween.

Each of these three shock absorbers 1M includes a first end surface ES1 having a substantially quadrangular shape and a second end surface ES2 having a substantially pentagonal shape. In other words, N represents 4 and M represents 5 in each of the three shock absorbers 1M. Note that the upper support member 115 has a thin plate shape that connects the upper end side portions of these three shock absorbers 1M and further connects the above-mentioned two shock absorbing structures. Thereby, the medial rearfoot-side shock absorbing structure 10M1 is formed of a single member including the above-mentioned two shock absorbing structures and the upper support member 115.

In this case, each of the six shock absorbers 1M in total included in the two shock absorbing structures has a shape whose vertices and ridgelines are rounded, and also has a vertex P (see FIG. 23) at an intermediate position between the first end surface ES1 and the second end surface ES2 similarly to the shock absorbers 1I1 to 1I3 of the shock absorbing structure 10G according to the above-described eighth embodiment. Thereby, each of the six shock absorbers 1M has one first ridgeline L1, two second ridgelines L2, and three third ridgelines L3.

Each of these two shock absorbing structures has the same configuration as that of the shock absorbing structure 10G according to the above-described eighth embodiment in that it has a substantially columnar outer shape in which a pair of surfaces located in the axial direction thereof each has an approximately hexagonal shape. However, each of these two shock absorbing structures is different in configuration from the shock absorbing structure 10G according to the above-described eighth embodiment in that the outer shapes of the shock absorbers 1M included in the two shock absorbing structures are different from each other.

The lateral rearfoot-side shock absorbing structure 10M2 includes three shock absorbing structures and an upper support member 115 that supports these three shock absorbing structures. Each of these three shock absorbing structures has a configuration similar to that of the shock absorbing structure 10G according to the above-described eighth embodiment, and is formed of a shock absorbing unit in which three shock absorbers 1M are disposed close to each other with a gap G interposed therebetween.

Each of these three shock absorbers 1M includes a first end surface ES1 having a substantially quadrangular shape and a second end surface ES2 having a substantially pentagonal shape. In other words, N represents 4 and M represents 5 in each of the three shock absorbers 1M. Note that the upper support member 115 has a thin plate shape that connects the upper end side portions of these three shock absorbers 1M and further connects the above-mentioned three shock absorbing structures. Thereby, the lateral rearfoot-side shock absorbing structure 10M2 is formed of a single member including the above-mentioned three shock absorbing structures and the upper support member 115.

In this case, each of nine shock absorbers 1M in total included in the three shock absorbing structures has a shape whose vertices and ridgelines are rounded, and also has a vertex P (see FIG. 23) at an intermediate position between the first end surface ES1 and the second end surface ES2 similarly to the shock absorbers 1I1 to 1I3 included in the shock absorbing structure 10G according to the above-described eighth embodiment. Thereby, each of the nine shock absorbers 1M has one first ridgeline L1, two second ridgelines L2, and three third ridgelines L3.

Each of these three shock absorbing structures has the same configuration as that of the shock absorbing structure 10G according to the above-described eighth embodiment in that it has a substantially columnar outer shape in which a pair of surfaces located in the axial direction thereof each has an approximately hexagonal shape. However, each of these three shock absorbing structures is different in configuration from the shock absorbing structure 10G according to the above-described eighth embodiment in that the outer shapes of the shock absorbers 1M included in the shock absorbing structures are different from each other.

The medial forefoot-side shock absorbing structure 10N1 includes two shock absorbers 1N and an upper support member 115 that supports the two shock absorbers 1N. Each of the two shock absorbers 1N includes a vertex at an intermediate position between the first end surface ES1 and the second end surface ES2, and thereby, includes one first ridgeline L1 and two second ridgelines L2, but does not correspond to the shock absorber according to the present invention in a strict sense. The upper support member 115 has a thin plate shape that connects the upper end side portions of the two shock absorbers 1N. Thus, the medial forefoot-side shock absorbing structure 10N1 is formed of a single member including the two shock absorbers 1N mentioned above and the upper support member 115.

The lateral forefoot-side shock absorbing structure 10N2 includes two shock absorbers 1N and an upper support member 115 that supports the two shock absorbers 1N. Each of the two shock absorbers 1N includes a vertex at an intermediate position between the first end surface ES1 and the second end surface ES2, and thereby, includes one first ridgeline L1 and two second ridgelines L2, but does not correspond to the shock absorber according to the present invention in a strict sense. The upper support member 115 has a thin plate shape that connects the upper end side portions of the two shock absorbers 1N. Thus, the lateral forefoot-side shock absorbing structure 10N2 is formed of a single member including the two shock absorbers 1N mentioned above and the upper support member 115.

In this case, the plurality of shock absorbers 1M included in the medial rearfoot-side shock absorbing structure 10M1 and the lateral rearfoot-side shock absorbing structure 10M2, and the plurality of shock absorbers 1N included in the medial forefoot-side shock absorbing structure 10N1 and the lateral forefoot-side shock absorbing structure 10N2 are disposed such that each of their axial lines AX1 (see FIG. 1 and the like) is orthogonal to the ground contact surface of the shoe sole 110E. By the configuration as described above, the load applied to the shoe sole 110E from the sole of each foot and the ground upon landing is absorbed by a large amount of deformation of: the plurality of shock absorbers 1M included in the medial rearfoot-side shock absorbing structure 10M1 and the lateral rearfoot-side shock absorbing structure 10M2; and the shock absorbers 1N included in the medial forefoot-side shock absorbing structure 10N1 and the lateral forefoot-side shock absorbing structure 10N2 (by a significant deformation including compressive deformation and shear deformation as described above). Thus, the load applied to a sole of each foot from the shoe sole 110E is reduced, so that a high shock absorbing function is exhibited.

The medial rearfoot-side shock absorbing structure 10M1 and the lateral rearfoot-side shock absorbing structure 10M2 are combined with each other so as to have a substantially U-shape in a plan view. The medial rearfoot-side shock absorbing structure 10M1 is disposed along the rear edge portion on the medial foot side of the midfoot portion R2 and the edge portion on the medial foot side of the rearfoot portion R3. The lateral rearfoot-side shock absorbing structure 10M2 is disposed along the edge portion on the rear end side of the rearfoot portion R3, the edge portion on the lateral foot side of the rearfoot portion R3, and the rear edge portion on the lateral foot side of the midfoot portion R2. The region where the medial rearfoot-side shock absorbing structure 10M1 and the lateral rearfoot-side shock absorbing structure 10M2 are arranged is located so as to roughly surround a part Q3 included in the shoe sole 110E and supporting a heel bone of a foot.

The medial forefoot-side shock absorbing structure 10N1 is configured to have a substantially C-shape that is widely opened in a plan view. The medial forefoot-side shock absorbing structure 10N1 is disposed along the rear edge portion on the medial foot side of the forefoot portion R1 and the front edge portion on the medial foot side of the midfoot portion R2. This region where the medial forefoot-side shock absorbing structure 10N1 is disposed is located along a part Q1 included in the shoe sole 110E and supporting a big toe of a foot.

The lateral forefoot-side shock absorbing structure 10N2 is configured to have a substantially C-shape that is widely opened in a plan view. The lateral forefoot-side shock absorbing structure 10N2 is disposed along the rear edge portion on the lateral foot side of the forefoot portion R1 and the front edge portion on the lateral foot side of the midfoot portion R2. This region where the lateral forefoot-side shock absorbing structure 10N2 is disposed is located along a part Q2 included in the shoe sole 110E and supporting a little toe of a foot.

In other words, the shoe sole 110E according to the present embodiment has a configuration in which the medial forefoot-side shock absorbing structure 10N1 is disposed near the part Q1 of the shoe sole 110E that supports a big toe of a foot, the lateral forefoot-side shock absorbing structure 10N2 is disposed near the part Q2 of the shoe sole 110E that supports a little toe of a foot, and the medial rearfoot-side shock absorbing structure 10M1 and the lateral rearfoot-side shock absorbing structure 10M2 are disposed near the part Q3 of the shoe sole 110E that supports a heel bone of a foot, to thereby exhibit high shock absorbing performance in the above-mentioned parts to which a high load is applied particularly upon landing.

In each of the medial rearfoot-side shock absorbing structure 10M1, the lateral rearfoot-side shock absorbing structure 10M2, the medial forefoot-side shock absorbing structure 10N1, and the lateral forefoot-side shock absorbing structure 10N2, the upper surface of the upper support member 115 is bonded to the lower surface of the base portion 113 as a midsole, for example, by adhesion or the like. Also, the medial rearfoot-side shock absorbing structure 10M1, the lateral rearfoot-side shock absorbing structure 10M2, the medial forefoot-side shock absorbing structure 10N1, and the lateral forefoot-side shock absorbing structure 10N2 each have a lower surface (i.e., the second end surface ES2 of each of the shock absorbers included in each of these shock absorbing structures) to which the lower support member 116 as an outsole is bonded, for example, by adhesion or the like.

Thereby, as described above, each of the medial rearfoot-side shock absorbing structure 10M1, the lateral rearfoot-side shock absorbing structure 10M2, the medial forefoot-side shock absorbing structure 10N1, and the lateral forefoot-side shock absorbing structure 10N2 is positioned to be sandwiched between the base portion 113 and the lower support member 116. In the present embodiment, the lower support member 116 as an outsole is divided into a plurality of members as shown in FIGS. 39 and 40.

The material of the base portion 113 as a midsole is not particularly limited, but can be a foam material of a resin or rubber, for example, as described in the above fourteenth embodiment, and can be particularly suitably a foam material of: a thermoplastic resin such as ethylene-vinyl acetate copolymer (EVA), thermoplastic polyurethane (TPU), and thermoplastic polyamide elastomer (TPAE); butadiene rubber; or the like.

In the shoe sole 110E according to the present embodiment, a less-deformable portion 113b having an X-shape in a plan view is disposed at a position corresponding to the midfoot portion R2 on the upper surface of the base portion 113, as shown in FIG. 40. This less-deformable portion 113b is configured to be less deformable than other portions in the base portion 113 and is made of non-foam thermoplastic polyurethane (TPU) elastomer, for example. In FIG. 40, for ease of understanding, the region where the less-deformable portion 113b is provided is shown in light color.

The materials of the medial rearfoot-side shock absorbing structure 10M1, the lateral rearfoot-side shock absorbing structure 10M2, the medial forefoot-side shock absorbing structure 10N1, and the lateral forefoot-side shock absorbing structure 10N2 are not particularly limited, but can for example be a foam material of resin or rubber or a non-foam material of resin or rubber as described in the above fourteenth embodiment, and can be particularly suitably: a non-foam material of a thermoplastic resin such as ethylene-vinyl acetate copolymer (EVA), thermoplastic polyurethane (TPU), and thermoplastic polyamide elastomer (TPAE), butadiene rubber, or the like; or a polymer composition such as an olefin-based polymer, an amide-based polymer, an ester-based polymer, a urethane-based polymer, a styrene-based polymer, or an acrylic-based polymer.

The material of the lower support member 116 as an outsole is not particularly limited but can be rubber, for example, as described in the above sixteenth embodiment.

As described above, in the shoe sole 110E according to the present embodiment, each of the shock absorbers 1M, 1N included in the medial rearfoot-side shock absorbing structure 10M1, the lateral rearfoot-side shock absorbing structure 10M2, the medial forefoot-side shock absorbing structure 10N1, and the lateral forefoot-side shock absorbing structure 10N2 is connected at its upper end side portion by the upper support member 115 made of the same material as that of the shock absorbers 1M, 1N and bonded to the base portion 113 as a midsole, and is also connected at its lower end side portion by the lower support member 116 as an outsole made of a soft material. Thus, by the configuration as described above, the shock absorbers 1M and 1N can be incorporated into the shoe sole 110E while keeping the deformability of the shock absorbers 1M and 1N, so that a shoe sole exhibiting a high shock absorbing function can be achieved.

Referring to FIG. 42, in the configuration of the shoe sole 110E according to the present embodiment in a plan view of the shoe sole 110E, the medial rearfoot-side shock absorbing structure 10M1 and the lateral rearfoot-side shock absorbing structure 10M2 disposed on the edge portion of the rearfoot portion R3 of the base portion 113 so as to extend along the part Q3 supporting a heel bone of a foot is divided along a division line L shown in the figure in the direction in which these shock absorbing structures extend.

The medial rearfoot-side shock absorbing structure 10M1 is disposed in the rear portion on the medial foot side of the midfoot portion R2 and the portion on the medial foot side of the rearfoot portion R3, and each of these portions requires deformability and stability from the viewpoint of suppressing overpronation. Thus, it is preferable that the outer shape of the medial rearfoot-side shock absorbing structure 10M1 is designed so as to satisfy these conditions.

As a specific method satisfying these conditions, for example, it is conceivable to: reduce the width of the gap provided in each shock absorbing unit; increase the area of the first end surface of each shock absorber included in each shock absorbing unit; configure each shock absorber to be entirely less inclined; increase the length of each shock absorbing unit in the axial direction; and the like. Further, the above-described conditions are satisfied also by increasing the width of each shock absorbing unit (i.e., the external dimension in the direction intersecting with the extending direction of the medial rearfoot-side shock absorbing structure) or decreasing the external dimension in the extending direction of the medial rearfoot-side shock absorbing structure.

The lateral rearfoot-side shock absorbing structure 10M2 is disposed in the portion on the rear end side of the rearfoot portion R3, the portion on the lateral foot side of the rearfoot portion R3, and the rear portion on the lateral foot side of the midfoot portion R2, and each of these portions requires less stability but still requires higher deformability as compared with the above-mentioned medial rearfoot-side shock absorbing structure. Thus, it is preferable that the outer shape of the lateral rearfoot-side shock absorbing structure 10M2 is designed so as to satisfy these conditions.

As a specific method satisfying these conditions, for example, it is conceivable to: increase the width of the gap disposed in each shock absorbing unit; reduce the area of the first end surface of each shock absorber included in each shock absorbing unit; configure each shock absorber to be entirely more inclined; reduce the length of each shock absorbing unit in the axial direction; and the like. Further, the above-described conditions are satisfied also by reducing the width of each shock absorbing unit (i.e., the external dimension in the direction intersecting with the extending direction of the lateral rearfoot-side shock absorbing structure) or increasing the external dimension in the extending direction of the lateral rearfoot-side shock absorbing structure.

By the configuration as described above, in the area around the part Q3 supporting a heel bone of a foot, the compression rigidity of the rear portion on the medial foot side of the midfoot portion R2 and the compression rigidity of the medial foot side portion of the rearfoot portion R3 are relatively high, while the compression rigidity of the rear end side portion of the rearfoot portion R3, the compression rigidity of the lateral foot side portion of the rearfoot portion R3, and the compression rigidity of the rear portion on the lateral foot side of the midfoot portion R2 are relatively low (i.e., the deformability is relatively high).

Therefore, it is possible to suppress what is called an overpronation in which the heel portion collapses inward more than necessary upon landing. In other words, when a person who is more likely to suffer from an overpronation wears the shoes 100E including the shoe soles 110E according to the present embodiment, the sole of each foot can be stably supported at the rear portion on the medial foot side of the midfoot portion R2 and the medial foot side portion of the rearfoot portion R3. Thus, the pressure acting on the base portion 113 as a midsole can be dispersed to thereby suppress excessive deformation of the base portion 113, with the result that occurrence of an overpronation can be suppressed.

Further, the above-described configuration can stably support the sole of each foot at the rear portion on the medial foot side of the midfoot portion R2 and the medial foot side portion of the rearfoot portion R3 as described above. Thus, the pressure acting on the base portion 113 as a midsole can be dispersed to thereby suppress excessive deformation of the base portion 113. Accordingly, when a person with pes planovalgus wears the shoes 100E including the shoe soles 110E according to the present embodiment, concentration of a load on the medial foot side portion of each foot upon landing can be avoided.

On the other hand, by the configuration as described above, the lateral rearfoot-side shock absorbing structure 10M2 more significantly deforms upon landing at the rear end side portion of the rearfoot portion R3, the lateral foot side portion of the rearfoot portion R3, and the rear portion on the lateral foot side of the midfoot portion R2, so that the shock applied to a sole of each foot upon landing can be significantly reduced.

Therefore, the shoe sole 110E according to the present embodiment and the shoe 100E including the shoe sole 110E can provide: a shoe sole that is particularly suitable for a person more likely to suffer from an overpronation and a person with pes planovalgus, that is excellent in stability upon landing, that enables an excellent fit on a foot, and that is reduced in weight; and a shoe including the shoe sole.

Nineteenth Embodiment

Figure 43:
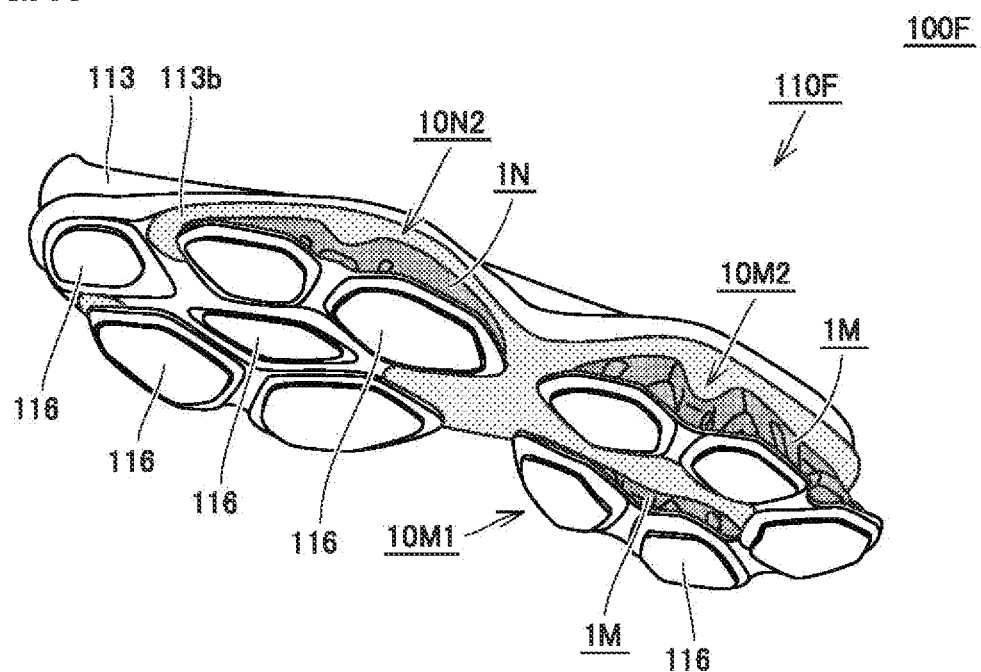
FIG. 43 is a perspective view of a shoe sole of a shoe according to a nineteenth embodiment when viewed from the ground contact surface side.
Figure 44:
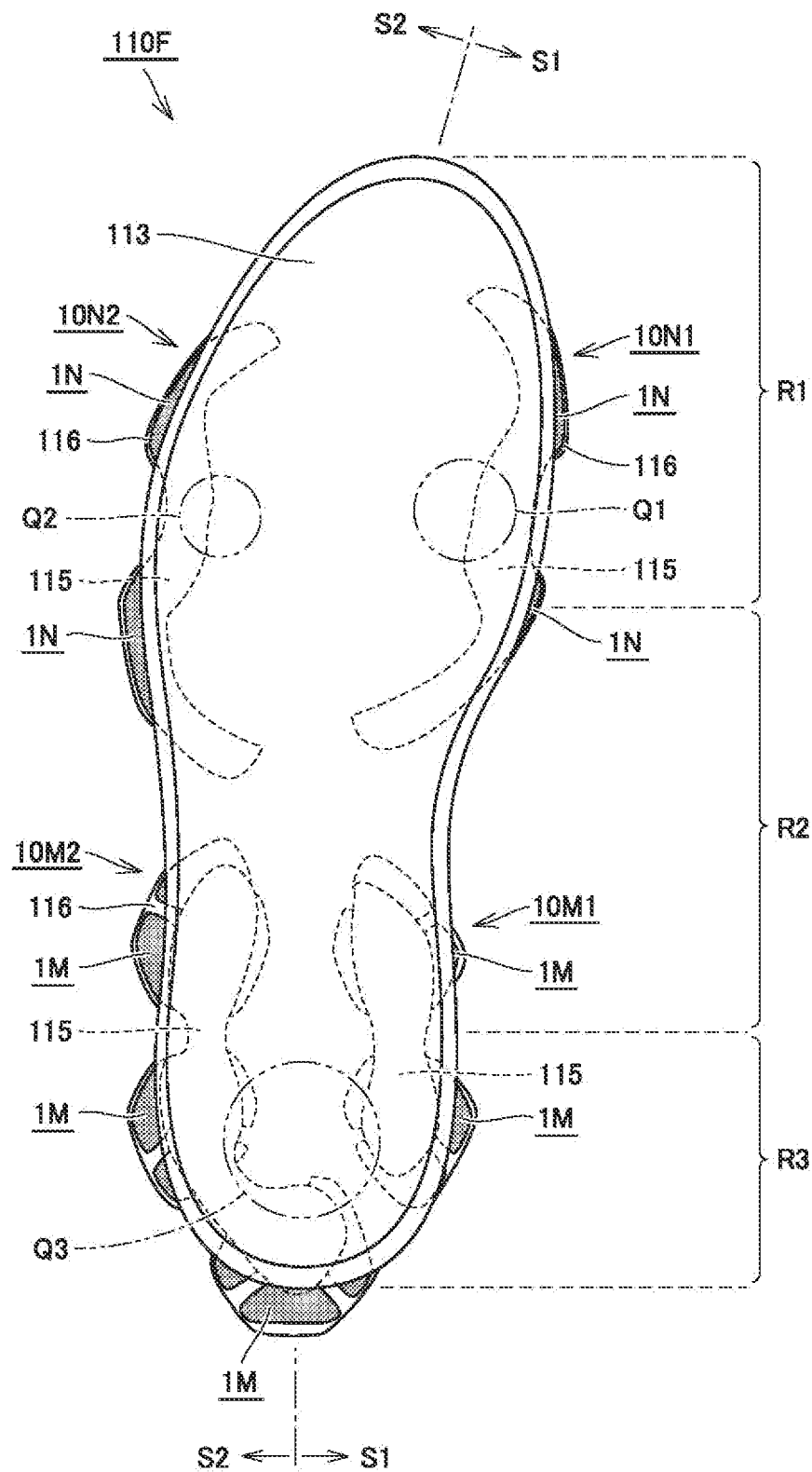
FIG. 44 is a plan view of the shoe sole shown in FIG. 43.
Figure 45:
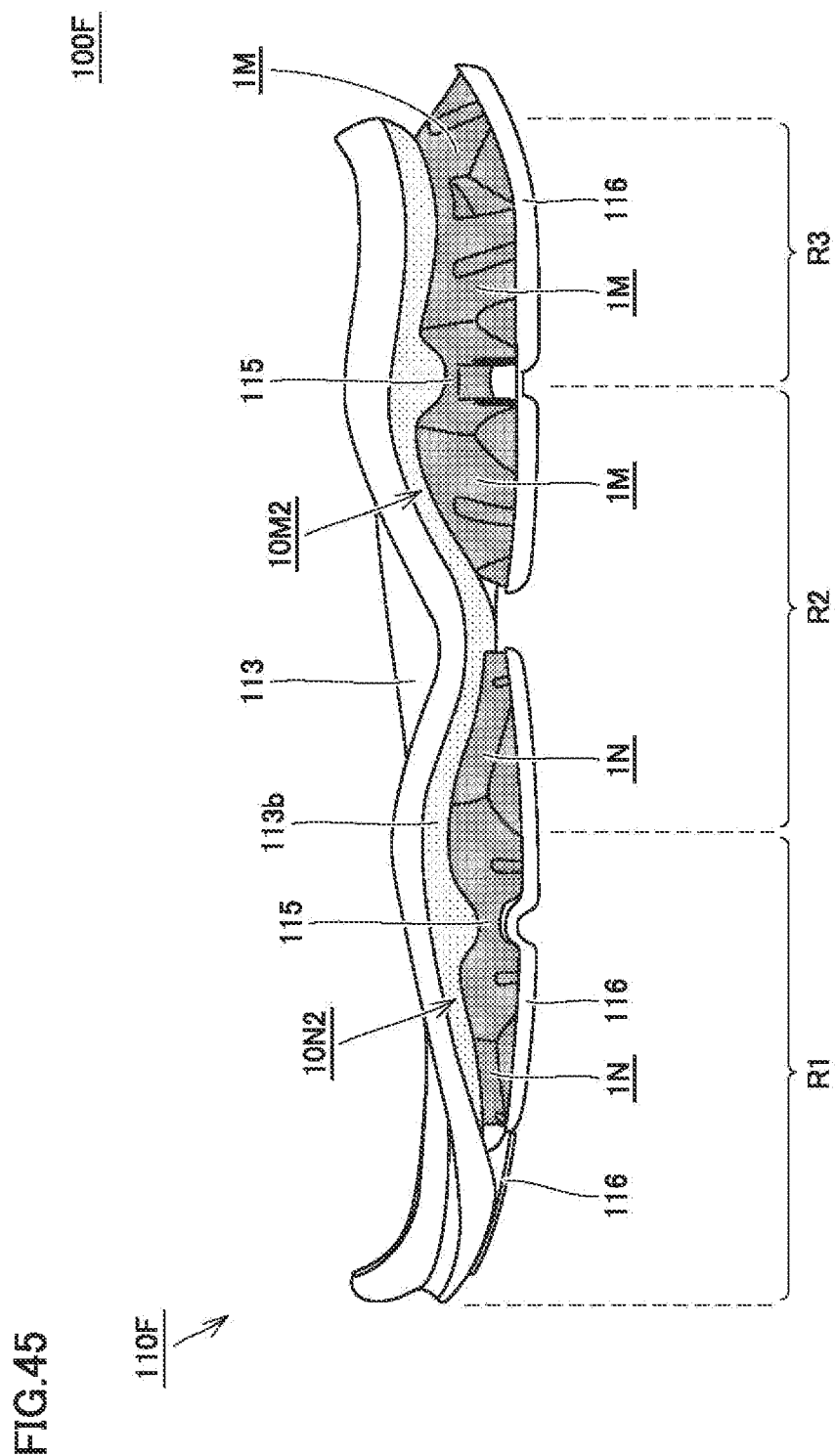
FIG. 45 is a side view of the shoe sole shown in FIG. 43.
Figure 46:
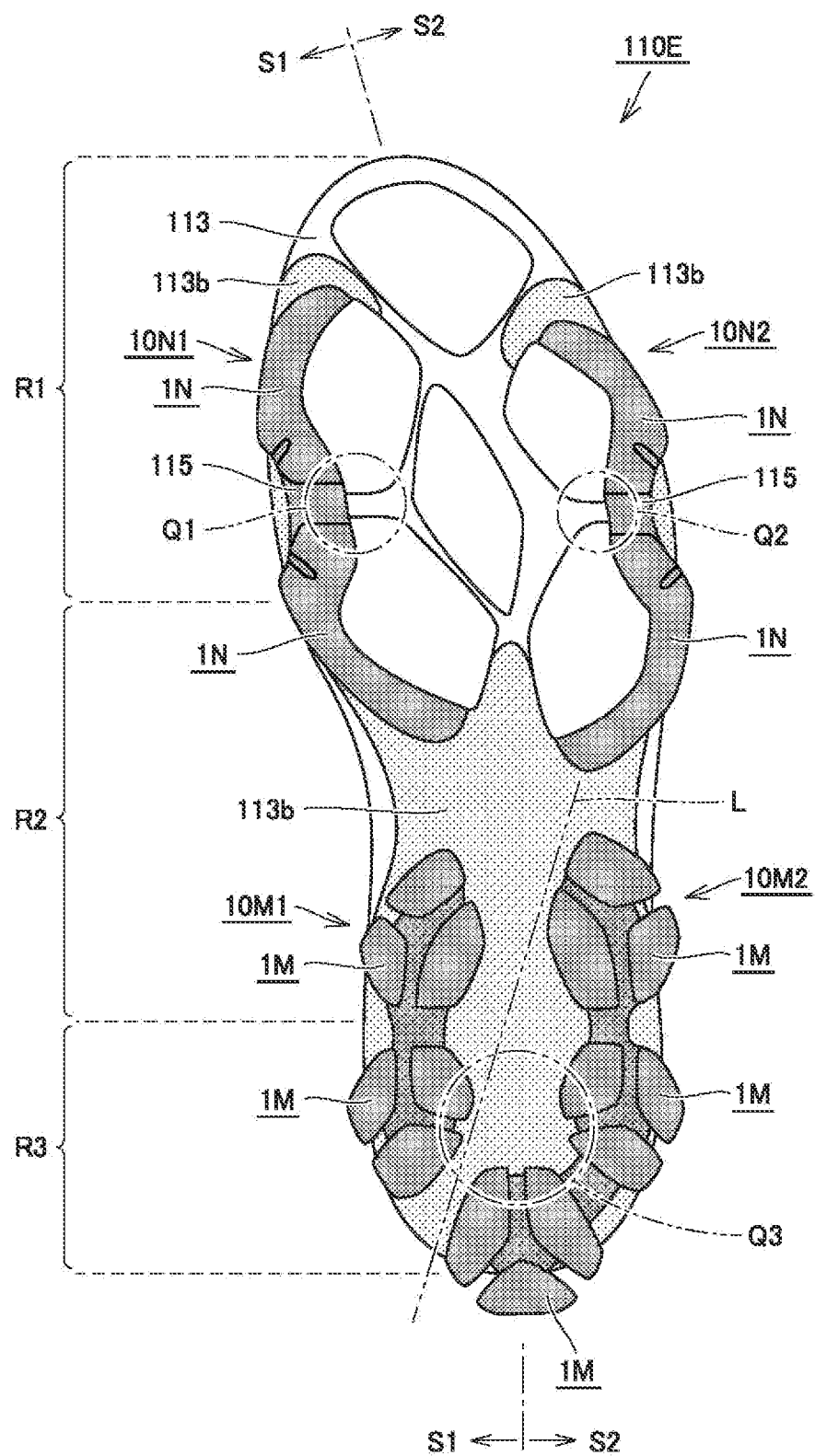
FIG. 46 is a schematic bottom view of the shoe sole shown in FIG. 43.

FIG. 43 is a perspective view of a shoe sole of a shoe according to the nineteenth embodiment when viewed from the ground contact surface side. FIG. 44 is a plan view of the shoe sole shown in FIG. 43. FIG. 45 is a side view of the shoe sole shown in FIG. 43 when viewed from the lateral foot side. FIG. 46 is a schematic bottom view of the shoe sole shown in FIG. 43, from which the lower support member has been removed. The following describes a shoe sole 110F according to the present embodiment and a shoe 100F including the shoe sole 110F with reference to FIGS. 43 to 46. In place of the shoe sole 110A included in the shoe 100A according to the above-described fourteenth embodiment, the shoe 100F according to the present embodiment includes the shoe sole 110F described below.

As shown in FIGS. 43 to 46, the shoe sole 110F according to the present embodiment is different from the shoe sole 110E according to the above-described eighteenth embodiment only in the position of the less-deformable portion 113b provided in the base portion 113 as a midsole. Specifically, the less-deformable portion 113b is not provided on the upper surface of the base portion 113, but is located in portions on the lower surface of the base portion 113 that include: the rear portion on the medial foot side of the forefoot portion R1; the rear portion on the lateral foot side of the forefoot portion R1; the substantially entirety of the midfoot portion R2; and the entirety of the rearfoot portion R3.

The less-deformable portion 113b is formed to be less deformable than other portions of the base portion 113 and made of thermoplastic polyurethane (TPU) elastomer, for example, as in the above-described eighteenth embodiment. In FIG. 45, for ease of understanding, the region where the less-deformable portion 113b is provided is shown in light color.

In the shoe sole 110F according to the present embodiment configured as described above, each of the medial rearfoot-side shock absorbing structure 10M1, the lateral rearfoot-side shock absorbing structure 10M2, the medial forefoot-side shock absorbing structure 10N1, and the lateral forefoot-side shock absorbing structure 10N2 is bonded to the lower surface of the base portion 113 defined by the less-deformable portion 113b. Note that the medial rearfoot-side shock absorbing structure 10M1, the lateral rearfoot-side shock absorbing structure 10M2, the medial forefoot-side shock absorbing structure 10N1, and the lateral forefoot-side shock absorbing structure 10N2 each are identical in configuration to those in the above-described eighteenth embodiment, and therefore, the description thereof will not be repeated.

Therefore, similarly to the above-described eighteenth embodiment, the shoe sole 110F according to the present embodiment and the shoe 100F including the shoe sole 110F can provide: a shoe sole that is particularly suitable for a person more likely to suffer from an overpronation and a person with pes planovalgus, that is excellent in stability upon landing, that enables an excellent fit on a foot, and that is reduced in weight; and a shoe including the shoe sole.

In the shoe sole 110F according to the present embodiment, the less-deformable portion 113b having a thin plate shape is located between: the upper layer portion of the base portion 113 where the deformability is relatively high (i.e., the portion excluding the less-deformable portion 113b from the base portion 113); and the medial rearfoot-side shock absorbing structure 10M1, the lateral rearfoot-side shock absorbing structure 10M2, the medial forefoot-side shock absorbing structure 10N1, and the lateral forefoot-side shock Sabsorbing structure 10N2, each of which is relatively high in deformability. In this case, the less-deformable portion 113b is lower in deformability than the above-mentioned upper layer portion and the above-mentioned shock absorbing structures.

Thus, by the shoe sole 110F according to the present embodiment, the load applied through the base portion 113 to the medial rearfoot-side shock absorbing structure 10M1, the lateral rearfoot-side shock absorbing structure 10M2, the medial forefoot-side shock absorbing structure 10N1, and the lateral forefoot-side shock absorbing structure 10N2 upon landing is rendered uniform by the less deformable portion 113b, as compared with the shoe sole 110E according to the above-described eighteenth embodiment. This is because the less-deformable portion 113b is less deformable as compared with the surrounding portions, and thus, this less-deformable portion 113b while being kept well in a thin plate shape pressurizes the medial rearfoot-side shock absorbing structure 10M1, the lateral rearfoot-side shock absorbing structure 10M2, the medial forefoot-side shock absorbing structure 10N1, and the lateral forefoot-side shock absorbing structure 10N2.

Therefore, the shoe sole 110F according to the present embodiment and the shoe 100F including the shoe sole 110F can suppress excessive local deformation of the medial rearfoot-side shock absorbing structure 10M1, the lateral rearfoot-side shock absorbing structure 10M2, the medial forefoot-side shock absorbing structure 10N1, and the lateral forefoot-side shock absorbing structure 10N2, with the result that stable shock absorbing performance can be achieved.

By the configuration as described above, the targets to be bonded to the shock absorbing structures such as the medial rearfoot-side shock absorbing structure, the lateral rearfoot-side shock absorbing structure, the medial forefoot-side shock absorbing structure, and the lateral forefoot-side shock absorbing structure are formed as less-deformable portions made of a non-foam material such as thermoplastic polyurethane (TPU). This can achieve a secondary effect that the bonding work is significantly facilitated (particularly, the positioning in preparation to bonding is facilitated) as compared with the case where the target to be bonded is a foam material.

Summary of Disclosure in Embodiments and the Like

The following summarizes characteristic configurations disclosed in the above-described first to nineteenth embodiments and modifications thereof.

A shock absorber according to an aspect of the present disclosure has a columnar outer shape and includes, as outer surfaces: a first end surface and a second end surface that are located opposite to each other in an axial direction in which an axial line extends; and a plurality of connection surfaces connecting a peripheral edge of the first end surface and a peripheral edge of the second end surface. The first end surface has an outer shape of an N-sided polygon (N is an integer of 3 or more) when viewed in the axial direction. The second end surface has an outer shape of an M-sided polygon (M is an integer of 4 or more and more than N) when viewed in the axial direction. (M–N) vertices are provided at intermediate positions in the axial direction on a circumferential surface defined by the connection surfaces. In the shock absorber according to an aspect of the present disclosure, one first ridgeline is provided to extend from the (M–N) vertices provided on the circumferential surface to reach a corresponding one vertex among N vertices provided on the first end surface. Two second ridgelines each are provided to extend from the (M–N) vertices provided on the circumferential surface to reach a corresponding one of two vertices among M vertices provided on the second end surface, the two vertices being adjacent to each other in a circumferential direction. (2×N–M) third ridgelines each are provided to extend from a corresponding one of remaining vertices among the N vertices provided on the first end surface to reach a corresponding one of remaining vertices among the M vertices provided on the second end surface. Ridgelines included in the first ridgeline, the second ridgelines, and the third ridgelines do not intersect with each other. Thereby, in the shock absorber according an aspect of the present disclosure, ridgelines included in the first ridgeline, the second ridgelines, and the third ridgelines define the connection surfaces.

The shock absorber according to an aspect of the present disclosure can be solid or hollow. In this case, the state of solid means a configuration having no hollow inside, and the state of hollow means a configuration having a hollow inside.

The shock absorber according to an aspect of the present disclosure can be formed of one of: a foam material made of resin; a non-foam material made of resin; a foam material made of rubber; and a non-foam material made of rubber.

In the shock absorber according to an aspect of the present disclosure, the M is preferably 10 or less.

In the shock absorber according to an aspect of the present disclosure, the third ridgelines can be inclined in an identical direction around the axial line.

A shock absorbing structure according to the first aspect of the present disclosure includes a plurality of the shock absorbers according to an aspect of the present disclosure.

A shock absorbing structure according to the second aspect of the present disclosure includes a shock absorbing unit unitized by combining a plurality of shock absorbers. Each of the shock absorbers is formed of the shock absorber according to an aspect of the present disclosure described above. The shock absorbers each have the plurality of connection surfaces, and the shock absorbers are disposed adjacent to each other such that, among the connection surfaces, connection surfaces each defined by the first ridgeline and the second ridgelines face each other with a gap interposed therebetween. In the shock absorbing structure according to the second aspect of the present disclosure, the gap disposed between the shock absorbers is substantially identical in size.

A shock absorbing structure according to the third aspect of the present disclosure includes a plurality of the shock absorbing units included in the shock absorbing structure according to the second aspect of the present disclosure.

In the shock absorbing structure according to the second and third aspects of the present disclosure, the shock absorbers are formed of four shock absorbers in total that include: two first shock absorbers each including the first end surface having a hexagonal shape and the second end surface having a pentagonal shape; and two second shock absorbers each including the first end surface having a pentagonal shape and the second end surface having a quadrangular shape. In this case, it is preferable that the two first shock absorbers and the two second shock absorbers are disposed alternately in a circumferential direction of the shock absorbing unit, and the two first shock absorbers are oriented opposite in the axial direction to the two second shock absorbers, such that the shock absorbing unit entirely has an outer shape of a substantially hexagonal column shape.

In the shock absorbing structure according to the second and third aspects of the present disclosure, the third ridgelines provided in each of the shock absorbers and located on a circumferential surface of the shock absorbing unit can be inclined in an identical direction around an axial line of the shock absorbing unit.

A shock absorbing structure according to the fourth aspect of the present disclosure includes a shock absorbing unit unitized by combining a plurality of shock absorbers. Each of the shock absorbers is formed of the shock absorber according to an aspect of the present disclosure described above. The shock absorbers each have the plurality of connection surfaces, and the shock absorbers are disposed adjacent to each other such that, among the connection surfaces, connection surfaces each defined only by the third ridgelines face each other with a gap interposed therebetween. In the shock absorbing structure according to the fourth aspect of the present disclosure, the gap provided between the shock absorbers is substantially identical in size.

A shock absorbing structure according to the fifth aspect of the present disclosure includes a plurality of the shock absorbing units included in the shock absorbing structure according to the fourth aspect of the present disclosure described above.

In the shock absorbing structure according to the fourth and fifth aspects of the present disclosure, the shock absorbers are formed of three shock absorbers each including: the first end surface having a quadrangular shape; and the second end surface having a pentagonal shape. In this case, it is preferable that the three shock absorbers are disposed side by side in a circumferential direction of the shock absorbing unit, such that the shock absorbing unit entirely has an outer shape of a substantially column shape in which a pair of surfaces located in an axial direction of the shock absorbing unit each have a hexagonal shape.

In the shock absorbing structure according to the fourth and fifth aspects of the present disclosure, the first ridgeline provided in each of the shock absorbers and the third ridgelines provided in each of the shock absorbers and located on a circumferential surface of the shock absorbing unit can be inclined in an identical direction around an axial line of the shock absorbing unit.

A shoe sole according to the first aspect of the present disclosure includes the shock absorber according to an aspect of the present disclosure described above.

In the shoe sole according to the first aspect of the present disclosure, it is preferable that the shock absorber is disposed such that the axial line is orthogonal to a ground contact surface.

A shoe sole according to the second aspect of the present disclosure includes the shock absorbing structure according to any one of the first to fifth aspects of the present disclosure described above.

In the shoe sole according to the second aspect of the present disclosure, it is preferable that the shock absorbers are disposed such that the axial line of each of the shock absorbers is orthogonal to a ground contact surface.

A shoe according to an aspect of the present disclosure includes: the shoe sole according to any one of the first and the second aspects of the present disclosure; and an upper disposed above the shoe sole.

Further, the following summarizes characteristic configurations disclosed in the above-described eighteenth and nineteenth embodiments.

A shoe sole according to another aspect of the present disclosure includes: a midsole; an outsole located below the midsole; and a shock absorbing structure located between the midsole and the outsole. The shock absorbing structure is located at least at the edge portion of the rearfoot portion of the midsole so as to extend along a part of the shoe sole that supports a heel bone of a foot. The shock absorbing structure is formed of a shock absorbing structure according to the fifth aspect of the present disclosure and configured such that a plurality of the shock absorbing units included in the shock absorbing structure according to the fourth aspect of the present disclosure are arranged to extend along the edge portion of the rearfoot portion of the midsole. Each of the plurality of shock absorbing units is connected to at least one of the adjacent shock absorbing units by a support member having a thin plate shape.

In the shoe sole according to another aspect of the present disclosure, the support member can be provided at end portions of the respective shock absorbing units on the midsole side. In this case, it is preferable that the support member is bonded to the lower surface of the midsole, and thereby, the shock absorbing structure is fixed to the midsole.

In the shoe sole according to another aspect of the present disclosure, the shock absorbing structure can be divided in the extending direction of the shock absorbing structure in a plan view of the shoe sole, and thereby include a medial rearfoot-side shock absorbing structure and a lateral rearfoot-side shock absorbing structure. In that case, the outer shapes of the plurality of shock absorbing units can be different from one another such that the medial rearfoot-side shock absorbing structure is different in deformability from the lateral rearfoot-side shock absorbing structure. In this case, the deformability of the lateral rearfoot-side shock absorbing structure is preferably higher than the deformability of the medial rearfoot-side shock absorbing structure.

In the shoe sole according to another aspect of the present disclosure, the outsole can be bonded to the second end surface of each of the shock absorbers included in each of the shock absorbing units so as to cover the second end surface, and thereby, fixed to the shock absorbing structure.

In the shoe sole according to another aspect of the present disclosure, it is preferable that the plurality of shock absorbers are disposed such that the axial lines of these shock absorbers are orthogonal to the ground contact surface.

A shoe according to another aspect of the disclosure includes: the shoe sole according to any one of the above-described another aspects of the present disclosure; and an upper disposed above the shoe sole.

In the shock absorber according to an aspect of the present disclosure described above, some or all of the portions where the first end surface, the second end surface, and the plurality of connection surfaces are connected to each other (i.e., some or all of the one first ridgeline, the two second ridgelines, the $(2 \times N-M)$ third ridgelines, and the plurality of vertices) each do not need to have a strictly acute, obtuse or right-angled corner portion. Instead, some or all of the above-mentioned portions can be connected through a flat surface or a curved surface sufficiently smaller than the first end surface, the second end surface, and the plurality of connection surfaces of each portion adjacent thereto. In other words, some or all of the above-mentioned portions can be chamfered or can be rounded, for example. Further, some or all of the first end surface, the second end surface, and the plurality of connection surfaces can be a flat surface or a curved surface. Further, some or all of the first end surface, the second end surface, and the plurality of connection surfaces can be including recesses or protrusions.

Other Embodiments and the Like

In the fourteenth to nineteenth embodiments described above, the method of manufacturing a shoe sole including a shock absorber according to the present invention has been described, exclusively focusing on: the method of sandwiching the shock absorbing structures as a plurality of shock absorbing units between the lower support member and the upper support member and fixing the shock absorbing structures to the lower support member and the upper support member by adhesion or the like; and the method of fixing the shock absorbing structures to the base portion by adhesion or the like, but the shoe sole can also be manufactured according to other manufacturing methods.

For example, in the case of forming a shoe sole from a single sole member, during molding, a shock absorbing structure as one set or a plurality of shock absorbing structures can be embedded in the sole member by insert molding. In this case, when the sole member is formed to have a thickness equal to the external dimension of each shock absorbing structure in the axial direction, the bottom surface of each shock absorbing structure is located flush with the bottom surface of the shoe sole. Also, an outsole can be further attached onto the bottom surface of the sole member into which each shock absorbing structure has been embedded by insert molding as described above.

Further, in the case of forming a shoe sole from a single sole member, only the upper surface or the lower surface of the sole member can be including a recess or a plurality of recesses, and then, a shock absorbing structure as a shock absorbing unit can be fitted in the recess or each of the recesses. In this case, an upper is disposed further above each shock absorbing structure and the sole member. In addition, an outsole can be further attached to the bottom surface of each shock absorbing structure or the sole member in which each shock absorbing structure has been fitted.

Further, the above description in the fourteenth to nineteenth embodiments relates to: a shoe sole including shock absorbing structures as a plurality of shock absorbing units; and a shoe including the shoe sole, but only a shock absorbing structure as one set can be provided in the shoe sole, or these shock absorbing structures and the shock absorbers presented in the above-described first embodiment and the modifications thereof can be combined and provided in the shoe sole. Further, a shoe sole including only the shock absorbers presented in the above-described first embodiment and the modification thereof can also naturally be provided.

In addition, the shock absorbing structure and/or the shock absorber and the sole member can be formed of a foam material of resin or rubber using the same type of material, or can be formed of a foam material of resin or rubber using different types of materials.

Further, the above description of the fourteenth to nineteenth embodiments relates to the case where the shock absorber according to the present disclosure is applied to a shoe sole of a shoe, but the shock absorber according to the present disclosure can be applicable to other shock absorbing applications. For example, the shock absorber according to the present disclosure can be used in various applications such as packaging materials, floor materials for buildings (for example, houses), surface materials for paving paths, surface materials for sofas and chairs, tires, and the like.

The characteristic configurations disclosed in the above-described first to nineteenth embodiments and the modifications thereof can be combined with one another without departing from the gist of the present invention.

Thus, the above-described embodiments and modifications disclosed herein are illustrative and non-restrictive in any respect. The technical scope of the present invention is defined by the terms of the claims, and is intended to include any modifications within the meaning and scope equivalent to the terms of the claims.

The invention claimed is:
1. A shock absorbing structure, comprising:
a plurality of shock absorbing units unitized by combining a plurality of shock absorbers having a columnar outer shape, the shock absorbers each comprising
first and second outer surfaces, the first outer surface being a first end surface and the second outer surface being a second end surface, the first outer surface and the second outer surface located opposite to each other in an axial direction in which an axial line extends, and
a plurality of connection surfaces connecting a peripheral edge of the first end surface and a peripheral edge of the second end surface,
the first end surface has an outer shape of an N-sided polygon (N is an integer of at least 3) when viewed in the axial direction,
the second end surface has an outer shape of an M-sided polygon (M is an integer of at least 4 and more than N) when viewed in the axial direction,
(M−N) vertices are disposed at intermediate positions in the axial direction on a circumferential surface defined by the connection surfaces,
a first ridgeline extends from the (M−N) vertices disposed on the circumferential surface to reach a corresponding vertex among N vertices disposed on the first end surface,
two second ridgelines each extend from the (M−N) vertices disposed on the circumferential surface to reach a corresponding one of two vertices among M vertices disposed on the second end surface, the two vertices being adjacent to each other in a circumferential direction,
(2×N−M) third ridgelines extend from a corresponding one of remaining vertices among the N vertices disposed on the first end surface to reach a corresponding one of remaining vertices among the M vertices disposed on the second end surface,
ridgelines of the first ridgeline, the second ridgelines, and the third ridgelines do not intersect each other,
the ridgelines of the first ridgeline, the second ridgelines, and the third ridgelines define the connection surfaces,
the shock absorbers are disposed adjacent to each other such that, among the connection surfaces for a respective shock absorber, connection surfaces each defined by at least one of the first ridgeline and the second ridgelines face each other with a gap interposed therebetween, and
each gap provided between the shock absorbers is substantially identical in size.
2. The shock absorbing structure according to claim 1, wherein the shock absorbers are solid or hollow.
3. The shock absorbing structure according to claim 1, wherein
the shock absorbers are formed of one of: a foam material made of resin; a non-foam material made of resin; a foam material made of rubber; and a non-foam material made of rubber.
4. The shock absorbing structure according to claim 1, wherein
the M is 10 or less.
5. The shock absorbing structure according to claim 1, wherein
the third ridgelines are inclined in an identical direction around the axial line.

6. A shock absorbing structure, comprising:
a shock absorbing unit unitized by combining a plurality of shock absorbers having a columnar outer shape, the shock absorbers comprising
first and second outer surfaces, the first outer surface being a first end surface and the second outer surface being a second end surface, the first outer surface and the second outer surface located opposite to each other in an axial direction in which an axial line extends, and
a plurality of connection surfaces connecting a peripheral edge of the first end surface and a peripheral edge of the second end surface,
the first end surface has an outer shape of an N-sided polygon (N is an integer of at least 3) when viewed in the axial direction,
the second end surface has an outer shape of an M-sided polygon (M is an integer of at least 4 and more than N) when viewed in the axial direction,
(M−N) vertices are disposed at intermediate positions in the axial direction on a circumferential surface defined by the connection surfaces,
a first ridgeline extends from the (M−N) vertices disposed on the circumferential surface to reach a corresponding vertex among N vertices disposed on the first end surface,
two second ridgelines each extend from the (M−N) vertices disposed on the circumferential surface to reach a corresponding one of two vertices among M vertices disposed on the second end surface, the two vertices being adjacent to each other in a circumferential direction,
(2×N−M) third ridgelines extend from a corresponding one of remaining vertices among the N vertices disposed on the first end surface to reach a corresponding one of remaining vertices among the M vertices disposed on the second end surface,
ridgelines of the first ridgeline, the second ridgelines, and the third ridgelines do not intersect each other,
the ridgelines of the first ridgeline, the second ridgelines, and the third ridgelines define the connection surfaces,
the shock absorbers are disposed adjacent to each other such that, among the connection surfaces for a respective shock absorber, connection surfaces each defined by at least one of the first ridgeline and the second ridgelines face each other with a gap interposed therebetween,
each gap provided between the shock absorbers is substantially identical in size,
the shock absorbers number four shock absorbers in total, the four shock absorbers including two first shock absorbers each including the first end surface having a pentagonal shape and the second end surface having a hexagonal shape, and two second shock absorbers each including the first end surface having a quadrangular shape and the second end surface having a pentagonal shape, and
the two first shock absorbers and the two second shock absorbers disposed alternately in a circumferential direction of the shock absorbing unit, and the two first shock absorbers oriented opposite in the axial direction to the two second shock absorbers, such that the shock absorbing unit entirely has an outer shape of a substantially hexagonal column shape.

7. The shock absorbing structure according to claim 6, comprising a plurality of the shock absorbing units.

8. A shock absorbing structure, comprising:
a shock absorbing unit unitized by combining a plurality of shock absorbers having a columnar outer shape, the shock absorbers comprising
first and second outer surfaces, the first outer surface being a first end surface and the second outer surface being a second end surface, the first outer surface and the second outer surface located opposite to each other in an axial direction in which an axial line extends, and
a plurality of connection surfaces connecting a peripheral edge of the first end surface and a peripheral edge of the second end surface,
the first end surface has an outer shape of an N-sided polygon (N is an integer of at least 3) when viewed in the axial direction,
the second end surface has an outer shape of an M-sided polygon (M is an integer of at least 4 and more than N) when viewed in the axial direction,
(M−N) vertices are disposed at intermediate positions in the axial direction on a circumferential surface defined by the connection surfaces,
a first ridgeline extends from the (M−N) vertices disposed on the circumferential surface to reach a corresponding vertex among N vertices disposed on the first end surface,
two second ridgelines each extend from the (M−N) vertices disposed on the circumferential surface to reach a corresponding one of two vertices among M vertices disposed on the second end surface, the two vertices being adjacent to each other in a circumferential direction,
(2×N−M) third ridgelines extend from a corresponding one of remaining vertices among the N vertices disposed on the first end surface to reach a corresponding one of remaining vertices among the M vertices disposed on the second end surface,
ridgelines of the first ridgeline, the second ridgelines, and the third ridgelines do not intersect each other,
the ridgelines of the first ridgeline, the second ridgelines, and the third ridgelines define the connection surfaces,
the shock absorbers are disposed adjacent to each other such that, among the connection surfaces for a respective shock absorber, connection surfaces each defined by at least one of the first ridgeline and the second ridgelines face each other with a gap interposed therebetween,
each gap provided between the shock absorbers is substantially identical in size, and
the third ridgelines provided in each of the shock absorbers and located on a circumferential surface of the shock absorbing unit are inclined in an identical direction around an axial line of the shock absorbing unit.

9. A shock absorbing structure, comprising:
a shock absorbing unit unitized by combining a plurality of shock absorbers having a columnar outer shape, the shock absorbers comprising
first and second outer surfaces, the first outer surface being a first end surface and the second outer surface being a second end surface, the first outer surface and the second outer surface located opposite to each other in an axial direction in which an axial line extends, and
a plurality of connection surfaces connecting a peripheral edge of the first end surface and a peripheral edge of the second end surface, the first end surface has an outer shape of an N-sided polygon (N is an integer of at least 3) when viewed in the axial direction, the second end surface has an outer shape of an M-sided polygon (M is an integer of at least 4 and more than N) when viewed in the axial direction, (M−N) vertices are disposed at intermediate positions in the axial direction on a circumferential surface defined by the connection surfaces, a first ridgeline extends from the (M−N) vertices disposed on the circumferential surface to reach a corresponding vertex among N vertices disposed on the first end surface, two second ridgelines each extend from the (M−N) vertices disposed on the circumferential surface to reach a corresponding one of two vertices among M vertices disposed on the second end surface, the two vertices being adjacent to each other in a circumferential direction, (2×N−M) third ridgelines extend from a corresponding one of remaining vertices among the N vertices disposed on the first end surface to reach a corresponding one of remaining vertices among the M vertices disposed on the second end surface, ridgelines of the first ridgeline, the second ridgelines, and the third ridgelines do not intersect each other, the ridgelines of the first ridgeline, the second ridgelines, and the third ridgelines define the connection surfaces, the shock absorbers disposed adjacent to each other such that the connection surfaces each defined only by the third ridgelines face each other with a gap interposed therebetween, and each gap provided between the shock absorbers is substantially identical in size.

10. The shock absorbing structure according to claim 9, comprising a plurality of the shock absorbing units.

11. The shock absorbing structure according to claim 9, wherein the shock absorbers number three shock absorbers each including the first end surface having a quadrangular shape, and the second end surface having a pentagonal shape, and the three shock absorbers are disposed side by side in a circumferential direction of the shock absorbing unit, such that the shock absorbing unit entirely has an outer shape of a substantially column shape in which a pair of surfaces located in an axial direction of the shock absorbing unit each have a hexagonal shape.

12. The shock absorbing structure according to claim 9, wherein the first ridgeline in each of the shock absorbers and the third ridgelines in each of the shock absorbers and located on a circumferential surface of the shock absorbing unit are inclined in an identical direction around an axial line of the shock absorbing unit.

13. A shoe sole comprising the shock absorbing structure according to claim 9.

14. The shoe sole according to claim 13, wherein the shock absorbers are disposed such that the axial line of each of the shock absorbers is orthogonal to a ground contact surface.

15. A shoe sole comprising the shock absorbing structure according to claim 1.

16. The shoe sole according to claim 15, wherein the shock absorber is disposed such that the axial line is orthogonal to a ground contact surface.

17. A shoe comprising:

the shoe sole according to claim 15; and an upper portion provided above the shoe sole.

18. A shoe comprising:

the shoe sole according to claim 13; and an upper portion provided above the shoe sole.

19. A shoe sole comprising the shock absorbing structure according to claim 6.

20. A shoe sole comprising the shock absorbing structure according to claim 8.

* * * * *